United States Patent [19]

Cohen

[11] Patent Number: 5,434,808
[45] Date of Patent: Jul. 18, 1995

[54] HIGHLY PARALLEL DISCRETE COSINE TRANSFORM ENGINE

[75] Inventor: Paul E. Cohen, San Jose, Calif.

[73] Assignee: NEC Electronics, Inc., Mountain View, Calif.

[21] Appl. No.: 145,263

[22] Filed: Oct. 29, 1993

[51] Int. Cl.⁶ .............................................. G06F 7/38
[52] U.S. Cl. ..................................................... 364/725
[58] Field of Search ............... 364/725, 726, 754, 736, 364/784; 358/479, 426, 427

[56] References Cited

U.S. PATENT DOCUMENTS

| | | | |
|---|---|---|---|
| 4,958,312 | 9/1990 | Ang | 364/754 |
| 4,999,799 | 3/1991 | Tufts | 364/726 |
| 5,202,847 | 4/1993 | Bolton et al. | 364/725 |
| 5,249,146 | 9/1993 | Uramoto et al. | 364/725 |
| 5,325,215 | 6/1994 | Shibata et al. | 358/479 |
| 5,329,318 | 7/1994 | Keith | 348/699 |

OTHER PUBLICATIONS

IEEE Micro Chips, Systems, Software, and Applications, "Architecture and Implementation of ICs for a DSC-HDTV Video Decoder System", Oct., 1992, pp. 22-27.

IEEE Micro Chips, Systems, Software, and Applications, "A 160-Mpixel/s IDCT Processor for HDTV", Oct., 1992, pp. 28-32.

Paul M. Embree et al, "C Language Algorithms for Digital Signal Processing," Chapter 7, pp. 356-367.

Jae S. Lim "Two-Dimensional Signal and Image Processing", Chapter 3, pp. 148-162.

IEEE Micro Chips, Systems, Software, and Applications, "Guest Editors' Introduction Processing Hardware for Real-Time Video Coding ", Oct., 1992, pp. 9-32.

*Primary Examiner*—Roy N. Envall, Jr.
*Assistant Examiner*—Emmanuel L. Moise
*Attorney, Agent, or Firm*—Skjerven, Morrill, MacPherson, Franklin & Friel; Stephen A. Terrile

[57] ABSTRACT

A discrete cosine transform engine which receives an input matrix of data and provides a transformed matrix of data, the input matrix and the output matrix each having a plurality of row locations and a plurality of column locations. The engine includes a plurality of input accumulators, a plurality of multiplication circuits and a plurality of output accumulators. The plurality of accumulators accumulate data from the input matrix of data in parallel to provide a plurality of transform coefficient outputs. The plurality of multiplication circuits receive the plurality of coefficient outputs and multiply the coefficient outputs by transform constants to provide a plurality of transform products. Each output accumulator receives the transform products and accumulates the products to provide the transformed matrix of data.

18 Claims, 3 Drawing Sheets

HIGHLY PARALLEL DISCRETE COSINE TRANSFORM ENGINE

BACKGROUND OF THE INVENTION

The present invention relates to discrete cosine transforms, and more particularly, to an engine for performing discrete cosine transforms.

It is desirable to compress image signals which are used with computer systems as an image signal for a single uncompressed high resolution digitized color image can easily fill several megabytes of storage. Because images generally have low information content, very good compression rates are possible. This is especially true if, as is often the case with image signals which are used with computer systems, perfect reproduction is not required. When perfect reproduction is not required, the low frequency components of a frequency domain image signal are perceptually more important in reproducing the image than the high frequency components of the frequency domain image signal. Thus, compression schemes that are applied to the frequency domain version of an image signal do not waste unnecessary bits in accurately representing the high frequency portions of the image signal.

Accordingly, it is desirable to transform an image signal from the spacial domain to the frequency domain prior to compressing the image signal. One type of transform that is desirable when transforming image signals is the discrete cosine transform (DCT). Examples of compression schemes which use a DCT include a Joint Photographics Experts Group standard (JPEG), a Moving Pictures Expert Group standard (MPEG), and a Consulting Committee for International Telegraphy and Telephony standard (CCITTH.261). A DCT is similar to a Fourier transform; an $8 \times 8$ DCT can be computed as a $16 \times 16$ Fourier transform. A DCT includes a pair of transforms, a forward DCT (FDCT), which maps a digitized signal to a frequency domain signal, and an inverse DCT (IDCT), which maps a frequency domain signal to a digitized signal.

It is known to perform DCT's in software on a personal computer to compress and decompress an image signal. When transforming a color image signal compared to a monochrome image signal, the amount of computation required increases by a factor of three. Additionally, the amount of computation required to transform an image increases as the square of the size of the screen of the computer.

When compressing an image signal, it is desirable to perform the DCTs quickly as compressing an image signal requires many DCTs to be performed. For example, to perform a JPEG compression of a 1024 by 1024 pixel color image requires 49,152 $8 \times 8$ DCT's. If 30 images are compressed or decompressed every second, as is suggested to provide full motion video, then a DCT must be performed every 678 nsec. The calculation of a single $8 \times 8$ DCT (using the standard definition of a DCT transform) requires more that 9200 multiplications and more than 4000 additions.

It is known to perform DCTs on a matrix of data by first transforming the rows of data and then convolving the transformed rows to provide a transformed matrix of data. Such a system is relatively slow as the system includes the extra step of convolving the transformed rows of data.

SUMMARY OF THE INVENTION

It has been discovered that by dividing a DCT into a plurality of functions which may be performed in parallel and then performing the functions in parallel, a DCT engine may be provided which quickly and efficiently performs discrete cosine transforms on matrices of data.

In one embodiment, the invention relates to providing a plurality of input accumulator circuits which, based upon subsets of input data, provide transform coefficients, a plurality of multipliers which calculate a set of product values based upon the transform coefficients and a set of output accumulator circuits which accumulate subsets of the transform products to provide a matrix of transformed data.

DETAILED DESCRIPTION OF THE INVENTION

The following sets forth a detailed description of the best contemplated mode for carrying out the invention. The description is intended to be illustrative of the invention and should not be taken to be limiting.

Figure 1:
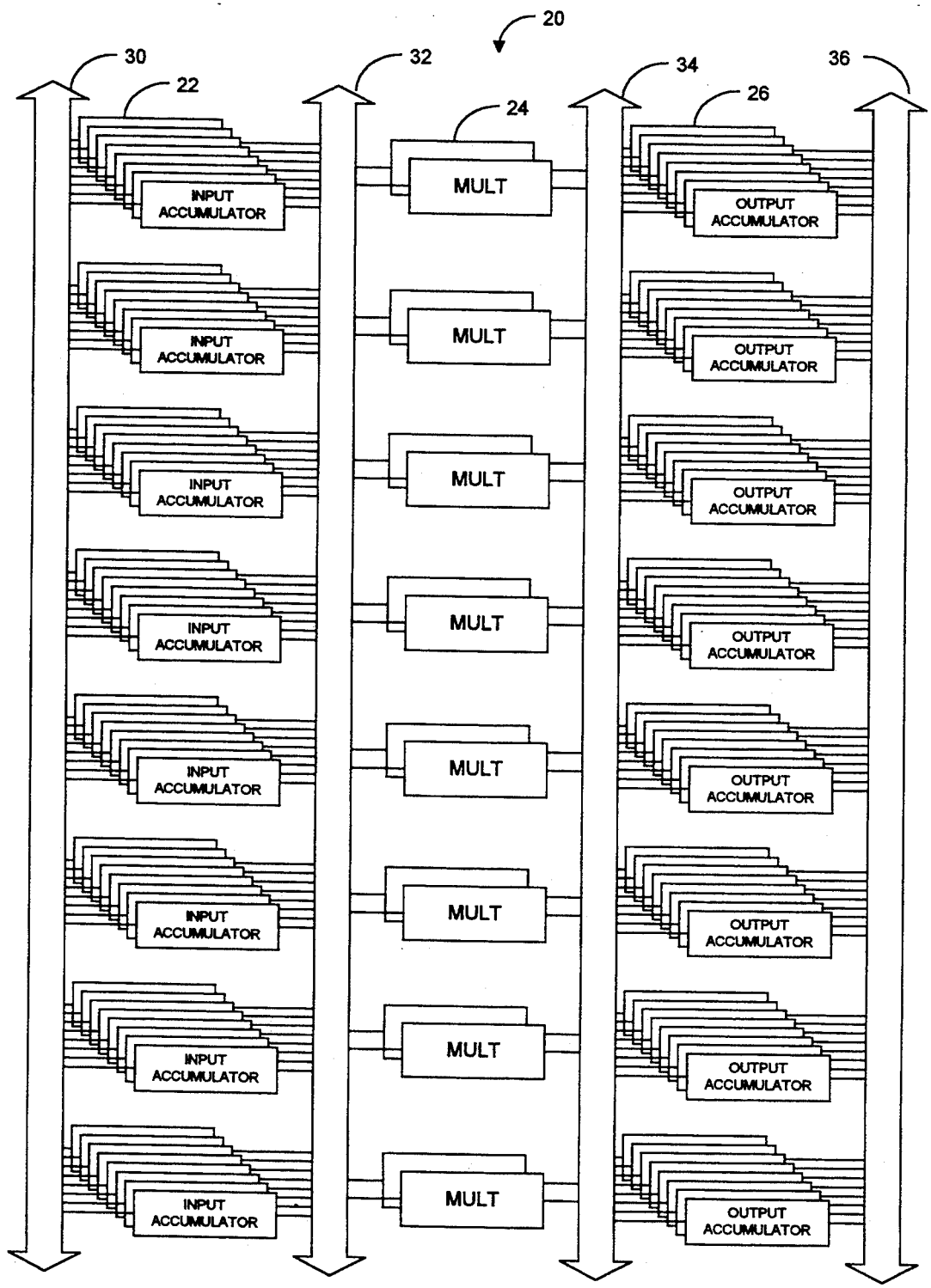
FIG. 1 shows a block diagram of a DCT engine in accordance with the present invention.

Referring to FIG. 1, a DCT engine is shown for transforming $8 \times 8$ matrices F and f, where F is the FDCT of f and f is the IDCT of F. DCT engine 20 includes a plurality of input accumulator circuits 22, a plurality of multiplier circuits 24 and a plurality of output accumulator circuits 26. Input accumulator circuits 22 receive input data from input bus 30 and provide transform coefficient data to multiplier circuits 24 via sum bus 32. Sum bus 32 is arranged as six equivalent buses, Sbus(0)–Sbus(5), which are interconnected by a cross-bar switch to permit any sum bus to receive output transform coefficient data from any adder and any multiplier circuit to receive transform coefficient data from any sum bus. By providing a plurality of equivalent buses, the buses can accommodate a high volume of data in parallel without contention. Multiplier circuits 24 provide transform product data to output accumulator circuits 26 via product bus 34. Product bus 34 is arranged as seven equivalent buses, Pbus(0)–Pbus(6), which are interconnected by a cross-bar switch to permit: any product bus to receive output product data from any multiplier circuit and to permit any product bus to provide product data to any output accumulator circuit. Output accumulator circuits 26 provide output data to output bus 36.

Input accumulator circuits 22 are arranged in an $8 \times 8$ matrix. I.e., there are eight sets of accumulator circuits that are connected eight in parallel between input bus 30 and sum bus 32. For notation purposes, these accumulator circuits are referred to as IAdd(L), where L indicates the location of the adder circuit in the matrix which is indexed to correspond to a singly indexed vector. For example, IAdd(0) indicates the input accumulator circuit which is located at row 0, column 0 of the matrix and IAdd(63) indicates the input accumulator circuit which is located at row 7, column 7 of the matrix. Each input accumulation circuit 22 provides a corresponding transform coefficient.

Multiplier circuits 24 are arranged as a 2×8 matrix. I.e., there are eight sets of multiplier circuits that are connected two in parallel between sum bus 32 and product bus 34. For notation purposes, these accumulator circuits are referred to as Cmult(k) and Rmult(k), where k is a number from 0-7. The multiplier circuits denoted Cmult(k) perform a multiplication with one of eight different c constants and the multiplier circuits denoted Rmult(k) perform a multiplication with one of eight different r constants. Because, as discussed below, there are 16 constants by which the sum data is multiplied, providing 16 multiplier circuits allows the multiplication by the constants to be performed in parallel, with each multiplier circuit multiplying by a particular constant. Because, multiplier circuits 24 multiply by fixed constants, multiplier circuits 24 are configured as look-up tables. By configuring multiplier circuits 24 as look-up tables, multiplier circuits 24 can perform the multiplications in a single cycle. Each multiplier circuits 24 includes local storage to hold the products of the multiplications until one of the product buses is available. Additionally, multiplier circuits 24 include input storage because it is possible that the respective circuits 24 may receive two inputs in a single cycle.

Output accumulator circuits 26 are arranged as an 8×8 matrix. I.e., there are eight sets of output accumulator circuits that are connected eight in parallel between product bus 34 and output bus 36. For notation purposes, these accumulator circuits are referred to as OAdd(L), where L indicates the location of the accumulator circuit in the matrix which is indexed to correspond to a singly indexed vector. For example, OAdd(0) indicates the accumulator circuit which is located at row 0, column 0 of the matrix and OAdd(63) indicates the accumulator circuit which is located at location row 7, column 7 of the matrix. Each output accumulator circuit provides a corresponding location of the output data to output bus 36.

DCT engine 20 performs a DCT on the 8×8 matrices F and f. In the 8×8 spacial matrix F, i and j represent the coordinates for the matrix locations within the spacial matrix and in the 8×8 frequency matrix f, u and v are coordinates for the matrix locations within the frequency matrix. The forward DCT of the spacial matrix is set forth by the following equation.

$$F_{uv} = \frac{1}{4} \cdot K_u K_v \cdot \Sigma_i \Sigma_j f_{ij} \cdot \cos\left[(2 \cdot i + 1) \cdot u \cdot \frac{\pi}{16}\right]$$

$$\cos\left[(2 \cdot j + 1) \cdot v \cdot \frac{\pi}{16}\right]$$

The inverse DCT for the frequency matrix is set forth by the equation.

$$f_{ij} = \frac{1}{4} \cdot \Sigma_u \Sigma_v K_u \cdot K_v \cdot \cos\left[(2 \cdot i + 1) \cdot u \cdot \frac{\pi}{16}\right] \cdot$$

$$\cos\left[(2 \cdot j + 1) \cdot v \cdot \frac{\pi}{16}\right]$$

By defining the cosine constant $c_i$ as $$\cos\left[\pi \cdot \frac{i}{16}\right]$$

the trigonometric identity $$2 \cdot c_i \cdot c_j = c_{i+j} + c_{i-j}$$

is provided. By substituting this identity into the formulas F and f, the following equations result.

$$F_{uv} = \frac{1}{8} \cdot K_u \cdot K_v \cdot \Sigma_i \Sigma_j f_{ij} \cdot$$

$$[c_{(2 \cdot i + 1) \cdot u + (2 \cdot j + 1) \cdot v} + c_{(2 \cdot i + 1) \cdot u - (2 \cdot j + 1) \cdot v}]$$

$$f_{ij} = \frac{1}{8} \cdot \Sigma_u \Sigma_v K_u \cdot K_v \cdot F_{uv} \cdot$$

$$[c_{(2 \cdot i + 1) \cdot u + (2 \cdot j + 1) \cdot v} + c_{(2 \cdot i + 1) \cdot u - (2 \cdot j + 1) \cdot v}]$$

By formulating the transforms in this way, $c_i$ takes on only sixteen different values, $c_0$ to $c_7$ and $-c_0$ to $-c_7$. Note that $$c_0 = 1 \text{ and } c_4 = \frac{\sqrt{2}}{2}$$

By manipulating the DCT formulas so that the cosine constants are isolated, it is possible to use highly parallel accumulations when calculating the FDCT and the IDCT. Additionally, by grouping functions which use the same constant terms, it is possible to perform highly parallel multiplications using the constant terms. The forward and inverse DCTs are dealt with separately as set forth by the following equations, where $\sigma$ is the forward DCT coefficient vector and T is the inverse DCT coefficient vector.

$$F_{uv} = \Sigma_k \sigma_k \cdot c_k$$

$$f_{ij} = \Sigma_k T_k \cdot c_k$$

The computation of the FDCT is set forth as follows. Notation for the matrix of data is indexed as a singly indexed vector as represented by the subscripts of X in FIG. 2. The first step in the FDCT is calculating the forward transform coefficient vectors $\sigma_0$ to $\sigma_{63}$ as follows.

$$\sigma_0 = f_6 - f_7 + f_9 - f_{14} + f_{18} - f_{21} + f_{27} - f_{28} - f_{35} + f_{36} - f_{42} + f_{45} - f_{49} + f_{54} - f_{56} + f_{63}$$

$$\sigma_1 = -f_2 + f_5 + f_8 - f_{15} - f_{19} + f_{20} - f_{25} + f_{26} + f_{30} - f_{33} - f_{38} + f_{43} - f_{44} + f_{48} + f_{55} - f_{61}$$

$$\sigma_2 = -f_1 + f_6 + f_{11} - f_{12} - f_{16} + f_{23} + f_{26} - f_{29} - f_{34} + f_{37} - f_{40} + f_{47} - f_{51} + f_{52} + f_{57} - f_{62}$$

$$\sigma_3 = -f_3 + f_4 + f_{10} - f_{13} - f_{17} + f_{22} + f_{24} - f_{31} - f_{32} + f_{39} + f_{41} - f_{46} - f_{50} + f_{53} + f_{59} - f_{60}$$

$$\sigma_4 = f_8 - f_9 - f_{10} + f_{11} + f_{12} - f_{13} - f_{14} + f_{15} + f_{16} - f_{17} - f_{18} + f_{19} + f_{20} - f_{21} - f_{22} + f_{23} - f_{40} + f_{41} + f_{42} - f_{43} - f_{44} + f_{45} + f_{46} - f_{47} - f_{48} + f_{49} + f_{50} - f_{51} - f_{52} + f_{53} + f_{54} - f_{55}$$

$$\sigma_5 = f_8 - f_{10} + f_{11} + f_{12} - f_{13} - f_{14} + f_{15} + f_{16} - f_{17} + f_{18} - f_{19} - f_{20} + f_{21} + f_{22} - f_{23} + f_{40} - f_{41} - f_{42} + f_{43} + f_{44} - f_{45} - f_{46} + f_{47} - f_{48} + f_{49} + f_{50} - f_{51} - f_{52} + f_{53} + f_{54} - f_{55}$$

$$\sigma_6 = f_0 - f_1 - f_2 + f_3 + f_4 - f_5 - f_6 + f_7 - f_{48} + f_{49} + f_{50} - f_{51} - f_{52} + f_{53} + f_{54} - f_{55}$$

$$\sigma_7 = f_0 - f_1 - f_2 + f_3 + f_4 - f_5 - f_6 + f_7 + f_{24} - f_{25} - f_{26} + f_{27} + f_{28} - f_{29} - f_{30} + f_{31} + f_{56} - f_{57} - f_{58} + f_{59} + f_{60} - f_{61} - f_{62} + f_{63}$$

$$\sigma_8 = f_1 + f_2 - f_5 - f_6 - f_9 - f_{10} + f_{13} + f_{14} - f_{17} - f_{18} + f_{21} + f_{22} + f_{25} + f_{26} - f_{29} - f_{30} + f_{31} - f_{32} + f_{33} + f_{34} - f_{37} - f_{38} + f_{41} + f_{42} - f_{45} - f_{46} + f_{57} + f_{58} - f_{61} - f_{62}$$

$$\sigma_9 = f_1 - f_2 - f_5 + f_6 - f_9 + f_{10} + f_{13} - f_{14} + f_{17} - f_{18} - f_{21} + f_{22} + f_{25} - f_{26} - f_{29} + f_{30} - f_{33} + f_{34} + f_{37} - f_{38} + f_{41} - f_{42} - f_{45} + f_{46} - f_{49} + f_{50} + f_{53} - f_{54} + f_{57} + f_{58} - f_{61} - f_{62}$$

$$\sigma_{10} = f_0 + f_3 - f_4 - f_7 - f_8 - f_{11} + f_{12} + f_{15} + f_{16} + f_{19} - f_{20} - f_{23} - f_{24} + f_{27} + f_{28} - f_{31} + f_{32} + f_{35} - f_{36} - f_{39} + f_{40} + f_{43} - f_{44} - f_{47} - f_{48} - f_{51} + f_{52} + f_{55} + f_{56} + f_{59} - f_{60} - f_{63}$$

$$\sigma_{11} = f_0 + f_3 + f_4 - f_7 - f_8 + f_{11} + f_{12} - f_{15} - f_{16} + f_{19} + f_{20} - f_{23} + f_{24} - f_{27} + f_{28} - f_{31} + f_{32} - f_{35} + f_{36} + f_{39} + f_{40} - f_{43} - f_{44} + f_{47} - f_{48} + f_{51} + f_{52} - f_{55} + f_{56} - f_{59} + f_{60} - f_{63}$$

$$\sigma_{12} = f_6 + f_7 + f_{10} + f_{11} - f_{12} - f_{13} - f_{18} - f_{19} + f_{20} + f_{21} - f_{24} - f_{25} + f_{30} + f_{31} - f_{32} - f_{33} + f_{38} + f_{39} - f_{42} - f_{43} + f_{44} + f_{45} + f_{50} + f_{51} - f_{52} - f_{53} + f_{56} + f_{57} - f_{62} - f_{63}$$

$$\sigma_{13} = f_6 + f_7 - f_6 - f_7 + f_8 + f_{10} - f_{12} - f_{13} - f_{15} + f_{17} + f_{19} - f_{20} - f_{22} + f_{26} - f_{27} + f_{28} - f_{29} - f_{62} + f_{63}$$
$$f_{36} + f_{37} - f_{41} - f_{43} + f_{44} - f_{46} - f_{48} - f_{50} + f_{53} + f_{55} - f_{56} - f_{57} + f_{62} + f_{63}$$

$$\sigma_{14} = f_1 + f_2 - f_5 - f_6 + f_8 + f_{11} + f_{12} - f_{15} - f_{16} + f_{19} + f_{20} - f_{23} - f_{23} + f_{26} + f_{29} - f_{30} - f_{33} + f_{34} + f_{35}$$
$$f_{37} + f_{38} - f_{40} - f_{43} - f_{44} - f_{48} - f_{51} + f_{52} + f_{55} + f_{56} - f_{59} - f_{58} - f_{61} + f_{62}$$

$$\sigma_{15} = f_2 + f_3 - f_4 - f_5 + f_9 - f_{11} + f_{12} - f_{14} - f_{15} + f_{16} + f_{18} - f_{21} - f_{23} + f_{24} + f_{25} - f_{30} - f_{31} + f_{32}$$
$$f_{38} + f_{39} - f_{40} + f_{42} - f_{45} - f_{47} - f_{49} - f_{51} + f_{52} - f_{54} - f_{58} + f_{59} + f_{60} + f_{61}$$

$$\sigma_{16} = f_0 - f_3 - f_4 + f_7 + f_8 - f_{11} - f_{12} + f_{15} + f_{17} - f_{18} + f_{22} - f_{21} + f_{22} + f_{25} - f_{26} - f_{29} + f_{30}$$
$$f_{33} + f_{34} + f_{37} - f_{38} - f_{41} + f_{42} + f_{45} + f_{46} - f_{48} - f_{51} + f_{52} - f_{55} - f_{56} + f_{59} + f_{60} - f_{63}$$

$$\sigma_{17} = f_0 - f_3 + f_4 + f_7 - f_9 + f_{10} - f_{14} - f_{16} + f_{18} + f_{21} - f_{23} - f_{25} + f_{26} + f_{27} - f_{28} + f_{31}$$
$$f_{37} + f_{38} + f_{40} + f_{43} - f_{44} - f_{47} - f_{49} + f_{50} + f_{53} + f_{54} - f_{56} - f_{57} + f_{59} + f_{60} - f_{63} - f_{34}$$

$$\sigma_{18} = f_1 - f_2 - f_5 + f_6 + f_8 - f_{11} - f_{13} + f_{14} + f_{16} - f_{19} + f_{21} + f_{22} - f_{24} - f_{27} + f_{28} + f_{31}$$
$$f_{32} + f_{35} + f_{36} - f_{39} + f_{41} - f_{42} - f_{45} + f_{46} - f_{48} + f_{51} - f_{55} - f_{57} + f_{58} - f_{61} - f_{62}$$

$$\sigma_{19} = f_1 - f_2 - f_5 + f_6 + f_9 + f_{10} + f_{13} - f_{14} - f_{17} + f_{18} + f_{21} - f_{22} - f_{26} + f_{27} + f_{28} - f_{31} + f_{32}$$
$$f_{36} + f_{39} - f_{40} + f_{43} - f_{44} + f_{47} + f_{49} - f_{50} - f_{53} + f_{54} - f_{57} + f_{58} + f_{61} - f_{62}$$

$$\sigma_{20} = f_2 - f_3 + f_4 - f_5 + f_8 - f_{11} + f_{14} - f_{15} - f_{16} + f_{17} - f_{22} + f_{23} - f_{26} + f_{27} - f_{28} + f_{29} + f_{34} + f_{35}$$
$$f_{36} + f_{37} - f_{40} + f_{41} - f_{46} + f_{47} + f_{48} - f_{49} + f_{54} - f_{55} + f_{58} - f_{59} + f_{60} - f_{61}$$

$$\sigma_{21} = f_0 + f_1 - f_6 - f_7 + f_{10} - f_{11} + f_{12} + f_{13} + f_{16} - f_{17} - f_{22} + f_{23} + f_{25} - f_{27} + f_{28} - f_{30} - f_{31}$$
$$f_{36} - f_{38} + f_{40} + f_{41} - f_{46} + f_{47} - f_{50} - f_{52} - f_{53} - f_{56} - f_{58} + f_{61} + f_{63}$$

$$\sigma_{22} = f_6 - f_3 + f_4 - f_7 - f_9 - f_{10} + f_{13} + f_{14} + f_{17} - f_{18} + f_{21} - f_{22} + f_{24} + f_{27} - f_{28} - f_{31} - f_{32} - f_{35} + f_{36} + f_{39} - f_{41} + f_{42} - f_{45} + f_{46} + f_{49} + f_{50} - f_{53} - f_{54} - f_{56} + f_{59} - f_{60} + f_{63}$$

$$\sigma_{23} = -f_1 - f_3 + f_4 + f_6 + f_8 - f_9 - f_{14} - f_{15} - f_{18} + f_{19} - f_{20} + f_{21} - f_{24} - f_{26} + f_{29} + f_{31} + f_{32} - f_{62}$$
$$f_{37} - f_{39} + f_{42} - f_{45} - f_{48} - f_{49} + f_{54} + f_{55} + f_{57} + f_{59} - f_{60} - f_{62}$$

$$\sigma_{24} = f_6 - f_3 + f_4 + f_7 + f_9 - f_{10} - f_{13} + f_{14} + f_{17} + f_{18} + f_{21} - f_{22} - f_{24} + f_{27} + f_{28} - f_{31} -$$
$$f_{32} + f_{35} + f_{36} - f_{39} - f_{41} + f_{42} + f_{45} + f_{46} + f_{49} - f_{50} - f_{53} + f_{54} + f_{56} - f_{59} - f_{60} + f_{63}$$

$$\sigma_{25} = f_6 - f_2 + f_5 + f_7 + f_9 + f_{11} + f_{12} - f_{46} - f_{49} - f_{51} + f_{52} + f_{54} + f_{56} - f_{58} + f_{61} - f_{63}$$
$$f_{37} + f_{39} + f_{41} + f_{44} + f_{45} + f_{48} + f_{49} - f_{54} - f_{55} - f_{58} - f_{59} + f_{60} + f_{61}$$

$$\sigma_{26} = -f_2 - f_3 + f_4 + f_5 + f_8 + f_9 - f_{14} - f_{15} - f_{16} - f_{17} + f_{22} + f_{23} + f_{26} + f_{27} - f_{28} - f_{29} + f_{34} + f_{35} - f_{36} - f_{37} - f_{40} - f_{41} + f_{46} + f_{47} + f_{48} + f_{49} - f_{54} - f_{55} - f_{58} - f_{59} + f_{60} + f_{61}$$

$$\sigma_{27} = f_6 - f_1 + f_6 - f_7 - f_{10} + f_{11} - f_{12} + f_{13} + f_{18} - f_{19} + f_{20} - f_{21} - f_{24} + f_{25} - f_{30} + f_{31} -$$
$$f_{32} + f_{33} - f_{38} + f_{39} + f_{42} - f_{46} + f_{47} + f_{48} + f_{53} + f_{56} + f_{57} + f_{62} - f_{63}$$

$$\sigma_{28} = -f_1 - f_3 + f_4 - f_6 - f_8 - f_{10} + f_{13} + f_{15} + f_{16} + f_{18} - f_{21} - f_{23} - f_{25} + f_{27} - f_{59} + f_{60} - f_{62}$$
$$f_{36} + f_{38} - f_{40} + f_{42} - f_{45} - f_{47} - f_{48} - f_{50} + f_{53} + f_{55} + f_{57} + f_{59} + f_{60} - f_{62}$$

$$\sigma_{29} = -f_1 + f_3 - f_4 + f_6 + f_8 - f_9 + f_{14} + f_{15} - f_{18} + f_{19} - f_{20} + f_{21} + f_{24} - f_{26} + f_{29} - f_{31} - f_{32} + f_{34} + f_{36} - f_{62}$$
$$f_{37} + f_{39} - f_{42} + f_{45} + f_{48} + f_{49} - f_{54} - f_{55} + f_{57} + f_{59} - f_{60} - f_{62}$$

$$\sigma_{30} = f_6 + f_3 - f_4 + f_7 + f_{10} + f_{13} + f_{14} - f_{17} + f_{18} + f_{21} + f_{22} + f_{24} - f_{27} + f_{28} + f_{31} + f_{32} - f_{35} - f_{36} - f_{59} + f_{60} + f_{63}$$
$$f_{35} + f_{36} - f_{39} + f_{41} - f_{42} - f_{45} - f_{46} + f_{49} + f_{50} - f_{53} - f_{54} - f_{56} - f_{59} + f_{60} + f_{63}$$

$$\sigma_{31} = f_6 + f_2 - f_5 - f_7 - f_{10} + f_{11} - f_{12} + f_{13} - f_{16} + f_{17} - f_{22} + f_{23} - f_{25} - f_{27} - f_{28} + f_{31} + f_{32} + f_{56} - f_{38} + f_{40} + f_{41} - f_{46} - f_{47} + f_{50} - f_{53} - f_{54} - f_{56} - f_{58} + f_{61} + f_{63}$$

$$\sigma_{32} = -f_1 + f_2 + f_3 - f_6 - f_9 + f_{10} + f_{13} - f_{14} + f_{16} - f_{19} - f_{20} + f_{23} + f_{24} - f_{27} - f_{28} + f_{31} -$$
$$f_{32} + f_{35} + f_{36} - f_{39} - f_{40} + f_{43} + f_{44} - f_{47} + f_{49} - f_{50} - f_{53} + f_{54} - f_{58} - f_{61} + f_{62}$$

$$\sigma_{33} = f_1 + f_2 + f_5 - f_6 + f_8 - f_{11} - f_{12} + f_{15} - f_{17} + f_{18} + f_{21} - f_{22} - f_{24} + f_{27} + f_{28} - f_{31} + f_{32} - f_{35} -$$
$$f_{36} + f_{39} + f_{41} - f_{42} - f_{45} + f_{46} - f_{48} + f_{51} + f_{52} - f_{55} + f_{57} - f_{58} - f_{61} + f_{62}$$

$$\sigma_{34} = f_0 - f_3 - f_4 - f_7 - f_9 + f_{10} - f_{13} - f_{14} - f_{16} - f_{19} - f_{20} - f_{23} - f_{25} - f_{26} - f_{29} - f_{30} - f_{34} -$$
$$f_{37} + f_{38} + f_{40} - f_{43} - f_{44} + f_{47} + f_{49} + f_{50} + f_{53} + f_{54} + f_{56} + f_{59} + f_{60} - f_{63}$$

$$\sigma_{35} = f_0 - f_3 - f_4 + f_7 - f_8 + f_{11} + f_{12} - f_{15} + f_{17} + f_{18} + f_{21} - f_{22} - f_{25} - f_{26} - f_{29} - f_{30} -$$
$$f_{33} + f_{34} + f_{37} + f_{41} - f_{42} - f_{45} + f_{46} + f_{48} - f_{51} - f_{52} + f_{55} + f_{56} + f_{59} + f_{60} - f_{63}$$

$$\sigma_{36} = -f_1 + f_2 + f_5 - f_6 + f_8 - f_{11} - f_{12} + f_{15} - f_{16} + f_{19} + f_{20} - f_{23} + f_{25} - f_{26} + f_{29} + f_{30} -$$
$$f_{37} + f_{38} - f_{40} + f_{43} + f_{44} - f_{47} - f_{51} - f_{52} + f_{55} + f_{56} - f_{59} + f_{60} + f_{33} - f_{34}$$

$$\sigma_{37} = f_2 - f_3 + f_4 - f_5 - f_9 + f_{10} - f_{12} + f_{15} - f_{16} + f_{19} + f_{20} - f_{23} + f_{24} - f_{25} + f_{30} + f_{31} + f_{33} -$$
$$f_{38} - f_{39} + f_4 - f_{42} - f_{45} + f_{47} - f_{48} + f_{51} + f_{52} - f_{55} + f_{57} - f_{58} - f_{61} + f_{62}$$

$$\sigma_{38} = -f_1 + f_2 - f_5 + f_6 + f_8 - f_{11} + f_{12} - f_{15} - f_{16} + f_{19} - f_{20} + f_{23} - f_{25} + f_{26} - f_{29} + f_{30} -$$
$$f_{34} + f_{37} - f_{38} + f_4 - f_{41} - f_{44} + f_{47} - f_{48} + f_{51} - f_{52} + f_{55} + f_{57} - f_{58} + f_{61} - f_{62}$$

$$\sigma_{39} = f_1 - f_2 + f_3 - f_4 - f_6 + f_8 - f_{11} + f_{13} - f_{14} + f_{17} + f_{18} - f_{21} + f_{23} - f_{25} + f_{27} + f_{28} - f_{31} + f_{32} - f_{35} -$$
$$f_{34} + f_{37} + f_{38} - f_4 - f_{42} - f_{45} + f_{47} + f_{48} - f_{50} + f_{53} + f_{55} + f_{57} + f_{59} - f_{60} - f_{62}$$

$$\sigma_{40} = f_0 - f_3 - f_4 - f_7 - f_8 + f_{11} + f_{12} - f_{15} + f_{17} + f_{18} + f_{19} - f_{20} - f_{22} + f_{26} - f_{27} + f_{28} + f_{29} + f_{33} -$$
$$f_{35} + f_{36} - f_{38} + f_{40} - f_{42} - f_{45} + f_{47} + f_{49} - f_{51} - f_{53} + f_{55} + f_{57} + f_{59} - f_{62} - f_{63}$$

$$\sigma_{41} = f_0 + f_2 + f_4 + f_6 - f_7 + f_9 + f_{11} + f_{13} + f_{14} - f_{17} - f_{19} - f_{20} + f_{22} + f_{24} - f_{26} - f_{29} + f_{31} + f_{32} -$$
$$f_{34} + f_{37} + f_{39} - f_{41} + f_4 - f_{44} + f_{46} + f_{49} - f_{51} + f_{52} - f_{54} + f_{56} + f_{58} + f_{61} + f_{63}$$

$$\sigma_{42} = f_0 - f_1 - f_2 + f_3 + f_4 - f_5 - f_6 + f_7 - f_8 + f_9 + f_{10} - f_{11} - f_{12} + f_{13} + f_{14} - f_{15} - f_{16} + f_{17} + f_{18} -$$
$$f_{19} - f_{20} + f_{21} + f_{22} - f_{23} + f_{24} - f_{25} - f_{26} + f_{27} + f_{28} - f_{29} - f_{30} + f_{31} + f_{32} - f_{33} -$$
$$f_{34} + f_{35} + f_{36} - f_{37} - f_{38} + f_{39} - f_{40} + f_{41} + f_{42} - f_{43} - f_{44} + f_{45} + f_{46} - f_{47} - f_{48} + f_{49} + f_{50} -$$
$$f_{51} - f_{52} + f_{53} + f_{54} - f_{55} + f_{56} - f_{57} - f_{58} + f_{59} + f_{60} - f_{61} - f_{62} + f_{63}$$

$$\sigma_{43} = f_0 - f_1 + f_2 - f_3 - f_4 + f_5 - f_6 + f_7 - f_8 - f_9 + f_{10} + f_{11} + f_{12}13 + f_{14} - f_{15} - f_{16} + f_{17} + f_{18} -$$
$$f_{19} - f_{20} + f_{21} + f_{22} - f_{23} - f_{24} + f_{25} - f_{26} + f_{27} - f_{28} - f_{29} + f_{30} + f_{31} - f_{32} - f_{33} -$$
$$f_{34} + f_{35} + f_{36} - f_{37} - f_{38} + f_{39} + f_{40} - f_{41} - f_{42} + f_{43} + f_{44} - f_{45} + f_{46} - f_{47} + f_{48} -$$
$$f_{49} + f_{50} + f_{51} + f_{52} - f_{53} - f_{54} + f_{55} + f_{56} - f_{57} - f_{58} + f_{59} - f_{60} + f_{61} + f_{62} + f_{63}$$

$$\sigma_{44} = f_0 + f_1 + f_2 - f_3 - f_4 + f_5 + f_6 - f_7 + f_8 + f_9 - f_{10} - f_{11} + f_{12} + f_{13} + f_{14} - f_{15} - f_{16} + f_{17} -$$
$$f_{18} + f_{19} + f_{20} - f_{21} + f_{22} - f_{23} + f_{24} + f_{25} - f_{26} - f_{27} + f_{28} + f_{29} - f_{30} + f_{31} + f_{32} - f_{33} + f_{34} -$$
$$f_{35} + f_{36} + f_{37} - f_{38} - f_{39} + f_{40} + f_{41} - f_{42} + f_{43} + f_{44} - f_{45} + f_{46} - f_{47} - f_{48} + f_{49} -$$
$$f_{50} + f_{51} + f_{52} - f_{53} - f_{54} + f_{55} + f_{56} - f_{57} + f_{58} - f_{59} - f_{60} + f_{61} + f_{62} + f_{63}$$

$$\sigma_{45} = f_0 + f_1 - f_2 - f_3 - f_4 + f_5 + f_6 + f_7 - f_8 - f_9 + f_{10} + f_{11} + f_{12} - f_{13} - f_{14} - f_{15} - f_{16} -$$
$$f_{17} + f_{18} + f_{19} - f_{20} - f_{21} - f_{22} - f_{23} + f_{24} + f_{25} - f_{26} - f_{27} + f_{28} - f_{29} + f_{30} + f_{31} + f_{32} + f_{33} -$$
$$f_{34} - f_{35} + f_{36} + f_{37} - f_{38} - f_{39} + f_{40} - f_{41} + f_{42} + f_{43} + f_{44} - f_{45} + f_{46} - f_{47} - f_{48} -$$
$$f_{49} + f_{50} + f_{51} + f_{52} - f_{53} - f_{54} + f_{55} + f_{56} - f_{57} - f_{58} + f_{59} + f_{60} - f_{61} + f_{62} + f_{63}$$

$$\sigma_{46} = f_0 + f_1 - f_2 - f_3 + f_4 - f_5 - f_6 + f_7 + f_8 - f_9 - f_{10} + f_{11} + f_{12} - f_{13} - f_{14} + f_{15} - f_{16} + f_{17} + f_{18} -$$
$$f_{19} - f_{20} + f_{21} + f_{22} - f_{23} + f_{24} - f_{25} - f_{26} + f_{27} + f_{28} - f_{29} - f_{30} + f_{31} + f_{32} + f_{33} + f_{34} - f_{35} -$$
$$f_{36} + f_{37} + f_{38} - f_{39} - f_{40} + f_{41} + f_{42} - f_{43} - f_{44} + f_{45} + f_{46} - f_{47} + f_{48} -$$
$$f_{49} + f_{50} + f_{51} + f_{52} - f_{53} + f_{54} + f_{55} + f_{56} - f_{57} - f_{58} + f_{59} + f_{60} - f_{61} - f_{62} + f_{63}$$

$$\sigma_{47} = f_0 - f_1 - f_2 + f_3 + f_4 - f_5 - f_6 + f_7 - f_8 + f_9 + f_{10} - f_{11} - f_{12} + f_{13} + f_{14} - f_{15} + f_{16} - f_{17} - f_{18} + \\ f_{19} + f_{20} - f_{21} - f_{22} + f_{23} - f_{24} + f_{25} + f_{26} - f_{27} - f_{28} + f_{29} + f_{30} - f_{31} - f_{32} + f_{33} + f_{34} - f_{35} - \\ f_{36} + f_{37} + f_{38} - f_{39} + f_{40} - f_{41} - f_{42} + f_{43} + f_{44} - f_{45} - f_{46} + f_{47} - f_{48} + f_{49} + f_{50} - f_{51} - f_{52} + \\ f_{53} + f_{54} - f_{55} + f_{56} - f_{57} - f_{58} + f_{59} + f_{60} - f_{61} - f_{62} + f_{63}$$

$$\sigma_{48} = f_0 + f_1 - f_2 - f_3 - f_4 - f_5 + f_6 + f_7 + f_8 - f_9 + f_{10} - f_{11} - f_{12} + f_{13} - f_{14} + f_{15} - f_{16} + f_{17} - f_{18} + \\ f_{19} + f_{20} - f_{21} + f_{22} - f_{23} - f_{24} - f_{25} + f_{26} + f_{27} + f_{28} + f_{29} - f_{30} - f_{31} - f_{32} - \\ f_{33} + f_{34} + f_{35} - f_{36} + f_{37} - f_{38} - f_{39} - f_{40} + f_{41} - f_{42} + f_{43} + f_{44} + f_{45} - f_{46} - f_{47} + f_{48} - \\ f_{49} + f_{50} - f_{51} + f_{52} - f_{53} - f_{54} - f_{55} + f_{56} + f_{57} - f_{58} + f_{59} - f_{60} - f_{61} + f_{62} + f_{63}$$

$$\sigma_{49} = f_{24} + f_{25} + f_{26} + f_{27} + f_{28} + f_{29} + f_{30} + f_{31} - f_{32} - f_{33} - f_{34} - f_{35} - f_{36} - f_{37} - f_{38} - f_{39} -$$

$$\sigma_{50} = f_{16} + f_{17} + f_{18} + f_{19} + f_{20} + f_{21} + f_{22} + f_{23} - f_{40} - f_{41} - f_{42} - f_{43} - f_{44} - f_{45} - f_{46} - f_{47} -$$

$$\sigma_{51} = f_8 + f_9 + f_{10} + f_{11} + f_{12} + f_{13} + f_{14} + f_{15} - f_{48} - f_{49}50 - f_{51} - f_{52} - f_{53} - f_{54} - f_{55} -$$

$$\sigma_{52} = f_0 + f_1 + f_2 + f_3 + f_4 + f_5 + f_6 + f_7 - f_{56} - f_{57} - f_{58} - f_{59} - f_{60} - f_{61} - f_{62} - f_{63}$$

$$\sigma_{53} = f_2 - f_3 - f_4 + f_5 + f_{10} - f_{11} - f_{12} + f_{13} + f_{18} - f_{19} - f_{20} + f_{21} + f_{26} - f_{27} - f_{28} + f_{29} + \\ f_{34} - f_{35} - f_{36} + f_{37} + f_{42} - f_{43} - f_{44} + f_{45} + f_{50} - f_{51} - f_{52} + f_{53} + f_{58} - f_{59} - f_{60} + f_{61}$$

$$\sigma_{54} = f_1 - f_6 - f_9 + f_{14} + f_{17} - f_{22} - f_{25} + f_{30} + f_{33} - f_{38} - f_{41} + f_{46} + f_{49} - f_{54} - f_{57} + f_{62}$$

$$\sigma_{55} = f_0 - f_7 - f_8 + f_{15} + f_{16} - f_{23} - f_{24} + f_{31} + f_{32} - f_{39} - f_{40} + f_{47} + f_{48} - f_{55} - f_{56} + f_{63}$$

$$\sigma_{56} = f_8 + f_9 + f_{10} + f_{11} + f_{12} + f_{13} + f_{14} + f_{15} - f_{16} - f_{17} - f_{18} - f_{19} - f_{20} - f_{21} - f_{22} - f_{23}$$

$$\sigma_{57} = f_0 + f_1 + f_2 + f_3 + f_4 + f_5 + f_6 + f_7 - f_{24} - f_{25} - f_{26} - f_{27} - f_{28} - f_{29} - f_{30} - f_{31} + \\ f_{42} - f_{43} - f_{44} - f_{45} - f_{46} - f_{47} + f_{48} + f_{49} + f_{50} + f_{51} + f_{52} + f_{53} + f_{54} + f_{55}$$

$$\sigma_{58} = f_0 + f_1 + f_2 + f_3 + f_4 + f_5 + f_6 + f_7 + f_{24} + f_{25} + f_{26} + f_{27} + f_{28} + f_{29} + f_{30} - f_{31} - f_{32} - f_{33} - f_{34} - \\ f_{35} - f_{36} - f_{37} - f_{38} - f_{39} + f_{56} + f_{57} + f_{58} + f_{59} + f_{60} + f_{61} + f_{62} + f_{63}$$

$$\sigma_{59} = f_1 - f_2 - f_5 + f_6 + f_9 - f_{10} - f_{13} + f_{14} + f_{17} - f_{18} - f_{21} + f_{22} + f_{25} - f_{26} - f_{29} + f_{30} + f_{33} - f_{34} -$$
$$f_{37} + f_{38} + f_{41} - f_{42} - f_{45} + f_{46} + f_{49} - f_{50} + f_{53} - f_{54} + f_{57} - f_{58} - f_{61} + f_{62}$$
$$\sigma_{60} = f_0 - f_3 - f_4 + f_7 + f_8 - f_{11} - f_{12} + f_{15} + f_{16} - f_{19} - f_{20} + f_{23} + f_{24} - f_{27} - f_{28} + f_{31} + f_{32} - f_{35} -$$
$$f_{36} + f_{39} + f_{40} - f_{43} - f_{44} + f_{47} + f_{48} - f_{51} + f_{52} + f_{55} + f_{56} - f_{59} - f_{60} + f_{63}$$
$$\sigma_{61} = f_0 + f_1 + f_2 + f_3 + f_4 + f_5 + f_6 + f_7 - f_8 - f_9 - f_{10} - f_{11} - f_{12} - f_{13} - f_{14} - f_{15} - f_{16} - f_{17} - f_{18} -$$
$$f_{19} - f_{20} - f_{21} - f_{22} - f_{23} + f_{24} + f_{25} + f_{26} + f_{27} + f_{28} + f_{29} + f_{30} + f_{31} + f_{32} +$$
$$f_{33} + f_{34} + f_{35} + f_{36} + f_{37} + f_{38} + f_{39} - f_{40} - f_{41} - f_{42} - f_{43} - f_{44} - f_{45} - f_{46} - f_{47} - f_{48} -$$
$$f_{49} - f_{50} - f_{51} - f_{52} - f_{53} - f_{54} - f_{55} + f_{56} + f_{57} + f_{58} + f_{59} + f_{60} + f_{61} + f_{62} + f_{63}$$
$$\sigma_{62} = f_0 - f_1 - f_2 + f_3 + f_4 - f_5 - f_6 + f_7 + f_8 - f_9 - f_{10} + f_{11} + f_{12} - f_{13} - f_{14} + f_{15} + f_{16} - f_{17} -$$
$$f_{18} + f_{19} + f_{20} - f_{21} - f_{22} + f_{23} + f_{24} - f_{25} - f_{26} + f_{27} + f_{28} - f_{29} - f_{30} + f_{31} - f_{32} - f_{33} -$$
$$f_{34} + f_{35} + f_{36} - f_{37} - f_{38} + f_{39} + f_{40} - f_{41} - f_{42} + f_{43} + f_{44} - f_{45} - f_{46} + f_{47} + f_{48} - f_{49} -$$
$$f_{50} + f_{51} + f_{52} - f_{53} - f_{54} + f_{55} + f_{56} - f_{57} - f_{58} + f_{59} + f_{60} - f_{61} - f_{62} + f_{63}$$
$$\sigma_{63} = f_0 + f_1 + f_2 + f_3 + f_4 + f_5 + f_6 + f_7 + f_8 + f_9 + f_{10} + f_{11} + f_{12} + f_{13} + f_{14} + f_{15} + f_{16} + f_{17} + f_{18} +$$
$$f_{19} + f_{20} + f_{21} + f_{22} + f_{23} + f_{24} + f_{25} + f_{26} + f_{27} + f_{28} + f_{29} + f_{30} + f_{31} + f_{32} + f_{33} + f_{34} +$$
$$f_{35} + f_{36} + f_{37} + f_{38} + f_{39} + f_{40} + f_{41} + f_{42} + f_{43} + f_{44} + f_{45} + f_{46} + f_{47} + f_{48} + f_{49} + f_{50} + f_{51} +$$
$$f_{52} + f_{53} + f_{54} + f_{55} + f_{56} + f_{57} + f_{58} + f_{59} + f_{60} + f_{61} + f_{62} + f_{63}$$

After the forward transform coefficient vectors are calculated, these transform coefficient vectors are used to generate the FDCT frequency matrix as follows, where $r_i = c^* c_4$.

$F_0 = c_0 \cdot \sigma_{63}$
$F_1 = r_1 \cdot \sigma_{56} + r_3 \cdot \sigma_{55} + r_5 \cdot \sigma_{54} + r_7 \cdot \sigma_{53}$
$F_2 = r_2 \cdot \sigma_{60} + r_6 \cdot \sigma_{59}$
$F_3 = -r_1 \cdot \sigma_{54} + r_3 \cdot \sigma_{56} - r_5 \cdot \sigma_{53} - r_7 \cdot \sigma_{55}$
$F_4 = r_4 \cdot \sigma_{62}$
$F_5 = -r_1 \cdot \sigma_{55} + r_3 \cdot \sigma_{53} + r_5 \cdot \sigma_{56} + r_7 \cdot \sigma_{54}$
$F_6 = -r_2 \cdot \sigma_{59} + r_6 \cdot \sigma_{60}$
$F_7 = -r_1 \cdot \sigma_{53} + r_3 \cdot \sigma_{54} - r_5 \cdot \sigma_{55} + r_7 \cdot \sigma_{56}$
$F_8 = r_1 \cdot \sigma_{52} + r_3 \cdot \sigma_{51} + r_5 \cdot \sigma_{50} + r_7 \cdot \sigma_{49}$
$F_9 = c_0 \cdot \sigma_0 + c_2 \cdot \sigma_{13} + c_4 \cdot \sigma_{14} + c_6 \cdot \sigma_{15}$
$F_{10} = c_1 \cdot \sigma_{16} + c_3 \cdot \sigma_{17} + c_5 \cdot \sigma_{18} + c_7 \cdot \sigma_{19}$
$F_{11} = c_0 \cdot \sigma_1 + c_2 \cdot \sigma_{21} + c_4 \cdot \sigma_{22} + c_6 \cdot \sigma_{23}$
$F_{12} = c_1 \cdot \sigma_4 + c_3 \cdot \sigma_7 + c_5 \cdot \sigma_6 + c_7 \cdot \sigma_5$
$F_{13} = c_0 \cdot \sigma_2 + c_2 \cdot \sigma_{29} + c_4 \cdot \sigma_{30} + c_6 \cdot \sigma_{31}$
$F_{14} = c_1 \cdot \sigma_{32} + c_3 \cdot \sigma_{33} + c_5 \cdot \sigma_{34} + c_7 \cdot \sigma_{35}$
$F_{15} = c_0 \cdot \sigma_3 + c_2 \cdot \sigma_{37} + c_4 \cdot \sigma_{38} + c_6 \cdot \sigma_{40}$
$F_{16} = r_2 \cdot \sigma_{58} + r_6 \cdot \sigma_{57}$
$F_{17} = c_1 \cdot \sigma_{12} + c_3 \cdot \sigma_{41} + c_5 \cdot \sigma_{39} + c_7 \cdot \sigma_{20}$
$F_{18} = c_0 \cdot \sigma_{24} + c_4 \cdot \sigma_{48}$
$F_{19} = c_1 \cdot \sigma_{25} + c_3 \cdot \sigma_{26} + c_5 \cdot \sigma_{27} + c_7 \cdot \sigma_{28}$
$F_{20} = c_2 \cdot \sigma_{46} + c_6 \cdot \sigma_{47}$
$F_{21} = -c_1 \cdot \sigma_{28} + c_3 \cdot \sigma_{27} - c_5 \cdot \sigma_{26} + c_7 \cdot \sigma_{25}$
$F_{22} = c_0 \cdot \sigma_{36} + c_4 \cdot \sigma_{43}$
$F_{23} = c_1 \cdot \sigma_{20} - c_3 \cdot \sigma_{39} + c_5 \cdot \sigma_{41} - c_7 \cdot \sigma_{12}$
$F_{24} = -r_1 \cdot \sigma_{50} + r_3 \cdot \sigma_{52} - r_5 \cdot \sigma_{49} - r_7 \cdot \sigma_{51}$
$F_{25} = -c_0 \cdot \sigma_2 + c_2 \cdot \sigma_{31} + c_4 \cdot \sigma_{30} - c_6 \cdot \sigma_{29}$
$F_{26} = c_1 \cdot \sigma_{34} - c_3 \cdot \sigma_{32} + c_5 \cdot \sigma_{35} + c_7 \cdot \sigma_{33}$
$F_{27} = c_0 \cdot \sigma_0 - c_2 \cdot \sigma_{15} - c_4 \cdot \sigma_{14} + c_6 \cdot \sigma_{13}$
$F_{28} = c_1 \cdot \sigma_6 - c_3 \cdot \sigma_4 + c_5 \cdot \sigma_5 + c_7 \cdot \sigma_7$
$F_{29} = -c_0 \cdot \sigma_3 + c_2 \cdot \sigma_{40} + c_4 \cdot \sigma_{38} - c_6 \cdot \sigma_{37}$
$F_{30} = -c_1 \cdot \sigma_{18} + c_3 \cdot \sigma_{16} - c_5 \cdot \sigma_{19} - c_7 \cdot \sigma_{17}$
$F_{31} = -c_0 \cdot \sigma_1 + c_2 \cdot \sigma_{23} + c_4 \cdot \sigma_{22} - c_6 \cdot \sigma_{21}$
$F_{32} = r_4 \cdot \sigma_{61}$
$F_{33} = c_1 \cdot \sigma_8 + c_3 \cdot \sigma_{10} + c_5 \cdot \sigma_{11} + c_7 \cdot \sigma_9$
$F_{34} = c_2 \cdot \sigma_{45} + c_6 \cdot \sigma_{44}$
$F_{35} = c_1 \cdot \sigma_{11} - c_3 \cdot \sigma_8 + c_5 \cdot \sigma_9 + c_7 \cdot \sigma_{10}$
$F_{36} = c_0 \cdot \sigma_{42}$
$F_{37} = c_1 ! \sigma_{10} - c_3 \cdot \sigma_9 - c_5 \cdot \sigma_8 - c_7 \cdot \sigma_{11}$
$F_{38} = c_2 \cdot \sigma_{44} - c_6 \cdot \sigma_{45}$
$F_{39} = -c_1 \cdot \sigma_9 + c_3 \cdot \sigma_{11} - c_5 \cdot \sigma_{10} + c_7 \cdot \sigma_8$
$F_{40} = -r_1 \cdot \sigma_{51} + r_3 \cdot \sigma_{49} + r_5 \cdot \sigma_{52} + r_7 \cdot \sigma_{50}$
$F_{41} = -c_0 \cdot \sigma_1 - c_2 \cdot \sigma_{23} + c_4 \cdot \sigma_{22} + c_6 \cdot \sigma_{21}$
$F_{42} = -c_1 \cdot \sigma_{33} + c_3 \cdot \sigma_{35} + c_5 \cdot \sigma_{32} + c_7 \cdot \sigma_{34}$
$F_{43} = c_0 \cdot \sigma_3 + c_2 \cdot \sigma_{40} - c_4 \cdot \sigma_{38} - c_6 \cdot \sigma_{37}$
$F_{44} = c_1 \cdot \sigma_7 - c_3 \cdot \sigma_5 - c_5 \cdot \sigma_4 - c_7 \cdot \sigma_6$
$F_{45} = c_0 \cdot \sigma_0 + c_2 \cdot \sigma_{15} - c_4 \cdot \sigma_{14} - c_6 \cdot \sigma_{13}$
$F_{46} = c_1 \cdot \sigma_{17} - c_3 \cdot \sigma_{19} - c_5 \cdot \sigma_{16} - c_7 \cdot \sigma_{18}$
$F_{47} = c_0 \cdot \sigma_2 + c_2 \cdot \sigma_{31} - c_4 \cdot \sigma_{30} - c_6 \cdot \sigma_{29}$
$F_{48} = -r_2 \cdot \sigma_{57} + r_6 \cdot \sigma_{58}$
$F_{49} = -c_1 \cdot \sigma_{26} + c_3 \cdot \sigma_{28} + c_5 \cdot \sigma_{25} + c_7 \cdot \sigma_{27}$
$F_{50} = -c_0 \cdot \sigma_{36} + c_4 \cdot \sigma_{43}$
$F_{51} = -c_1 \cdot \sigma_{39} + c_3 \cdot \sigma_{12} - c_5 \cdot \sigma_{20} - c_7 - \sigma_{41}$
$F_{52} = c_2 \cdot \sigma_{47} - c_6 \cdot \sigma_{46}$
$F_{53} = c_1 \cdot \sigma_{41} - c_3 \cdot \sigma_{20} - c_5 \cdot \sigma_{12} - c_7 \cdot \sigma_{39}$
$F_{54} = c_0 \cdot \sigma_{24} - c_4 \cdot \sigma_{48}$
$F_{55} = c_1 \cdot \sigma_{27} - c_3 \cdot \sigma_{25} + c_5 \cdot \sigma_{28} + c_7 \cdot \sigma_{26}$
$F_{56} = -r_1 \cdot \sigma_{49} + r_3 \cdot \sigma_{50} - r_5 \cdot \sigma_{51} + r_7 \cdot \sigma_{52}$
$F_{57} = -c_0 \cdot \sigma_3 + c_2 \cdot \sigma_{37} - c_4 \cdot \sigma_{38} + c_6 \cdot \sigma_{40}$
$F_{58} = c_1 \cdot \sigma_{19} - c_3 \cdot \sigma_{18} + c_5 \cdot \sigma_{17} - c_7 \cdot \sigma_{16}$
$F_{59} = c_0 \cdot \sigma_2 - c_2 \cdot \sigma_{29} + c_4 \cdot \sigma_{30} - c_6 \cdot \sigma_{31}$
$F_{60} = -c_1 \cdot \sigma_5 + c_3 \cdot \sigma_6 - c_5 \cdot \sigma_7 + c_7 \cdot \sigma_4$
$F_{61} = -c_0 \cdot \sigma_1 + c_2 \cdot \sigma_{21} - c_4 \cdot \sigma_{22} + c_6 \cdot \sigma_{23}$
$F_{62} = c_1 \cdot \sigma_{35} - c_3 \cdot \sigma_{34} + c_5 \cdot \sigma_{33} - c_7 \cdot \sigma_{32}$
$F_{63} = c_0 \cdot \sigma_0 - c_2 \cdot \sigma_{13} + c_4 \cdot \sigma_{14} - c_6 \cdot \sigma_{15}$ More specifically, a spacial matrix of data elements is provided to forward accumulators 22, which calculate the forward coefficient vectors, the matrix of multiplier circuits 24 multiply the forward coefficient vectors by the constants $c_0$ to $c_7$ and $r_0$ to $r_7$ to generate transform products. Output accumulators 26 accumulate the transform products and provide a frequency matrix of data elements which is the forward DCT of the input spacial data matrix.

Figure 2:
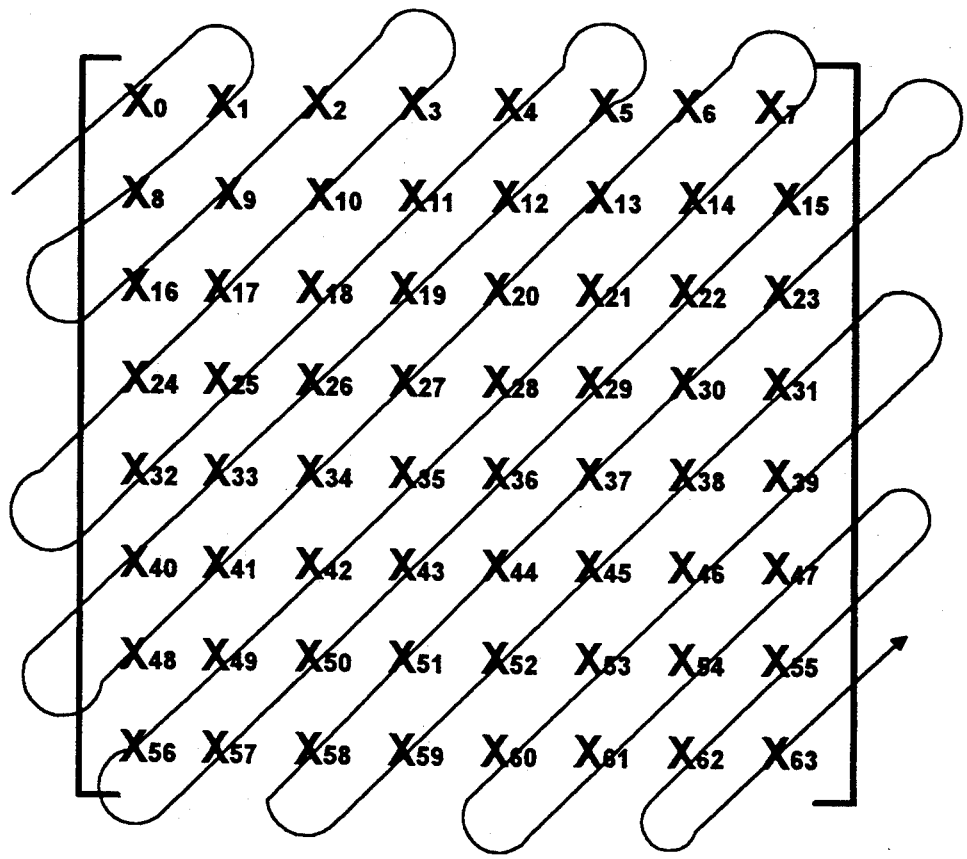
FIG. 2 shows an example of a matrix of data on which a DCT is performed.

DCT engine 20 receives two input data elements and provides two output data elements with each clock signal. The input data elements are ordered by rows left to right across the data matrix. However, the output data elements are ordered diagonally in conformance with the above-mentioned JPEG specifications. The arrowed line in FIG. 2 shows the order in which the output data elements are provided.

DCT engine 20 rises input accumulators 22, multipliers 24 and output accumulators 26 to perform the many calculations of a FDCT in parallel. These calculations are divided into discrete calculations which are performed during different cycles. It takes a total of 82 cycles to completely transform an 8×8 matrix from the cycle when the first location of input data is provided to DCT engine 20 until cycle when the last location of transformed data is output by DCT engine 20. Individual input accumulators 22 and output accumulators 26 maintain running totals as each new entry is accumulated during a cycle. After the value which an accumulator is calculating is complete, that value is provided to the next stage of DCT engine 20. The individual cycles of the FDCT are now discussed in detail.

During cycle 1, $f_1$ and $f_0$ are provided to the input bus. Additionally, IAdd(0), IAdd(6), IAdd(7), IAdd(10), IAdd(11), IAdd(12), IAdd(13), IAdd(16), IAdd(17), IAdd (21), IAdd (22), IAdd (24) IAdd (25), IAdd (27), IAdd (30), IAdd (31), IAdd (34), IAdd (35), IAdd (40), IAdd (41), IAdd (42), IAdd (43), IAdd (44), IAdd (45), IAdd (46), IAdd (47), IAdd (48), IAdd (52), IAdd (56), IAdd(58), IAdd(60), IAdd(61), IAdd(62) and IAdd(63) all add $f_0$, IAdd(8), IAdd(9), IAdd(12), IAdd(13), IAdd(14), IAdd(18), IAdd(19), IAdd(28), IAdd(39), IAdd(45), IAdd(48), IAdd(52) IAdd(55), IAdd(58), IAdd(59), IAdd(61) and IAdd(63) all add $f_1$, and IAdd(2), IAdd(6), IAdd (7), IAdd (23), IAdd (27), IAdd (29), IAdd (32), IAdd(33), IAdd(36), IAdd(38), IAdd(40), IAdd(42) IAdd(43), IAdd(44), IAdd(46), IAdd(47) and IAdd(62) all subtract $f_1$.

During cycle 2, $f_3$ and $f_2$ are provided to the input bus. Additionally, IAdd(8), IAdd(14), IAdd(15), IAdd(20), IAdd(31), IAdd(32), IAdd(33), IAdd(36), IAdd (37), IAdd (38), IAdd (41), IAdd (43) IAdd (44), IAdd(52), IAdd(54), IAdd(58), IAdd(61) and IAdd(63) all add $f_2$, IAdd(1), IAdd(6), IAdd(7), IAdd(9), IAdd(18), IAdd(19), IAdd(21), IAdd(25), IAdd(26), IAdd(42), IAdd (45), IAdd (46) IAdd (47), IAdd (48), IAdd (59) and IAdd(62) all subtract $f_2$, IAdd(6), IAdd(7), IAdd(10), IAdd (15), IAdd (29), IAdd (30), IAdd (39), IAdd (42), IAdd(46), IAdd(47), IAdd(52), IAdd(53)

IAdd(58), IAdd(61), IAdd(62) and IAdd(63) all add $f_3$, and IAdd(3), IAdd(11), IAdd(16), IAdd(17), IAdd(20), IAdd(22), IAdd (23), IAdd (24), IAdd (26), IAdd (28), IAdd (34), IAdd (35) IAdd (37), IAdd (43), IAdd (44), IAdd (45), IAdd(48) and IAdd(60) all subtract $f_3$.

During cycle 3, $f_5$ and $f_4$ are provided to the input bus. Additionally, IAdd (3), IAdd (6), IAdd (7), IAdd (11), IAdd (20), IAdd (22), IAdd (23), IAdd (26), IAdd (28), IAdd (37), IAdd (42), IAdd (46), IAdd (47), IAdd (52), IAdd (58), IAdd (61), IAdd (62) and IAdd (63) all add $f_4$, IAdd (10), IAdd(15), IAdd (16), IAdd (17), IAdd (24), IAdd (29), IAdd(30), IAdd(34), IAdd(35), IAdd(39), IAdd (43), IAdd (44), IAdd (45), IAdd (48), IAdd (53), and IAdd (60) all subtract $f_4$, IAdd (1), IAdd (9), IAdd(21), IAdd(25), IAdd (26), IAdd (32), IAdd (33), IAdd (36), IAdd (43), IAdd (44), IAdd (52), IAdd (58), IAdd (61) and IAdd (63) all add $f_5$, and IAdd (6), IAdd (7), IAdd(8), IAdd (14), IAdd (15), IAdd(18), IAdd(19), IAdd (20), IAdd (31), IAdd (37), IAdd (38), IAdd (41), IAdd (42), IAdd( 45), IAdd(46), IAdd(47), IAdd(48), IAdd (54), IAdd (59) and IAdd(62) all subtract $f_5$.

During cycle 4, $f_7$ and $f_6$ are provided to the input bus. Additionally, IAdd(2), IAdd(18, IAdd(19), IAdd (23), IAdd (27), IAdd(29), IAdd(38), IAdd(40), IAdd (45), IAdd (48), IAdd (52), IAdd (58), IAdd (59), IAdd (61) and IAdd (63) all add $f_6$, IAdd(6), IAdd(7), IAdd (8), IAdd(9), IAdd(12), IAdd(13), IAdd(14), IAdd (28), IAdd (32), IAdd (33), IAdd (36), IAdd (39), IAdd (42), IAdd(43), IAdd(44), IAdd(46), IAdd(47), IAdd (55) and IAdd(62) all subtract $f_6$, IAdd(6), IAdd(7), IAdd (16), IAdd (17), IAdd (24), IAdd (34), IAdd (35), IAdd (42), IAdd (43), IAdd (44), IAdd (45), IAdd (46), IAdd (47), IAdd (48), IAdd (52), IAdd (58), IAdd (60), IAdd (61), IAdd (62) and IAdd (63) all add $f_7$, and IAdd (0), IAdd (10), IAdd(11), IAdd(12), IAdd(13), IAdd(21), IAdd (22), IAdd(25), IAdd(27), IAdd(30), IAdd(31), IAdd (40), IAdd(41) and IAdd(56) all subtract $f_7$.

During cycle 5, $f_8$ and $f_9$ are provided to the input bus. Additionally IAdd (1), IAdd (4), IAdd (5), IAdd (13), IAdd (14), IAdd (16), IAdd (18), IAdd (20), IAdd (23), IAdd(26), IAdd(29), IAdd(33), IAdd(36), IAdd(38), IAdd(39), IAdd(46), IAdd(48), IAdd(51), IAdd(56), IAdd(57), IAdd(60), IAdd(62) and IAdd(63) all add $f_8$, IAdd (10), IAdd (11), IAdd (28), IAdd (35), IAdd (40), IAdd (42), IAdd (43), IAdd (44), IAdd (45), IAdd (47) and IAdd(61) all subtract $f_8$, IAdd(0), IAdd(15), IAdd(17), IAdd (23), IAdd (24), IAdd (26), IAdd (41), IAdd (42), IAdd (44), IAdd (47), IAdd (51), IAdd (55), IAdd (57), IAdd(59) and IAdd(63) all add $f_9$, and IAdd(4), IAdd(5), IAdd(8), IAdd(9), IAdd(19), IAdd(20), IAdd(22), IAdd(25), IAdd(29), IAdd(30), IAdd(32), IAdd(34), IAdd (37), IAdd (43), IAdd (45), IAdd (46), IAdd (48), IAdd(61) and IAdd(62) all subtract $f_9$.

During cycle 6, $f_{10}$ and $f_{11}$ are provided to the input bus. Additionally, IAdd (3), IAdd (9), IAdd (12), IAdd(13), IAdd(19), IAdd(30), IAdd(32), IAdd(34), IAdd (40), IAdd (42), IAdd (43), IAdd (45), IAdd (47), IAdd(48), IAdd(51), IAdd(54), IAdd(57) and IAdd(63) all add $f_{10}$, IAdd(4), IAdd(5), IAdd(8), IAdd(17), IAdd(21), IAdd (22), IAdd (24), IAdd (27), IAdd (28), IAdd (31), IAdd (39), IAdd (44), IAdd (46), IAdd (59), IAdd (61) and IAdd(62) all subtract $f_{10}$, IAdd(2), IAdd(4), IAdd(5), IAdd(11), IAdd(12), IAdd(14), IAdd(27), IAdd(31), IAdd (35), IAdd (43), IAdd (44), IAdd (45), IAdd (46), IAdd(51), IAdd (53), IAdd(57), IAdd(62) and IAdd(63) all add $f_{11}$, IAdd(10), IAdd(15), IAdd(16), IAdd(18), IAdd (21), IAdd (25), IAdd (33), IAdd (36), IAdd (37), IAdd (38), IAdd (41), IAdd (42), IAdd (47), IAdd (48), IAdd(60) and IAdd(61) all subtract $f_{11}$.

During cycle 7, $f_{12}$ and $f_{13}$ are provided to the input bus. Additionally, IAdd(4), IAdd(5), IAdd(10), IAdd(15), IAdd(21), IAdd(25), IAdd(35), IAdd(37), IAdd(38), IAdd(41), IAdd(43), IAdd(44), IAdd(45), IAdd(46), IAdd(51), IAdd(57), IAdd(62) and IAdd(63) all add $f_{12}$, IAdd(2), IAdd(11), IAdd(12), IAdd(14), IAdd(16), IAdd(18), IAdd(27), IAdd(31), IAdd(33), IAdd(36), IAdd(42), IAdd(47), IAdd(48), IAdd(53), IAdd(60) and IAdd(61) all subtract $f_{12}$, IAdd(8), IAdd(19), IAdd(21), IAdd(22), IAdd(27), IAdd(28), IAdd(31), IAdd(32), IAdd (34), IAdd (39), IAdd (42), IAdd (43), IAdd (45), IAdd(47), IAdd(48), IAdd(51), IAdd(57) and IAdd(63) all add $f_{13}$, IAdd(3), IAdd(4), IAdd(5), IAdd(9), IAdd(12), IAdd(13), IAdd(17), IAdd(24), IAdd(30), IAdd(40), IAdd(44), IAdd(46), IAdd(54), IAdd(59), IAdd(61) and IAdd (62) all subtract $f_{13}$.

During cycle 8, $f_{14}$ and $f_{15}$ are provided to the input bus. Additionally, IAdd (8), IAdd (9), IAdd (17), IAdd (20), IAdd (22), IAdd (24), IAdd (25), IAdd (29), IAdd (30), IAdd (37), IAdd (42), IAdd (44), IAdd (47), IAdd(51), IAdd(57), IAdd(59) and IAdd(63) all add $f_{14}$, IAdd(0), IAdd(4), IAdd(5), IAdd(15), IAdd(19), IAdd(23), IAdd (26), IAdd (32), IAdd (34), IAdd (41), IAdd (43), IAdd(45), IAdd(46), IAdd(48), IAdd(55), IAdd(61) and IAdd(62) all subtract $f_{14}$, IAdd(4), IAdd(5), IAdd(10), IAdd (11), IAdd (16), IAdd (18), IAdd (28), IAdd (33), IAdd (36), IAdd (40), IAdd (46), IAdd (48), IAdd (51), IAdd(57), IAdd(60), IAdd(62) and IAdd(63) all add $f_{15}$, and IAdd(1), IAdd(13), IAdd(14), IAdd(20), IAdd(23), IAdd(26), IAdd(29), IAdd(35), IAdd(38), IAdd(39), IAdd (42), IAdd (43), IAdd (44), IAdd (45), IAdd (47), IAdd(56) and IAdd(61) all subtract $f_{15}$.

During cycle 9, $f_{16}$ and $f_{17}$ are provided to the input bus. Additionally, IAdd(2), IAdd(4), IAdd(14), IAdd(15), IAdd(17), IAdd(19), IAdd(21), IAdd(28), IAdd(32), IAdd(37), IAdd(43), IAdd(47), IAdd(50), IAdd(56), IAdd(60), IAdd(62) and IAdd(63) all add $f_{16}$, IAdd (5), IAdd (10), IAdd (11), IAdd (20), IAdd (26), IAdd(31), IAdd(34), IAdd(36), IAdd(38), IAdd(39), IAdd (42), IAdd (44), IAdd (45), IAdd (46), IAdd (48), IAdd(57) and IAdd(61) all subtract $f_{16}$, IAdd(5), IAdd (13), IAdd (16), IAdd (20), IAdd (22), IAdd (25), IAdd (40), IAdd (42), IAdd (43), IAdd (44), IAdd (46), IAdd(48), IAdd(50), IAdd(55), IAdd(59) and IAdd(63) all add $f_{17}$, and IAdd (3), IAdd (4), IAdd (8), IAdd (9), IAdd (18), IAdd (21), IAdd (24), IAdd (26), IAdd (30), IAdd (31), IAdd (33), IAdd (35), IAdd (41), IAdd (45), IAdd(47), IAdd(57), IAdd(61) and IAdd(62) all subtract $f_{17}$.

During cycle 10, $f_{18}$ and $f_{19}$ are provided to the input bus. Additionally, IAdd ( 0), IAdd (5), IAdd (9), IAdd(18), IAdd(24), IAdd(27), IAdd(28), IAdd(29), IAdd (33), IAdd (35), IAdd (37), IAdd (39), IAdd (42), IAdd(45) IAdd(46), IAdd(50), IAdd(54) and IAdd(63) all add $f_{18}$, IAdd(4), IAdd(8), IAdd(12), IAdd(15), IAdd(16), IAdd(22), IAdd(23), IAdd(30), IAdd(43), IAdd(44), IAdd(47), IAdd(48), IAdd(57), IAdd(59), IAdd(61) and IAdd (62) all subtract $f_{18}$, IAdd (4), IAdd (11), IAdd (13), IAdd (23), IAdd (25), IAdd (29), IAdd (34), IAdd (36), IAdd (41), IAdd (44), IAdd (45), IAdd (47), IAdd (48), IAdd(50), IAdd(53), IAdd(62) and IAdd(63) all add $f_{19}$, and IAdd (1), IAdd (5), IAdd (10), IAdd (12), IAdd (14), IAdd(17), IAdd(19), IAdd(27), IAdd(32), IAdd(38), IAdd (40), IAdd (42), IAdd (43), IAdd (46), IAdd (57), IAdd(60) and IAdd(61) all subtract $f_{19}$.

During cycle 11, $f_{20}$ and $f_{21}$ are provided to the input bus. Additionally, IAdd (4), IAdd (10), IAdd (12), IAdd (14), IAdd (27), IAdd (34), IAdd (36), IAdd (38), IAdd (40), IAdd (44), IAdd (45), IAdd (47), IAdd (48), IAdd(50), IAdd(62) and IAdd(63) all add $f_{20}$, IAdd(5), IAdd(11), IAdd(13), IAdd(17), IAdd(19), IAdd(23), IAdd (25), IAdd (29), IAdd (32), IAdd (41), IAdd (42), IAdd(43), IAdd(46), IAdd(53), IAdd(57), IAdd(60) and IAdd(61) all subtract $f_{20}$, IAdd(5), IAdd(8), IAdd(12), IAdd(15), IAdd(18), IAdd(22), IAdd(23), IAdd(24), IAdd (3 0), IAdd (33), IAdd (35), IAdd (42), IAdd (45), IAdd(46), IAdd(50) and IAdd(63) all add $f_{21}$, and IAdd(0), IAdd(4), IAdd(9), IAdd(16), IAdd(27), IAdd(28), IAdd (29), IAdd (37), IAdd (39), IAdd (43), IAdd (44), IAdd(47), IAdd(48), IAdd(54), IAdd(57), IAdd(59), IAdd (61) and IAdd (62) all subtract $f_{21}$.

During cycle 12, $f_{22}$ and $f_{23}$ are provided to the input bus. Additionally, IAdd (3), IAdd (5), IAdd (8), IAdd (9), IAdd (16), IAdd (21), IAdd (26), IAdd (30), IAdd (31), IAdd (41), IAdd (42), IAdd (43), IAdd (44), IAdd(46), IAdd(48), IAdd(50), IAdd(59) and IAdd(63) all add $f_{22}$, IAdd (4), IAdd (13), IAdd (18), IAdd (20), IAdd (22), IAdd (24), IAdd (25), IAdd (33), IAdd (35), IAdd (40), IAdd(45), IAdd(47), IAdd(55), IAdd(57), IAdd(61) and IAdd (62) all subtract $f_{22}$, IAdd (4), IAdd (10), IAdd (11), IAdd(17), IAdd(19), IAdd(20), IAdd(26), IAdd(31), IAdd((32), IAdd(38), IAdd(39), IAdd(43), IAdd(47), IAdd(50), IAdd(60), IAdd(62) and IAdd(63) all add $f_{23}$, and IAdd (2), IAdd (5), IAdd (14), IAdd (15), IAdd (21), IAdd (28), IAdd (34), IAdd (36), IAdd (37), IAdd (42), IAdd (44), IAdd (45), IAdd (46), IAdd (48), IAdd (56), IAdd(57) and IAdd(61) all subtract $f_{23}$.

During cycle 13, $f_{24}$ and $f_{25}$ are provided to the input bus. Additionally, IAdd(3), IAdd(7), IAdd(10), IAdd(11), IAdd(15), IAdd(18), IAdd(22), IAdd(29), IAdd(32), IAdd(42), IAdd(44), IAdd(45), IAdd(49), IAdd(56), IAdd(60), IAdd(61), IAdd(62) and IAdd(63) all add $f_{24}$, IAdd(6), IAdd(12), IAdd(19), IAdd(23), IAdd(24), IAdd (25), IAdd (27), IAdd (30), IAdd (33), IAdd (37), IAdd (41), IAdd (43), IAdd (46), IAdd (47), IAdd (48) and IAdd(58) all subtract $f_{24}$, IAdd(6), IAdd(8), IAdd(9), IAdd (14), IAdd (16), IAdd (21), IAdd (27), IAdd (35), IAdd (3 6), IAdd (38), IAdd (43), IAdd (45), IAdd (4 6), IAdd (47), IAdd (49), IAdd (55), IAdd (59), IAdd (61) and IAdd(63) all add $f_{25}$, and IAdd(1), IAdd(7), IAdd(12), IAdd(15), IAdd(17), IAdd(28), IAdd(31), IAdd(34), IAdd (37), IAdd (39), IAdd (42), IAdd (44), IAdd (48), IAdd (58) and IAdd (62) all subtract $f_{25}$.

During cycle 14, $f_{26}$ and $f_{27}$ are provided to the input bus. Additionally, IAdd(2), IAdd(6), IAdd(8), IAdd(13), IAdd(17), IAdd(25), IAdd(26), IAdd(34), IAdd(38), IAdd(44), IAdd(46), IAdd(47), IAdd(48), IAdd(49), IAdd(54), IAdd(61) and IAdd(63) all add $f_{26}$, IAdd(0), IAdd(7), IAdd(10), IAdd(19), IAdd(20), IAdd (22), IAdd (24), IAdd (26), IAdd (28), IAdd (30), IAdd (33), IAdd (42), IAdd (43), IAdd (48), IAdd (49), IAdd(53), IAdd(61), IAdd(62) and IAdd(63) all add $f_{27}$, and IAdd (6), IAdd (11), IAdd (13), IAdd (18), IAdd (21), IAdd (31), IAdd (32), IAdd (39), IAdd (40), IAdd (44), IAdd(45), IAdd(46), IAdd(47), IAdd(58) and IAdd(60) all subtract $f_{27}$.

During cycle 15, $f_{28}$ and $f_{29}$ are provided to the input bus. Additionally, IAdd(7), IAdd(11), IAdd(13), IAdd(19), IAdd(21), IAdd(24), IAdd(31), IAdd(33), IAdd(39), IAdd(40), IAdd(42), IAdd(43), IAdd(48), IAdd(49), IAdd(61), IAdd(62) and IAdd(63) all add $f_{28}$, IAdd (0), IAdd (6), IAdd (10), IAdd (18), IAdd (20), IAdd(22), IAdd(26), IAdd(28), IAdd(30), IAdd(32), IAdd (44), IAdd (45), IAdd (46), IAdd (47), IAdd (53) IAdd (58) and IAdd (60) all subtract $f_{28}$, IAdd(6), IAdd(9), IAdd (14), IAdd (17), IAdd (20), IAdd (23), IAdd (29), IAdd (34), IAdd (40), IAdd (41), IAdd (44), IAdd (46), IAdd(47), IAdd(48), IAdd(49), IAdd(61) and IAdd(63) all add $f_{29}$, and IAdd(2), IAdd(7), IAdd(8), IAdd(13), IAdd (16), IAdd (25), IAdd (26), IAdd (35), IAdd (36), IAdd (38), IAdd (42), IAdd (43), IAdd (45), IAdd (54), IAdd(58), IAdd(59) and IAdd(62) all subtract $f_{29}$.

During cycle 16, $f_{30}$ and $f_{31}$ are provided to the input bus. Additionally, IAdd(1), IAdd(6), IAdd(12), IAdd(15), IAdd(16), IAdd(28), IAdd(31), IAdd(35), IAdd (36), IAdd (37), IAdd (39), IAdd (43), IAdd (45), IAdd (46), IAdd (47), IAdd (49), IAdd (59), IAdd (61) and IAdd(63) all add $f_{30}$, IAdd(7), IAdd(8), IAdd(9), IAdd (14), IAdd (17), IAdd (21), IAdd (27), IAdd (34), IAdd (38), IAdd (42), IAdd (44), IAdd (48), IAdd (55), IAdd(58) and IAdd(62) all subtract $f_{30}$, IAdd(7), IAdd(12), IAdd(18), IAdd(23), IAdd(25), IAdd(27), IAdd (30), IAdd (32), IAdd (37), IAdd (41), IAdd (42), IAdd(44), IAdd(45), IAdd(49), IAdd(60), IAdd(61), IAdd(62) and IAdd(63) all add $f_{31}$, and IAdd(3), IAdd(6), IAdd(10), IAdd(11), IAdd(15), IAdd(19), IAdd(22), IAdd (24), IAdd (29), IAdd (33), IAdd (43), IAdd (46), IAdd(47), IAdd(48), IAdd(56) and IAdd(58) all subtract $f_{31}$.

During cycle 17, $f_{32}$ and $f_{33}$ are provided to the input bus. Additionally, IAdd(6), IAdd(10), IAdd(11), IAdd(19), IAdd(23), IAdd(30), IAdd(33), IAdd(37), IAdd(42), IAdd(44), IAdd(45), IAdd(56), IAdd(60), IAdd(61), IAdd(62) and IAdd(63) all add $f_{32}$, IAdd(3), IAdd(7), IAdd(12), IAdd(15), IAdd(18), IAdd(22), IAdd (24), IAdd (25), IAdd (27), IAdd (29), IAdd (32), IAdd (41), IAdd (43), IAdd (46), IAdd (47), IAdd (48), IAdd(49) and IAdd(58) all subtract $f_{32}$, IAdd((1), IAdd(7), IAdd(8), IAdd(9), IAdd(15), IAdd(17), IAdd(27), IAdd (31), IAdd (34), IAdd (36), IAdd (37), IAdd (43), IAdd(45), IAdd(46), IAdd(47), IAdd(55), IAdd(59), IAdd(61) and IAdd(63) all add $f_{33}$, and IAdd(6), IAdd(12), IAdd (14), IAdd (16), IAdd (21), IAdd (28), IAdd (35), IAdd (38), IAdd (39), IAdd (42), IAdd (44), IAdd (48), IAdd(49), IAdd(58) and IAdd(62) all subtract $f_{33}$.

During cycle 18, $f_{35}$ and $f_{34}$ are provided to the input bus. Additionally, IAdd(7), IAdd(8), IAdd(14), IAdd (16), IAdd (23), IAdd (25), IAdd (2 6), IAdd (29), IAdd (35), IAdd (40), IAdd (44), IAdd (46), IAdd (47), IAdd (48), IAdd(54), IAdd(61) and IAdd(63) all add $f_{34}$, IAdd (2), IAdd (6), IAdd (9), IAdd (13), IAdd (17), IAdd (20), IAdd (34), IAdd (36), IAdd (38), IAdd (41), IAdd (42), IAdd (43), IAdd (45), IAdd (49), IAdd (58), IAdd (59) and IAdd(62) all subtract $f_{34}$, IAdd(6), IAdd (10), IAdd (13), IAdd (18), IAdd (20), IAdd (21), IAdd(24), IAdd(26), IAdd(28), IAdd(31), IAdd(32), IAdd (40), IAdd (42), IAdd (43), IAdd (48), IAdd (53), IAdd (61), IAdd(62) and IAdd(63) all add $f_{35}$, and IAdd(0), IAdd (7), IAdd(11), IAdd(19), IAdd(22), IAdd(30), IAdd (33), IAdd (39), IAdd (44), IAdd (45), IAdd (46), IAdd (47), IAdd(49), IAdd(58) and IAdd(60) all subtract $f_{35}$.

During cycle 19, $f_{37}$ and $f_{36}$ are provided to the input bus. Additionally, IAdd(0), IAdd(6), IAdd(11), IAdd (18), IAdd (22), IAdd (24), IAdd (30), IAdd (32), IAdd(39), IAdd(42), IAdd(43), IAdd(48), IAdd(61), IAdd(62) and IAdd(63) all add $f_{36}$, IAdd(7), IAdd(10), IAdd(13), IAdd(19), IAdd(20), IAdd(21), IAdd(26), IAdd (28), IAdd (31), IAdd (33), IAdd (40), IAdd (44), IAdd (45), IAdd (46), IAdd (47), IAdd (49), IAdd (53), IAdd(58) and IAdd(60) all subtract $f_{36}$, IAdd(2), IAdd(7), IAdd (9, IAdd (13), IAdd (16), IAdd (20), IAdd (35), IAdd (38), IAdd (41), IAdd (44), IAdd (46), IAdd (47), IAdd(48), IAdd(61) and IAdd(63) all add $f_{37}$, and IAdd(6), IAdd (8), IAdd (14), IAdd (17), IAdd (23), IAdd (25), IAdd (2 6), IAdd (29), IAdd (3 4), IAdd (36), IAdd (40), IAdd(42), IAdd(43), IAdd(45), IAdd(49), IAdd(54), IAdd (58), IAdd (59) and IAdd (62) all subtract $f_{37}$.

During cycle 20, $f_{39}$ and $f_{38}$ are provided to the input bus. Additionally, IAdd(7), IAdd(12), IAdd(14), IAdd (17), IAdd (21), IAdd (28), IAdd (34), IAdd (36), IAdd (38), IAdd (39), IAdd (43), IAdd (45), IAdd (46), IAdd(47), IAdd(59), IAdd(61) and IAdd(63) all add $f_{38}$, IAdd(1), IAdd(6), IAdd(8), IAdd(9), IAdd(15), IAdd(16), IAdd (27), IAdd (31), IAdd (35), IAdd (37), IAdd (42), IAdd(44), IAdd(48), IAdd(49), IAdd(55), IAdd(58) and IAdd(62) all subtract $f_{38}$, IAdd(3), IAdd(6), IAdd(12), IAdd(15), IAdd(19), IAdd(22), IAdd(25), IAdd(27), IAdd (29), IAdd (33), IAdd (41), IAdd (42), IAdd (44), IAdd(45), IAdd(60), IAdd(61), IAdd(62) and IAdd(63) all add $f_{39}$, and IAdd(7), IAdd(10), IAdd(11), IAdd(18), IAdd (23), IAdd (24), IAdd (30), IAdd (32), IAdd (37), IAdd (43), IAdd (46), IAdd (47), IAdd (48), IAdd (49), IAdd (56) and IAdd(58) all subtract $f_{39}$.

During cycle 21, $f_{40}$ and $f_{41}$ are provided to the input bus. Additionally, IAdd(5), IAdd(28), IAdd(31), IAdd (34), IAdd (38), IAdd (43), IAdd (47), IAdd (56), IAdd (60), IAdd (62) and IAdd (63) all add $f_{40}$, IAdd (2), IAdd(4), IAdd(10), IAdd(11), IAdd(14), IAdd(15), IAdd(17), IAdd(19), IAdd(20), IAdd(21), IAdd(26), IAdd (32), IAdd (36), IAdd (37), IAdd (39), IAdd (42), IAdd (44), IAdd (45), IAdd (46), IAdd (48), IAdd (50), IAdd(57) and IAdd(61) all subtract $f_{40}$, IAdd(3), IAdd(4), IAdd (18), IAdd (20), IAdd (21), IAdd (25), IAdd (30), IAdd (31), IAdd (33), IAdd (35), IAdd (42), IAdd (43), IAdd(44), IAdd(46), IAdd(48), IAdd(55), IAdd(59) and IAdd(63) all add $f_{41}$, and IAdd(5), IAdd(8), IAdd(9), IAdd(13), IAdd(16), IAdd(22), IAdd(24), IAdd(26), IAdd(40), IAdd(41), IAdd(45), IAdd(47), IAdd(50), IAdd(57), IAdd(61) and IAdd(62) all subtract $f_{41}$.

During cycle 22, $f_{42}$ and $f_{43}$ are provided to the input bus. Additionally, IAdd(4), IAdd(9), IAdd(15), IAdd (16), IAdd (22), IAdd (23), IAdd (24), IAdd (27), IAdd(28), IAdd(30), IAdd(39), IAdd(42), IAdd(45), IAdd(46), IAdd(54) and IAdd(63) all add $f_{42}$, IAdd(0), IAdd(5), IAdd(8), IAdd(12), IAdd(18), IAdd(29), IAdd (33), IAdd (35), IAdd (37), IAdd (43), IAdd (44), IAdd(47), IAdd(48), IAdd(50), IAdd(57), IAdd(59), IAdd(61) and IAdd(62) all subtract $f_{42}$, IAdd(1), IAdd(5), IAdd(11), IAdd(14), IAdd(17), IAdd(19), IAdd(25), IAdd (32), IAdd (36), IAdd (38), IAdd (40), IAdd (41), IAdd (44), IAdd (45), IAdd (47), IAdd (48), IAdd (53), IAdd (62) and IAdd (63) all add $f_{43}$, and IAdd (4), IAdd (10), IAdd(12), IAdd(13), IAdd(23), IAdd(27), IAdd(29), IAdd (34), IAdd (42), IAdd (43), IAdd (46), IAdd (50), IAdd(57), IAdd(60) and IAdd(61) all subtract $f_{43}$.

During cycle 23, $f_{45}$ and $f_{46}$ are provided to the input bus. Additionally, IAdd(5), IAdd(10), IAdd(12), IAdd(13), IAdd(17), IAdd(19), IAdd(23), IAdd(27), IAdd (29), IAdd (32), IAdd (36), IAdd (44), IAdd (45), IAdd (47), IAdd (48), IAdd (62) and IAdd (63) all add $f_{45}$, IAdd (1), IAdd (4), IAdd (11), IAdd (14), IAdd (25), IAdd (34), IAdd (38), IAdd (40), IAdd (41), IAdd (42), IAdd(43), IAdd(46), IAdd(50), IAdd(53), IAdd (57), IAdd(60) and IAdd(61) all subtract $f_{45}$, IAdd (0), IAdd (4), IAdd (8), IAdd (12), IAdd (16), IAdd (24), IAdd (29), IAdd (37), IAdd (42), IAdd (45), IAdd (46) and IAdd (63) all add $f_{45}$, IAdd (5), IAdd (9, IAdd (15), IAdd(18), IAdd(22), IAdd (23), IAdd (27), IAdd (28), IAdd (30), IAdd (33), IAdd (35), IAdd (39), IAdd (43), IAdd (44), IAdd(47), IAdd (48), IAdd (50), IAdd (54), IAdd (57), IAdd (59), IAdd(61) and IAdd(62) all subtract $f_{45}$.

During cycle 24, $f_{47}$ and $f_{46}$ are provided to the input bus. Additionally, IAdd (4), IAdd (8), IAdd (9), IAdd(13), IAdd(18), IAdd(22), IAdd(26), IAdd(33), IAdd (35), IAdd (40), IAdd (41), IAdd (42), IAdd (43), IAdd(44), IAdd(46), IAdd(48), IAdd(59) and IAdd(63) all add $f_{46}$, IAdd(3), IAdd(5), IAdd(16), IAdd(20), IAdd(21), IAdd (24), IAdd (25), IAdd (30), IAdd (31), IAdd (45), IAdd(47), IAdd(50), IAdd(55), IAdd(57), IAdd(61) and IAdd(62) all subtract $f_{46}$, IAdd(2), IAdd(5), IAdd(10), IAdd(11), IAdd(14), IAdd(15), IAdd(20), IAdd(21), IAdd (26, IAdd (34), IAdd (37), IAdd (39), IAdd (43), IAdd (47), IAdd (60), IAdd (62) and IAdd (63) all add $f_{47}$ and IAdd (4), IAdd (17), IAdd (19, IAdd(28), IAdd(31), IAdd (32), IAdd (36), IAdd (38), IAdd (42), IAdd (44), IAdd(45), IAdd(46), IAdd(48), IAdd(50), IAdd(56), IAdd(57) and IAdd(61) all subtract $f_{47}$.

During cycle 25, $f_{49}$ and $f_{48}$ are provided to the input bus. Additionally, IAdd(20), IAdd(26), IAdd(35), IAdd (36), IAdd (39), IAdd (40), IAdd (46), IAdd (48), IAdd(56), IAdd(57), IAdd(60), IAdd(62) and IAdd(63) all add $f_{48}$, IAdd(1), IAdd(4), IAdd(5), IAdd(10), IAdd(11), IAdd(13), IAdd(14), IAdd(16), IAdd(18), IAdd(23), IAdd(28), IAdd(29), IAdd(33), IAdd(3S), IAdd(42), IAdd (43), IAdd (44), IAdd (45), IAdd (47), IAdd (51) and IAdd(61) all subtract $f_{48}$, IAdd(4), IAdd(5), IAdd(19), IAdd (22), IAdd (24), IAdd (26), IAdd (29), IAdd (30), IAdd (32), IAdd (34), IAdd (37), IAdd (41), IAdd (42) IAdd (44), IAdd (47), IAdd (55), IAdd (57), IAdd (59 and IAdd (63) all add $f_{49}$, and IAdd (0), IAdd (8), IAdd (9), IAdd(15), IAdd(17), IAdd(20), IAdd(23), IAdd(25), IAdd (43), IAdd (45), IAdd (46), IAdd (48), IAdd (51), IAdd(61) and IAdd(62) all subtract $f_{49}$. Also, IAdd(49) provides $\sigma_{49}$ to Sbus(5).

During cycle 26, $f_{51}$ and $f_{50}$ are provided to the input bus. Additionally, IAdd(4), IAdd(5), IAdd(9), IAdd(12), IAdd(17), IAdd(21), IAdd(22), IAdd(31), IAdd (42), IAdd (43), IAdd (45), IAdd (47), IAdd (48), IAdd(54), IAdd(57) and IAdd(63) all add $f_{50}$, IAdd(3), IAdd (8), IAdd (13), IAdd (19), IAdd (24), IAdd (27), IAdd (28), IAdd (30), IAdd (32), IAdd (34), IAdd (39), IAdd (40), IAdd (44), IAdd (46), IAdd (51), IAdd (59), IAdd(61) and IAdd(62) all subtract $f_{50}$, IAdd(11), IAdd(12), IAdd(15), IAdd(16), IAdd(18), IAdd(21), IAdd (27), IAdd (33), IAdd (37), IAdd (38), IAdd (43), IAdd (44), IAdd (45), IAdd (46), IAdd (53), IAdd (57), IAdd (62) and IAdd (63) all add $f_{51}$, and IAdd (2), IAdd (4), IAdd (5), IAdd (10), IAdd (14), IAdd (25), IAdd (31), IAdd (35), IAdd (36), IAdd (41), IAdd (42), IAdd (47), IAdd(48), IAdd(51), IAdd(60) and IAdd(61) all subtract $f_{51}$. Also, Rmult(3) provides $f_3 \cdot \sigma_{49}$ to Pbus (6), Rmult (5) provides $r_5 \cdot \sigma_{49}$ to Pbus (5), Rmult (7) provides $r_7 \cdot \sigma_{49}$ to Pbus(4), Rmult(1) provides $r_1 \cdot \sigma_{49}$ to Pbus(3).

During cycle 27, $f_{53}$ and $f_{52}$ are provided to the input bus. Additionally, IAdd (2), IAdd (10, IAdd (14), IAdd (16), IAdd (18), IAdd (25), IAdd (31), IAdd (33), IAdd (41), IAdd (43), IAdd (44), IAdd (45), IAdd (46), IAdd(57), IAdd(62) and IAdd(63) all add $f_{52}$, IAdd(4), IAdd(5), IAdd(11), IAdd(12), IAdd(15), IAdd(21), IAdd (27), IAdd (35), IAdd (36), IAdd (37), IAdd (38), IAdd (42), IAdd (47), IAdd (48), IAdd (5 1), IAdd (53), IAdd(60) and IAdd(61) all subtract $f_{52}$, IAdd(3), IAdd(4), IAdd(5), IAdd(8), IAdd(13), IAdd(17), IAdd(27), IAdd (28), IAdd (30), IAdd (39), IAdd (40), IAdd (42), IAdd (43), IAdd (45), IAdd (47), IAdd (48), IAdd (57) and IAdd (63) all add $f_{53}$, and IAdd (9), IAdd (12), IAdd (19), IAdd (21), IAdd (22), IAdd (24), IAdd (31), IAdd (32), IAdd(34), IAdd(44), IAdd(46), IAdd(51), IAdd(54), IAdd(59), IAdd(61) and IAdd(62) all subtract $f_{53}$. Also, IAdd(50) provides $\sigma_{50}$ to Sbus(5).

During cycle 28, $f_{55}$ and $f_{54}$ are provided to the input bus. Additionally, IAdd(0), IAdd(4), IAdd(5), IAdd(8), IAdd(9), IAdd(15), IAdd(19), IAdd(20), IAdd (23), IAdd (24), IAdd(25), IAdd (32), IAdd(34), IAdd (42), IAdd (44), IAdd (47), IAdd (57), IAdd (59) and IAdd(63) all add $f_{54}$, IAdd(17), IAdd(22), IAdd(26), IAdd (29), IAdd (30), IAdd (37), IAdd (41), IAdd (43), IAdd (45), IAdd (46), IAdd (48), IAdd (51), IAdd (55), IAdd(61) and IAdd(62) all subtract $f_{54}$, IAdd(1), IAdd (10), IAdd (11), IAdd (13), IAdd (14), IAdd (23), IAdd(28), IAdd(29), IAdd(35), IAdd(36), IAdd(38), IAdd(46), IAdd(48), IAdd(57), IAdd(60), IAdd(62) and IAdd(63) all add $f_{55}$, and IAdd(4), IAdd(5), IAdd(16), IAdd (18), IAdd (20), IAdd (26), IAdd (33), IAdd (39), IAdd(40), IAdd(42), IAdd(43), IAdd(44), IAdd(45), IAdd(47), IAdd(51), IAdd(56) and IAdd(61) all subtract $f_{55}$. Also, Rmult(5) provides $r_5 \cdot \sigma_{50}$ to Pbus(6), Rmult(1) provides $r_1 \cdot \sigma_{50}$ to Pbus (5), Rmult (7) provides $r_7 \cdot \sigma_{50}$ to Pbus (4), and Rmult (3) provides $r_3 \cdot \sigma_{50}$ to Pbus (3).

During cycle 29, $f_{56}$ and $f_{57}$ are provided to the input bus. Additionally, IAdd (10), IAdd (11), IAdd (12), IAdd (24), IAdd (25), IAdd (27), IAdd (41), IAdd (421), IAdd (43), IAdd (44), IAdd (45), IAdd (46), IAdd (47), IAdd(48), IAdd(56), IAdd(58), IAdd(60), IAdd(61), IAdd(62) and IAdd(63) all add $f_{56}$, IAdd(0), IAdd(6), IAdd(7), IAdd(13), IAdd(16), IAdd(17), IAdd(21), IAdd (22), IAdd (30), IAdd (31), IAdd (34), IAdd (35), IAdd (40) and IAdd(52) all subtract $f_{56}$, IAdd(2), IAdd(6), IAdd(7), IAdd(8), IAdd(9), IAdd(12), IAdd(23), IAdd(28), IAdd(29), IAdd(32), IAdd(33), IAdd(38), IAdd(39), IAdd(40), IAdd(45), IAdd(48), IAdd(55), IAdd(58), IAdd(59), IAdd(61) and IAdd(63) all add $f_{57}$, and IAdd(13), IAdd(14), IAdd(18), IAdd(19), IAdd(27), IAdd (36), IAdd (42), IAdd (43), IAdd (44), IAdd (46), IAdd (47), IAdd (52) and IAdd (62) all subtract $f_{57}$. Also, IAdd (57) provides $\sigma_{57}$ to Sbus (5), IAdd (5) provides $\sigma_5$ to Sbus (4), IAdd (4) provides $\sigma_4$ to Sbus (3), and IAdd (51) provides $\sigma_{51}$ to Sbus (2).

During cycle 30, $f_{59}$ and $f_{58}$ are provided to the input bus. Additionally, IAdd(1), IAdd(6), IAdd(7), IAdd(8), IAdd(18), IAdd(19), IAdd(20), IAdd(21), IAdd(36), IAdd(41), IAdd(43), IAdd(44), IAdd(54), IAdd(58), IAdd(61) and IAdd(63) all add $f_{58}$, IAdd(9), IAdd(14), IAdd(15), IAdd(25), IAdd(26), IAdd(31), IAdd(32), IAdd (33), IAdd (37), IAdd (38), IAdd (42), IAdd (45), IAdd(46), IAdd(47), IAdd(48), IAdd(52), IAdd(59) and IAdd(62) all subtract $f_{58}$, IAdd(3), IAdd(10), IAdd(16), IAdd (17), IAdd (22), IAdd (23), IAdd (34), IAdd (35), IAdd (37), IAdd (39), IAdd (42), IAdd (46), IAdd (47), IAdd(53), IAdd(58), IAdd(61), IAdd(62) and IAdd(63) all add $f_{59}$, and IAdd(6), IAdd(7), IAdd(11), IAdd(15), IAdd(20), IAdd(24), IAdd(26), IAdd(28), IAdd(29), IAdd (30), IAdd (43), IAdd (44), IAdd (45), IAdd (4 8), IAdd(52) and IAdd(60) all subtract $f_{59}$. Also, Rmult(2) provides $r_2 \cdot \sigma_{57}$ to Pbus (6), Rmult (3) provides $r_3 \cdot \sigma_{51}$ to Pbus (5), Cmult (7) provides $c_7 \cdot \sigma_4$ to Pbus (4), Cmult (5) provides $c_5 \cdot \sigma_5$ to Pbus(3), Rmult(6) provides $r_6 \cdot \sigma_{57}$ to Pbus (2), Cmult (3) provides $c_3 \cdot \sigma_5$ to Pbus (1), Cmult (1) provides $c_1 \cdot \sigma_4$ to Pbus (0).

During cycle 31, $f_{61}$ and $_{60}$ are provided to the input bus. Additionally, IAdd(11), IAdd(15), IAdd(16), IAdd (17), IAdd (20), IAdd (26), IAdd (28), IAdd (29), IAdd (30), IAdd (34), IAdd (35), IAdd (42), IAdd (46), IAdd(47), IAdd(58), IAdd(61), IAdd(62) and IAdd(63) all add $f_{60}$, IAdd(31), IAdd(6), IAdd(7), IAdd(10), IAdd(22), IAdd (23), IAdd (24), IAdd (37), IAdd (39), IAdd (43), IAdd (44), IAdd (45), IAdd (48), IAdd (52), IAdd (53) and IAdd(60) all subtract $f_{60}$, IAdd(6), IAdd(7), IAdd(9), IAdd(14), IAdd(15), IAdd(18), IAdd(19), IAdd(25), IAdd (26), IAdd (31), IAdd (36), IAdd (37), IAdd (38), IAdd(43), IAdd(44), IAdd(58), IAdd(61) and IAdd(63) all add $_{61}$, and IAdd (1), IAdd (8), IAdd (20), IAdd (21), IAdd (32), IAdd (33), IAdd (41), IAdd (42), IAdd (45), IAdd(46), IAdd(47), IAdd(48), IAdd(52), IAdd(54), IAdd(59) and IAdd(62) all subtract $f_{61}$. Also, Cmult(1) provides $c_1 \cdot \sigma_5$ to Pbus (6), Cmult (5) provides $c_5 \cdot \sigma_4$ to Pbus(5), Rmult(5) provides $r_5 \cdot \sigma_{51}$ to Pbus(4), Cmult(7) provides $c_7 \cdot \sigma_5$ to Pbus(3), Rmult(1) provides $r_1 \cdot \sigma_{51}$ to Pbus(2), Cmult(3) provides $c_3 \cdot \sigma_4$ to Pbus(1), Rmult(7) provides $r_7 \cdot \sigma_{51}$ to Pbus (0).

During cycle 32, $f_{63}$ and $f_{62}$ are provided to the input bus. Additionally, IAdd(6), IAdd(7), IAdd(13), IAdd (14), IAdd (27), IAdd (32), IAdd (33), IAdd (45), IAdd(48), IAdd(58), IAdd(59), IAdd(61) and IAdd(63) all add $f_{62}$, IAdd (2), IAdd (8), IAdd (9), IAdd (12), IAdd (18), IAdd(19), IAdd(23), IAdd(28), IAdd(29), IAdd(36), IAdd(38), IAdd(39), IAdd(40), IAdd(42), IAdd (43), IAdd (44), IAdd (46), IAdd (47), IAdd (52), IAdd (55) and IAdd(62) all subtract $f_{62}$, IAdd(0), IAdd(13), IAdd(21), IAdd (22), IAdd (24), IAdd (30), IAdd (31), IAdd (40), IAdd (42), IAdd (43), IAdd (44), IAdd (45), IAdd (46), IAdd(47), IAdd(48), IAdd(58), IAdd(60), IAdd(61), IAdd(62) and IAdd(63) all add $f_{63}$, and IAdd(6), IAdd(7), IAdd(10), IAdd(11), IAdd(12), IAdd(16), IAdd(17), IAdd (25), IAdd (2 7), IAdd (34), IAdd (35), IAdd (41), IAdd(52) AND IAdd(56) all subtract $f_{63}$. Also, IAdd(37) provides $\sigma_{37}$ to Sbus(5), IAdd(53) provides $\sigma_{53}$ to Sbus(4), IAdd(54) provides $\sigma_{54}$ to Sbus(3), IAdd(15) provides $\sigma_{15}$ to Sbus (2), IAdd (3) provides $\sigma_3$ to Sbus (1), and IAdd (41) provides $\sigma_{41}$ to Sbus (0).

During cycle 33, IAdd(59) provides $\sigma_{59}$ to Sbus(5), IAdd(19) provides $\sigma_{19}$ to Sbus(4), IAdd(39) provides $\sigma_{39}$ to Sbus(3), IAdd(11) provides $\sigma_{11}$ to Sbus(2), IAdd(32) provides $\sigma_{32}$ to Sbus(1), and IAdd(35) provides $\sigma_{35}$ to Sbus(0). Additionally, Cmult(5) provides $c_5 \cdot \sigma_{41}$ to Pbus(6), Rmult(1) provides $r_1 \cdot \sigma_{53}$ to Pbus(5), Cmult(2) provides $c_2 \cdot \sigma_{37}$ to Pbus (4), Cmult (6) provides $c_6 \cdot \sigma_{15}$ to Pbus(3), Cmult(7) provides $c_7 \cdot \sigma_{41}$ to Pbus(2), Cmult(1) provides $c_1 \cdot \sigma_{41}$ to Pbus (1), and Rmult (3) provides $r_3 \cdot \sigma_{54}$ to Pbus (0).

During cycle 34, IAdd(45) provides $\sigma_{45}$ to Sbus(5), IAdd (20) provides $\sigma_{20}$ to Sbus (4), IAdd (7) provides $\sigma_7$ to Sbus (3), IAdd (13) provides $\sigma_{13}$ to Sbus (2), IAdd (28) provides $\sigma_{28}$ to Sbus (1), and IAdd (60) provides $\sigma_{60}$ to Sbus (0). Additionally, Cmult (1) provides $c_1 \cdot \sigma_{32}$ to Pbus (6), Rmult (7) provides $r_7 \cdot \sigma_{54}$ to Pbus (5), Cmult (3) provides $c_3 \cdot \sigma_{39}$ to Pbus (4), Cmult (7) provides $c_7 \cdot \sigma_{39}$ to Pbus(3), Rmult(3) provides $r_3 \cdot \sigma_{53}$ to Pbus(2), Cmult(5) provides $c_5 \cdot \sigma_{39}$ to Pbus (1), Rmult (6) provides $r_6 \cdot \sigma_{59}$ to Pbus (0).

During cycle 35, IAdd(29) provides $\sigma_{29}$ to Sbus(5), IAdd (55) provides $\sigma_{55}$ to Sbus (4), IAdd (8) provides $\sigma_8$ to Sbus (3), IAdd (18) provides $\sigma_{18}$ to Sbus (2), IAdd (12) provides $\sigma_{12}$ to Sbus (1), IAdd (58) provides $\sigma_{58}$ to Sbus (0). Additionally, Cmult(1) provides $c_1 \cdot \sigma_{39}$ to Pbus(6), Cmult(2) provides $c_2 \cdot \sigma_{13}$ to Pbus(5), Rmult(2) provides $r_2 \cdot \sigma_{59}$ to Pbus (4), Cmult (5) provides $c_5 \cdot \sigma_{19}$ to Pbus (3), Cmult (3) provides $c_3 \cdot \sigma_7$ to Pbus (2), Rmult (7) provides $r_7 \cdot \sigma_{53}$ to Pbus (1), and Cmult (6) provides $c_6 \cdot \sigma_{45}$ to Pbus (0).

During cycle 36, IAdd (3 3) provides $\sigma_{33}$ to Sbus (5), IAdd (36) provides $\sigma_{36}$ to Sbus (4), IAdd (2) provides $\sigma_2$ to Sbus(3), IAdd(16) provides $\sigma_{16}$ to Sbus(2), IAdd(22) provides $\sigma_{22}$ to Sbus(1), and IAdd(27) provides $\sigma_{27}$ to Sbus(0). Additionally, Cmult(1) provides $c_1 \cdot \sigma_8$ to Pbus (6), Cmult (7) provides $c_7 \cdot \sigma_{18}$ to Pbus (5), Cmult (3) provides $c_3 \cdot \sigma_{28}$ to Pbus (4), Rmult (6) provides $r_6 \cdot \sigma_{58}$ to Pbus (3), Cmult (5) provides $c_5 \cdot \sigma_{35}$ to Pbus (2), Rmult (2) provides $r_2 \cdot \sigma_{60}$ to Pbus (1), and Rmult (3) provides $r_3 \cdot \sigma_{55}$ to Pbus (0).

During cycle 37, IAdd(30) provides $\sigma_{30}$ to Sbus(5), IAdd (6) provides $\sigma_6$ to Sbus (4), IAdd (9) provides $\sigma_9$ to Sbus(3), IAdd(42) provides $\sigma_{42}$ to Sbus(2), IAdd(48) provides $\sigma_{48}$ to Sbus (1), and IAdd (46) provides $\sigma_{46}$ to Sbus(0). Additionally, Cmult(1) provides $c_1 \cdot \sigma_{19}$ to Pbus (6), Cmult (5) provides $c_5 \cdot \sigma_{12}$ to Pbus (5), Cmult (3) provides $c_3 \cdot \sigma_{12}$ to Pbus (4), Cmult (2) provides $c_2 \cdot \sigma_{45}$ to Pbus (3), Cmult (6) provides $c_6 \cdot \sigma_{29}$ to Pbus (2), Cmult (7) provides $c_7 \cdot \sigma_{16}$ to Pbus (1), and Rmult (1) provides $r_1 \cdot \sigma_{54}$ to Pbus (0).

During cycle 38, IAdd(26) provides $\sigma_{26}$ to Sbus(5), IAdd(17) provides $\sigma_{17}$ to Sbus(4), IAdd(62) provides $\sigma_{62}$ to Sbus(3), IAdd(1) provides $\sigma_1$ to Sbus(2), IAdd(25) provides $\sigma_{25}$ to Sbus(1), and IAdd(44) provides $\sigma_{44}$ to Sbus(0). Additionally, Cmult(0) provides $c_0 \cdot \sigma_2$ to Pbus(6), Cmult(1) provides $c_1 \cdot \sigma_{11}$ to Pbus(5), Cmult(3) provides $c_3 \cdot \sigma_{11}$ to Pbus(4), Cmult(0) provides $c_0 \cdot \sigma_3$ to Pbus(3), Cmult(5) provides $c_5 \cdot \sigma_{32}$ to Pbus(2), Cmult(4) provides $c_4 \cdot \sigma_{30}$ to Pbus(1), and Cmult(7) provides $c_7 \cdot \sigma_{33}$ to Pbus (0).

During cycle 39, IAdd (31) provides $\sigma_{31}$ to Sbus (5), IAdd (21) provides $\sigma_{21}$ to Sbus (4), IAdd (43) provides $\sigma_{43}$ to Sbus(3), IAdd(47) provides $\sigma_{47}$ to Sbus(2), IAdd(34) provides $\sigma_{34}$ to Sbus(1), and IAdd(63) provides $\sigma_{63}$ to Sbus(0). Additionally, Cmult(7) provides $c_7 \cdot \sigma_{20}$ to Pbus(6), Cmult(6) provides $c_6 \cdot \sigma_{13}$ to Pbus(5), Cmult(3) provides $c_3 \cdot \sigma_{17}$ to Pbus (4), Cmult (2) provides $c_2 \cdot \sigma_{46}$ to Pbus(3), Rmult(2) provides $r_2 \cdot \sigma_{58}$ to Pbus(2), Cmult(5) provides $c_5 \cdot \sigma_7$ to Pbus (1), Cmult (1) provides $c_1 \cdot \sigma_6$ to Pbus (0).

During cycle 40, IAdd(0) provides $\sigma_0$ to Sbus(5), IAdd (38) provides $\sigma_{38}$ to Sbus (4), IAdd (56) provides $\sigma_{56}$ to Sbus(3), IAdd(23) provides $\sigma_{23}$ to Sbus(2), IAdd(24) provides $\sigma_{24}$ to Sbus (1), and IAdd(61) provides $\sigma_{61}$ to Sbus(0). Additionally, Cmult(4) provides $c_4 \cdot \sigma_{48}$ to Pbus(6), Rmult(6) provides $r_6 \cdot \sigma_{60}$ to Pbus(5), Cmult(2) provides $c_2 \cdot \sigma_{47}$ to Pbus (4), Cmult (1) provides $c_1 \cdot \sigma_{17}$ to Pbus(3), Cmult(5) provides $c_5 \cdot \sigma_{27}$ to Pbus(2), Cmult(3) provides $c_3 \cdot \sigma_9$ to Pbus(1), and Cmult(7) provides $c_7 \sigma_{19}$ to Pbus (0).

During cycle 41, IAdd(52) provides $\sigma_{52}$ to Sbus(3), IAdd (14) provides $\sigma_{14}$ to Sbus (2), IAdd (40) provides $\sigma_{40}$ to Sbus (1), and IAdd (10) provides $\sigma_{10}$ to Sbus (0). Additionally, Cmult(3) provides $c_3 \cdot \sigma_{16}$ to Pbus(6), Cmult (7) provides $c_7 \cdot \sigma_{35}$ to Pbus (5), Cmult (1) provides $c_1 \cdot \sigma_{35}$ to Pbus(4), Cmult(6) provides $c_6 \cdot \sigma_{47}$ to Pbus(3), Cmult(0) provides $c_0 \cdot \sigma_{36}$ to Pbus(2), Cmult(2) provides $c_2 \cdot \sigma_{21}$ to Pbus (1), Cmult (0) provides $c_0 \cdot \sigma_1$ to Pbus (0).

During cycle 42, Cmult(1) provides $c_1 \cdot \sigma_{33}$ to Pbus(6), Cmult (5) provides $c_5 \cdot \sigma_8$ to Pbus (5), Cmult (0) provides $c_0 \cdot \sigma_{24}$ to Pbus (4), Cmult (3) provides $c_3 \cdot \sigma_{33}$ to Pbus (3), Cmult (0) provides $c_0 \cdot \sigma_0$ to Pbus (2), Cmult (7) provides $c_7 \cdot \sigma_{28}$ to Pbus (1), and Rmult (5) provides $r_5 \cdot \sigma_{56}$ to Pbus (0).

During cycle 43, Cmult(1) provides $c_1 \cdot \sigma_{26}$ to Pbus(6), Cmult (3) provides $c_3 \cdot \sigma_{18}$ to Pbus (5), Cmult (5) provides $c_5 \cdot \sigma_{33}$ to Pbus (4), Rmult (7) provides $r_7 \cdot \sigma_{52}$ to Pbus (3), Rmult (3) provides $r_3 \cdot \sigma_{52}$ to Pbus (2), Cmult (6) provides $c_6 \cdot \sigma_{21}$ to Pbus (1), and Cmult (7) provides $c_7 \cdot \sigma_{26}$ to Pbus (0).

During cycle 44, Cmult(7) provides $c_7 \cdot \sigma_9$ to Pbus(6), Cmult(3) provides $c_3 \cdot \sigma_6$ to Pbus(5), Cmult(4) provides $c_4 \cdot \sigma_{14}$ to Pbus(4), Cmult(5) provides $c_5 \cdot \sigma_6$ to Pbus (3), Cmult (1) provides $c_1 \cdot \sigma_9$ to Pbus (2), Cmult (6) provides $c_6 \cdot \sigma_{44}$ to Pbus(1), and Cmult(2) provides $c_2 \cdot \sigma_{15}$ to Pbus (0).

During cycle 45, Cmult(5) provides $c_5 \cdot \sigma_{16}$ to Pbus(6), Rmult(4) provides $r_4 \cdot \sigma_{61}$ to Pbus(5), Rmult(1) provides $r_1 \cdot \sigma_{52}$ to Pbus(4), Cmult(7) provides $c_7 \cdot \sigma_{12}$ to Pbus(3), Cmult (6) provides $c_6 \cdot \sigma_{23}$ to Pbus (2), Cmult (1) provides $c_1 \cdot \sigma_{25}$ to Pbus (1), and Cmult (2) provides $c_2 \cdot \sigma_{44}$ to Pbus (0).

During cycle 46, Rmult (4) provides $r_4 \cdot \sigma_{62}$ to Pbus (6), Cmult(2) provides $c_2 \cdot \sigma_{40}$ to Pbus(5), Cmult(5) provides $c_5 \cdot \sigma_{20}$ to Pbus (4), Cmult (3) provides $c_3 \cdot \sigma_{27}$ to Pbus (3), Cmult (4) provides $c_4 \cdot \sigma_{38}$ to Pbus (2), Cmult (7) provides $c_7 \cdot \sigma_7$ to Pbus(1), and Cmult(6) provides $c_6 \cdot \sigma_{31}$ to Pbus(0).

During cycle 47, Rmult(7) provides $r_7 \cdot \sigma_{55}$ to Pbus(6), Cmult(7) provides $c_7 \cdot \sigma_{25}$ to Pbus(5), Cmult(1) provides $c_1 \cdot \sigma_{20}$ to Pbus(4), Cmult(2) provides $c_2 \cdot \sigma_{29}$ to Pbus(3), Cmult (4) provides $c_4 \cdot \sigma_{22}$ to Pbus (2), Cmult (6) provides $c_6 \cdot \sigma_{40}$ to Pbus (1), and Cmult (3) provides $c_3 \cdot \sigma_8$ to Pbus (0).

During cycle 48, Cmult(5) provides $c_5 \cdot \sigma_9$ to Pbus (6), Rmult (5) provides $r_5 \cdot \sigma_{55}$ to Pbus (5), Cmult (1) provides $c_1 \cdot \sigma_{12}$ to Pbus (4), Cmult (2) provides $c_2 \cdot \sigma_{31}$ to Pbus (3), Cmult (3) provides $c_3 \cdot \sigma_{25}$ to Pbus (2), Rmult (7) provides $r_7 \cdot \sigma_{56}$ to Pbus (1), and Cmult (7) provides $c_7 \cdot \sigma_{34}$ to Pbus (0).

During cycle 49, Rmult(1) provides $r_1 \cdot \sigma_{56}$ to Pbus(6), Cmult (7) provides $c_7 \cdot \sigma_{17}$ to Pbus (5), Cmult (1) provides $c_1 \cdot \sigma_{28}$ to Pbus(4), Cmult(5) provides $c_5 \cdot \sigma_{28}$ to Pbus(3), Cmult (0) provides $c_0 \cdot \sigma_{42}$ to Pbus (2), Cmult (2) provides $c_2 \cdot c_{23}$ to Pbus (1), and Cmult (3) provides $c_3 \cdot \sigma_{19}$ to Pbus (0).

During cycle 50, Cmult(1) provides $c_1 \cdot \sigma_7$ to Pbus(6), Rmult(5) provides $r_5 \cdot \sigma_{54}$ to Pbus(5), Cmult(7) provides $c_7 \cdot \sigma_6$ to Pbus (4), Cmult (3) provides $c_3 \cdot \sigma_{34}$ to Pbus(3), Cmult(5) provides $c_5 \cdot \sigma_{34}$ to Pbus(2), Cmult(0) provides $c_0 \cdot \sigma_{63}$ to Pbus(1), and Cmult(6) provides $c_6 \cdot \sigma_{37}$ to Pbus (0).

During cycle 51, Cmult(5) provides $c_5 \cdot \sigma_{25}$ to Pbus(6), Cmult (4) provides $c_4 \cdot \sigma_{43}$ to Pbus (5), Cmult (6) provides $c_6 \cdot \sigma_{46}$ to Pbus (4), Cmult (1) provides $c_1 \cdot \sigma_{16}$ to Pbus (3), Cmult (3) provides $c_3 \cdot \sigma_{35}$ to Pbus (2), Rmult (1) provides $r_1 \cdot \sigma_{55}$ to Pbus (1), and Rmult (3) provides $r_3 \cdot \sigma_{56}$ to Pbus (0). Additionally, OAdd(1) and OAdd(0) provide $F_1$ and $F_0$ to the output bus.

During cycle 52, Cmult(5) provides $c_5 \cdot \sigma_{10}$ to Pbus(6), Cmult (1) provides $c_1 \cdot \sigma_{10}$ to Pbus (5), Cmult (7) provides $c_7 \cdot \sigma_{11}$ to Pbus (4), Rmult (5) provides $r_5 \cdot \sigma_{52}$ to Pbus (3), Cmult (1) provides $c_1 \cdot \sigma_{18}$ to Pbus (2), Cmult (5) provides $c_5 \cdot \sigma_{18}$ to Pbus(1), Cmult(3) provides $c_3 \cdot \sigma_{20}$ to Pbus(0). Additionally, OAdd(16) and OAdd(8) provide $F_{16}$ and $F_8$ to the output bus.

During cycle 53, Cmult(3) provides $c_3 \cdot \sigma_{10}$ to Pbus(6), Cmult (7) provides $C_7 \cdot \sigma_{10}$ to Pbus (5), Cmult (3) provides $c_3 \cdot \sigma_{26}$ to Pbus (4), Cmult (5) provides $c_5 \cdot \sigma_{11}$ to Pbus (3), Cmult (1) provides $c_1 \cdot \sigma_{34}$ to Pbus (2), Cmult (7) provides $c_7 \cdot \sigma_{27}$ to Pbus (1), Rmult (5) provides $r_5 \cdot \sigma_{53}$ to Pbus (0). Additionally, OAdd(9) and OAdd(2) provide $F_9$ and $F_2$ to the output bus.

During cycle 54, Cmult(7) provides $c_7 \cdot \sigma_8$ to Pbus(3), Cmult(3) provides $c_3 \cdot \sigma_{41}$ to Pbus(2), Cmult(5) provides $c_5 \cdot \sigma_{17}$ to Pbus (1), Cmult (1) provides $c_1 \cdot \sigma_{27}$ to Pbus(0). Additionally, OAdd(10) and OAdd(3) provide $F_{10}$ and $F_3$ to the output bus.

During cycle 55, Cmult(5) provides $c_5 \cdot \sigma_{26}$ to Pbus(2), Cmult(3) provides $c_3 \cdot \sigma_{32}$ to Pbus(1), Cmult(7) provides $c_7 \cdot \sigma_{32}$ to Pbus(0). Also, OAdd(24) and OAdd(17) provide $F_{24}$ and $F_{17}$ to the output bus.

During cycle 56, OAdd(32) and OAdd(25) provide $F_{32}$ and $F_{25}$ to the output bus. During cycle 57, OAdd(18) and OAdd(11) provide $F_{18}$ and $F_{11}$ to the output bus. During cycle 58, OAdd(5) and OAdd(4) provide $F_5$ and $F_4$ to the output bus. During cycle 59, OAdd(19) and OAdd(12) provide $F_{19}$ and $F_{12}$ to the output bus. During cycle 60, OAdd (33) and OAdd (26) provide $F_{33}$ and $F_{26}$ to the output bus. During cycle 61, OAdd(48) and OAdd(40) provide $F_{48}$ and $F_{40}$ to the output bus. During cycle 62, OAdd(41) and OAdd(34) provide $F_{41}$ and $F_{34}$ to the output bus. During cycle 63, OAdd(27) and OAdd(20) provide $F_{27}$ and $F_{20}$ to the output bus. During cycle 64, OAdd (13) and OAdd (6) provide $F_{13}$ and $F_6$ to the output bus. During cycle 65, OAdd(14) and OAdd(7) provide $F_{14}$ and $F_7$ to the output bus. During cycle 66, OAdd(28) and OAdd(21) provide $F_{28}$ and $F_{21}$ to the output bus. During cycle 67, OAdd(42) and OAdd(35) provide $F_{42}$ and $F_{35}$ to the output bus. During cycle 68, OAdd(56) and OAdd(49) provide $F_{56}$ and $F_{49}$ to the output bus. During cycle 69, OAdd(57) and OAdd(50) provide $F_{57}$ and $F_{50}$ to the output bus. During cycle 70, OAdd (43) and OAdd (36) provide $F_{43}$ and $F_{36}$ to the output bus. During cycle 71, OAdd(29) and OAdd(22) provide $F_{29}$ and $F_{22}$ to the output bus. During cycle 72, OAdd(23) and OAdd(15) provide $F_{23}$ and $F_{15}$ to the output bus. During cycle 73, OAdd (37) and OAdd (30) provide $F_{37}$ and $F_{30}$ to the output bus. During cycle 74, OAdd(51) and OAdd(44) provide $F_{51}$ and $F_{44}$ to the output bus. During cycle 75, OAdd (59) and OAdd (58) provide $F_{59}$ and $F_{58}$ to the output bus. During cycle 76, OAdd(52) and OAdd(45) provide $F_{52}$ and $F_{45}$ to the output bus. During cycle 77, OAdd(38) and OAdd(31) provide $F_{38}$ and $F_{31}$ to the output bus. During cycle 78, OAdd(46) and OAdd(39) provide $F_{46}$ and $F_{39}$ to the output bus. During cycle 79, OAdd(60) and OAdd(53) provide $F_{60}$ and $F_{53}$ to the output bus. During cycle 80, OAdd(61) and OAdd(54) provide $F_{61}$ and $F_{54}$ to the output bus. During cycle 81, OAdd(55) and OAdd(47) provide $F_{55}$ and $F_{47}$ to the output bus. During cycle 82, OAdd(63) and OAdd(62) provide $F_{63}$ and $F_{62}$ to the output bus.

DCT engine 20 uses pipelining so that more than one matrix is processed every 82 clock cycles. As many as three different matrices may be in different stages of transformation simultaneously. More specifically, because two pixels of data are received every cycle, at cycle 33 the first matrix of data is completely input and input accumulators 22 have completed the calculations based upon this data. Accordingly, the input of the second matrix of data may begin. Additionally, at cycle 65, the second matrix is completely input, the input accumulators 22 have completed the calculations based upon the second matrix of data, and the multiplication circuits have completed the calculations based upon the first matrix of data. Accordingly, the input of the third matrix may begin and the second matrix of data is provided to the multiplication circuits.

The computation of the IDCT according to the present invention is set forth as follows. As with the FDCT, notation for the matrix of data is indexed as a singly indexed vector as represented by the subscripts of X in FIG. 2. The first step in the IDCT is calculating the inverse transform coefficient vectors $\tau_0$ to $\tau_{63}$ as follows.

$\tau_0 = F_0/2 + F_9 + F_{18} + F_{27} + F_{36} + F_{45} + F_{54} + F_{63}$ $\tau_1 = F_0/2 - F_{13} - F_{22} + F_{25} - F_{36} - F_{47} + F_{50} - F_{59}$ $\tau_2 = F_0/2 - F_9 + F_{18} - F_{27} + F_{36} - F_{45} + F_{54} - F_{63}$ $\tau_3 = F_0/2 + F_{13} - F_{22} - F_{25} - F_{36} + F_{47} + F_{50} + F_{59}$ $\tau_4 = F_0/2 + F_{11} + F_{22} - F_{31} - F_{36} - F_{41} - F_{50} - F_{61}$ $\tau_5 = F_0/2 + F_{15} - F_{18} - F_{29} + F_{36} + F_{43} - F_{54} - F_{57}$ $\tau_6 = F_0/2 - F_{11} + F_{22} + F_{31} - F_{36} + F_{41} - F_{50} + F_{61}$ $\tau_7 = F_0/2 - F_{15} - F_{18} + F_{29} + F_{36} - F_{43} - F_{54} + F_{57}$ $\tau_8 = c_4 \cdot F_1 + c_4 \cdot F_8 + F_{10} + F_{17} + F_{19} + F_{26} + F_{28} + F_{35} + F_{37} + F_{44} + F_{46} + F_{53} + F_{55} + F_{62}$ $\tau_9 = -c_4 \cdot F_5 + c_4 \cdot F_8 - F_{14} + F_{17} - F_{21} - F_{28} - F_{30} + F_{33} - F_{39} + F_{42} - F_{44} - F_{51} - F_{55} + F_{58}$ $\tau_{10} = -c_4 \cdot F_6 + F_9 - F_{13} + c_4 \cdot F_{16} - F_{20} - F_{29} - F_{31} + F_{34} - F_{38} + F_{41} - F_{43} - F_{52} + F_{59} - F_{63}$ $\tau_{11} = c_4 \cdot F_1 - F_{12} - F_{14} - F_{21} - F_{23} + c_4 \cdot F_{24} + F_{26} - F_{35} - F_{37} - F_{46} + F_{49} + F_{51} - F_{58} - F_{60}$ $\tau_{12} = -c_4 \cdot F_4 + F_9 - F_{15} + F_{18} - F_{22} - F_{27} - F_{29} + c_4 \cdot F_{32} + F_{43} F_{45} - F_{50} - F_{54} + F_{57} + F_{63}$ $\tau_{13} = c_4 \cdot F_7 + F_{10} - F_{12} + F_{17} - F_{19} - F_{30} + F_{35} - F_{37} + c_4 \cdot F_{40} - F_{42} - F_{53} + F_{55} + F_{60} - F_{62}$ $\tau_{14} = c_4 \cdot F_2 - F_{11} - F_{15} - F_{20} + F_{25} + F_{27} - F_{34} - F_{38} - F_{45} + F_{47} + c_4 \cdot F_{48} + F_{52} - F_{57} - F_{61}$ $\tau_{15} = -c_4 \cdot F_3 + F_{10} + F_{19} - F_{23} - F_{26} - F_{28} + F_{33} + F_{39} + F_{44} - F_{46} - F_{49} - F_{53} + c_4 \cdot F_{56} + F_{62}$ $\tau_{16} = c_4 \cdot F_7 + F_{14} + F_{21} - F_{23} + F_{28} - F_{30} + F_{35} - F_{37} + F_{42} - F_{44} + F_{49} - F_{51} + c_4 \cdot F_{56} - F_{58}$ $\tau_{17} = c_4 \cdot F_3 + c_4 \cdot F_{10} + F_{14} - F_{19} + F_{23} - F_{28} + F_{30} + F_{33} + F_{39} - F_{42} - F_{44} + F_{49} + F_{53} - F_{58}$ $\tau_{18} = -c_4 \cdot F_6 - F_{11} + F_{15} + c_4 \cdot F_{16} - F_{20} + F_{25} - F_{27} - F_{34} + F_{38} + F_{45} + F_{47} - F_{52} + F_{57} - F_{61}$ $\tau_{19} = c_4 \cdot F_7 - F_{12} + F_{14} + F_{17} - F_{19} + c_4 \cdot F_{24} - F_{26} - F_{35} + F_{37} + F_{46} - F_{53} + F_{55} + F_{58} + F_{60}$ $\tau_{20} = -c_4 \cdot F_4 + F_9 + F_{15} - F_{18} + F_{22} - F_{27} + F_{29} + c_4 \cdot F_{32} - F_{43} - F_{45} + F_{50} + F_{54} - F_{57} + F_{63}$ $\tau_{21} = c_4 \cdot F_1 - F_{10} - F_{12} + F_{21} + F_{23} + F_{30} - F_{35} - F_{37} + c_4 \cdot F_{40} + F_{42} - F_{49} - F_{51} + F_{60} + F_{62}$ $\tau_{22} = -c_4 \cdot F_2 + F_9 + F_{13} - F_{20} - F_{29} + F_{31} + F_{34} + F_{38} - F_{41} - F_{43} + c_4 \cdot F_{48} + F_{52} - F_{59} - F_{63}$ $\tau_{23} = +c_4 \cdot F_5 - F_{10} + F_{17} - F_{21} + F_{26} - F_{28} - F_{33} + F_{39} + F_{44} + F_{46} - F_{51} - F_{55} + c_4 \cdot F_{56} - F_{62}$ $\tau_{24} = c_4 \cdot F_6 + F_{13} + F_{15} + F_{20} + F_{27} - F_{31} + F_{34} - F_{38} + F_{41} - F_{45} + c_4 \cdot F_{48} - F_{52} + F_{57} - F_{59}$ $\tau_{25} = -c_4 \cdot F_7 + c_4 \cdot F_8 - F_{10} + F_{21} - F_{23} - F_{26} + F_{28} - F_{35} + F_{37} + F_{44} - F_{46} + F_{49} - F_{51} - F_{62}$ $\tau_{26} = -c_4 \cdot F_2 + F_{13} - F_{15} + c_4 \cdot F_{16} + F_{20} - F_{27} - F_{31} - F_{34} - F_{38} + F_{41} + F_{45} + F_{52} - F_{57} - F_{59}$ $\tau_{27} = c_4 \cdot F_5 - F_{10} + F_{12} - F_{19} - F_{23} + c_4 \cdot F_{24} - F_{30} + F_{33} - F_{39} - F_{42} - F_{49} + F_{53} + F_{60} + F_{62}$ $\tau_{28} = c_4 \cdot F_4 - F_{11} + F_{13} - F_{18} - F_{22} + F_{25} - F_{31} + c_4 \cdot F_{32} - F_{41} - F_{47} - F_{50} + F_{54} + F_{59} + F_{61}$ $\tau_{29} = -c_4 \cdot F_3 + F_{12} - F_{14} + F_{17} + F_{21} - F_{26} - F_{33} - F_{39} + c_4 \cdot F_{40} + F_{46} + F_{51} - F_{55} - F_{58} - F_{60}$ $\tau_{30} = -c_4 \cdot F_6 + F_9 - F_{11} + F_{20} - F_{25} + F_{29} - F_{34} + F_{38} + F_{43} - F_{47} + c_4 \cdot F_{48} - F_{52} - F_{61} - F_{63}$ $\tau_{31} = c_4 \cdot F_1 - F_{14} - F_{17} - F_{19} + F_{28} + F_{30} + F_{35} + F_{37} - F_{42} - F_{44} - F_{53} - F_{55} + c_4 \cdot F_{56} + F_{58}$ $\tau_{32} = c_4 \cdot F_5 + F_{12} + F_{14} + F_{19} + F_{23} + F_{26} + F_{33} - F_{39} + c_4 \cdot F_{40} + F_{46} + F_{49} - F_{53} + F_{58} - F_{60}$ $\tau_{33} = -c_4 \cdot F_7 + c_4 \cdot F_8 - F_{10} - F_{21} + F_{23} - F_{26} + F_{28} + F_{35} - F_{37} + F_{44} - F_{46} - F_{49} + F_{51} - F_{62}$ $\tau_{34} = c_4 \cdot F_2 - F_{13} + F_{15} + c_4 \cdot F_{16} + F_{20} + F_{27} - F_{31} - F_{34} - F_{38} - F_{41} - F_{45} + F_{52} + F_{57} + F_{59}$ $\tau_{35} = -c_4 \cdot F_5 - F_{10} + F_{12} + F_{19} + F_{23} + c_4 \cdot F_{24} - F_{30} F_{33} + F_{39} - F_{42} + F_{49} - F_{53} + F_{60} + F_{62}$ $\tau_{36} = c_4 \cdot F_4 + F_{11} - F_{13} - F_{18} - F_{22} - F_{25} + F_{31} + c_4 \cdot F_{32} + F_{41} + F_{47} - F_{50} + F_{54} - F_{59} - F_{61}$ $\tau_{37} = c_4 \cdot F_3 + F_{12} - F_{14} - F_{17} - F_{21} - F_{26} + F_{33} + F_{39} + c_4 \cdot F_{40} + F_{46} - F_{51} + F_{55} - F_{58} - F_{60}$ $\tau_{38} = -c_4 \cdot F_6 - F_9 + F_{11} + F_{20} + F_{25} - F_{29} - F_{34} + F_{38} - F_{43} + F_{47} + c_4 \cdot F_{48} - F_{52} + F_{61} + F_{63}$ $\tau_{39} = -c_4 \cdot F_1 - F_{14} + F_{17} + F_{19} + F_{28} + F_{30} - F_{35} - F_{37} - F_{42} - F_{44} + F_{53} + F_{55} + c_4 \cdot F_{56} + F_{58}$ $\tau_{40} = c_4 \cdot F_4 + F_{11} + F_{13} + F_{18} + F_{22} + F_{25} + F_{31} + c_4 \cdot F_{32} + F_{41} - F_{47} - F_{50} - F_{54} - F_{59} - F_{61}$ $\tau_{41} = c_4 \cdot F_3 + c_4 \cdot F_8 + F_{14} + F_{19} - F_{23} - F_{28} + F_{30} - F_{33} - F_{39} - F_{42} - F_{44} - F_{49} - F_{53} - F_{58}$ $\tau_{42} = c_4 \cdot F_6 + F_{11} - F_{15} + c_4 \cdot F_{16} - F_{20} - F_{25} + F_{27} - F_{34} + F_{38} + F_{45} - F_{47} + F_{52} - F_{57} + F_{61}$ $\tau_{43} = -c_4 \cdot F_7 - F_{12} + F_{14} - F_{17} + F_{19} + c_4 \cdot F_{24} - F_{26} + F_{35} - F_{37} + F_{46} + F_{53} - F_{55} + F_{58} - F_{60}$ $\tau_{44} = -c_4 \cdot F_4 - F_9 - F_{15} - F_{18} + F_{22} + F_{27} - F_{29} + c_4 \cdot F_{32} + F_{43} + F_{45} + F_{50} + F_{54} + F_{57} + F_{63}$ $\tau_{45} = -c_4 \cdot F_1 - F_{10} - F_{12} - F_{21} - F_{23} + F_{30} + F_{35} + F_{37} + c_4 \cdot F_{40} + F_{42} + F_{49} + F_{51} + F_{60} + F_{62}$ $\tau_{46} = -c_4 \cdot F_2 - F_9 - F_{13} - F_{20} + F_{29} - F_{31} + F_{34} + F_{38} + F_{41} + F_{43} + c_4 \cdot F_{48} + F_{52} + F_{59} + F_{63}$ $\tau_{47} = -c_4 \cdot F_5 - F_{10} - F_{17} + F_{21} + F_{26} - F_{28} + F_{33} - F_{39} + F_{44} + F_{46} + F_{51} + F_{55} + c_4 \cdot F_{56} - F_{62}$ $\tau_{48} = c_4 \cdot F_3 + F_{10} + F_{12} + F_{17} + F_{21} + c_4 \cdot F_{24} + F_{30} + F_{33} + F_{39} + F_{42} + F_{51} - F_{55} + F_{60} - F_{62}$ $\tau_{49} = c_4 \cdot F_5 + c_4 \cdot F_8 - F_{14} - F_{17} + F_{21} - F_{28} - F_{30} - F_{33} + F_{39} + F_{42} - F_{44} + F_{51} + F_{55} + F_{58}$ $\tau_{50} = -c_4 \cdot F_6 - F_9 + F_{13} + c_4 \cdot F_{16} - F_{20} + F_{29} + F_{31} + F_{34} - F_{38} - F_{41} + F_{43} - F_{52} - F_{59} + F_{63}$ $\tau_{51} = -c_4 \cdot F_1 - F_{12} - F_{14} + F_{21} + F_{23} + c_4 \cdot F_{24} + F_{26} + F_{35} + F_{37} - F_{46} F_{49} - F_{51} - F_{58} - F_{60}$ $\tau_{52} = -c_4 \cdot F_4 - F_9 + F_{15} + F_{18} - F_{22} + F_{27} + F_{29} + c_4 \cdot F_{32} - F_{43} + F_{45} - F_{50} - F_{54} - F_{57} - F_{63}$ $\tau_{53} = c_4 \cdot F_7 + F_{10} - F_{12} - F_{17} + F_{19} - F_{30} - F_{35} + F_{37} + c_4 \cdot F_{40} - F_{42} + F_{53} - F_{55} + F_{60} - F_{62}$ $\tau_{54} = c_4 \cdot F_2 + F_{11} + F_{15} - F_{20} - F_{25} + F_{27} - F_{34} - F_{38} + F_{45} - F_{47} + c_4 \cdot F_{48} + F_{52} + F_{57} + F_{61}$ $\tau_{55} = c_4 \cdot F_3 + F_{10} - F_{19} + F_{23} - F_{26} + F_{28} - F_{33} - F_{39} + F_{44} - F_{46} + F_{49} + F_{53} + c_4 \cdot F_{56} + F_{62}$ $\tau_{56} = c_4 \cdot F_2 + F_9 + F_{11} + c_4 \cdot F_{16} + F_{20} + F_{25} + F_{29} + F_{34} + F_{38} + F_{43} + F_{47} + F_{52} + F_{61} - F_{63}$ $\tau_{57} = -c_4 \cdot F_1 + c_4 \cdot F_8 + F_{10} - F_{17} - F_{19} + F_{26} + F_{28} - F_{35} - F_{37} + F_{44} + F_{46} - F_{53} - F_{55} + F_{62}$ $\tau_{58} = c_4 \cdot F_2 - F_9 - F_{11} + c_4 \cdot F_{16} + F_{20} - F_{25} - F_{29} + F_{34} + F_{38} - F_{43} - F_{47} + F_{52} - F_{61} + F_{63}$ $\tau_{59} = -c_4 \cdot F_3 + F_{10} + F_{12} - F_{17} - F_{21} + c_4 \cdot F_{24} + F_{30} - F_{33} - F_{39} + F_{42} - F_{51} + F_{55} + F_{60} - F_{62}$ $\tau_{60} = c_4 \cdot F_4 - F_{11} - F_{13} + F_{18} + F_{22} - F_{25} - F_{31} + c_4 \cdot F_{32} - F_{41} + F_{47} + F_{50} - F_{54} - F_{59} + F_{61}$ $\tau_{61} = c_4 \cdot F_6 - F_{13} - F_{15} + F_{20} - F_{27} + F_{31} + F_{34} - F_{38} - F_{41} + F_{45} + c_4 \cdot F_{48} - F_{52} - F_{57} + F_{59}$ $\tau_{62} = -c_4 \cdot F_5 + F_{12} + F_{14} - F_{19} - F_{23} + F_{26} - F_{33} + F_{39} + c_4 \cdot F_{40} - F_{46} - F_{49} + F_{53} + F_{58} - F_{60}$ $\tau_{63} = -c_4 \cdot F_7 + F_{14} - F_{21} + F_{23} + F_{28} - F_{30} - F_{35} + F_{37} + F_{42} - F_{44} - F_{49} + F_{51} + c_4 \cdot F_{56} - F_{58}$ After the inverse transform coefficient vectors are generated, these coefficient vectors are used to generate the IDCT matrix as follows.

$f_0 = c_0 \cdot \tau_0 + c_1 \cdot \tau_8 + c_2 \cdot \tau_{56} + c_3 \cdot \tau_{48} + c_4 \cdot \tau_{40} + c_5 \cdot \tau_{32} + c_6 \cdot \tau_{24} + c_7 \cdot \tau_{16}$ $f_1 = c_0 \cdot \tau_1 + c_1 \cdot \tau_9 + c_2 \cdot \tau_{10} + c_3 \cdot \tau_{11} + c_4 \cdot \tau_{12} + c_5 \cdot \tau_{13} + c_6 \cdot \tau_{14} + c_7 \cdot \tau_{15}$ $f_2 = c_0 \cdot \tau_6 + c_1 \cdot \tau_{17} + c_2 \cdot \tau_{18} + c_3 \cdot \tau_{19} + c_4 \cdot \tau_{20} + c_5 \cdot \tau_{21} + c_6 \cdot \tau_{22} + c_7 \cdot \tau_{23}$ $f_3 = c_0 \cdot \tau_7 + c_1 \cdot \tau_{25} + c_2 \cdot \tau_{26} + c_3 \cdot \tau_{27} + c_4 \cdot \tau_{28} + c_5 \cdot \tau_{29} + c_6 \cdot \tau_{30} + c_7 \cdot \tau_{31}$ $f_4 = c_0 \cdot \tau_5 + c_1 \cdot \tau_{33} + c_2 \cdot \tau_{34} + c_3 \cdot \tau_{35} + c_4 \cdot \tau_{36} + c_5 \cdot \tau_{37} + c_6 \cdot \tau_{38} + c_7 \cdot \tau_{39}$ $f_5 = c_0 \cdot \tau_4 + c_1 \cdot \tau_{41} + c_2 \cdot \tau_{42} + c_3 \cdot \tau_{43} + c_4 \cdot \tau_{44} + c_5 \cdot \tau_{45} + c_6 \cdot \tau_{46} + c_7 + \tau_{47}$ $f_6 = c_0 \cdot \tau_3 + c_1 \cdot \tau_{49} + c_2 \cdot \tau_{50} + c_3 \cdot \tau_{51} + c_4 \cdot \tau_{52} + c_5 \cdot \tau_{53} + c_6 \cdot \tau_{54} + c_7 \cdot \tau_{55}$ $f_7 = c_0 \cdot \tau_2 + c_1 \cdot \tau_{57} + c_2 \cdot \tau_{58} + c_3 \cdot \tau_{59} + c_4 \cdot \tau_{60} + c_5 \cdot \tau_{62} + c_6 \cdot \tau_{61} + c_7 \cdot \tau_{63}$ $f_8 = c_0 \cdot \tau_4 - c_1 \cdot \tau_{45} - c_2 \cdot \tau_{46} + c_3 \cdot \tau_{41} - c_4 \cdot \tau_{44} - c_5 \cdot \tau_{47} + c_6 \cdot \tau_{42} - c_7 \cdot \tau_{43}$ $f_9 = c_0 \cdot \tau_0 - c_1 \cdot \tau_{32} - c_2 \cdot \tau_{24} + c_3 \cdot \tau_8 - c_4 \cdot \tau_{40} - c_5 \cdot \tau_{16} + c_6 \cdot \tau_{56} - c_7 \cdot \tau_{48}$ $f_{10} = c_0 \cdot \tau_5 - c_1 \cdot \tau_{37} - c_2 \cdot \tau_{38} + c_3 \cdot \tau_{33} - c_4 \cdot \tau_{36} - c_5 \cdot \tau_{39} + c_6 \cdot \tau_{34} - c_7 \cdot \tau_{35}$ $f_{11} = c_0 \cdot \tau_3 - c_1 \cdot \tau_{53} - c_2 \cdot \tau_{54} + c_3 \cdot \tau_{49} - c_4 \cdot \tau_{52} - c_5 \cdot \tau_{55} + c_6 \cdot \tau_{50} - c_7 \cdot \tau_{51}$ $f_{12} = c_0 \cdot \tau_1 - c_1 \cdot \tau_{13} - c_2 \cdot \tau_{14} + c_3 \cdot \tau_9 - c_4 \cdot \tau_{12} - c_5 \cdot \tau_{15} + c_6 + \tau_{10} - c_7 \cdot \tau_{11}$ $f_{13} = c_0 \cdot \tau_7 - c_1 \cdot \tau_{29} - c_2 \cdot \tau_{30} + c_3 \cdot \tau_{25} - c_4 \cdot \tau_{28} - c_5 - \tau_{31} + c_6 \cdot \tau_{26} - c_7 \cdot \tau_{27}$ $f_{14} = c_0 \cdot \tau_2 - c_1 \cdot \tau_{62} - c_2 \cdot \tau_{61} + c_3 \cdot \tau_{57} - c_4 \cdot \tau_{60} - c_5 \cdot \tau_{63} + c_6 \cdot \tau_{58} - c_7 \cdot \tau_{59}$ $f_{15} = c_0 \cdot \tau_6 - c_1 \cdot \tau_{21} - c_2 \cdot \tau_{22} + c_3 \cdot \tau_{17} - c_4 \cdot \tau_{20} - c_5 \cdot \tau_{23} + c_6 \cdot \tau_{18} - c_7 \cdot \tau_{19}$ $f_{16} = c_0 \cdot \tau_3 - c_1 \cdot \tau_{51} + c_2 \cdot \tau_{54} + c_3 \cdot \tau_{55} - c_4 \cdot \tau_{52} + c_5 \cdot \tau_{49} - c_6 \cdot \tau_{50} + c_7 \cdot \tau_{53}$ $f_{17} = c_0 \cdot \tau_7 - c_1 \cdot \tau_{27} + c_2 \cdot \tau_{30} + c_3 \cdot \tau_{31} - c_4 \cdot \tau_{28} + c_5 \cdot \tau_{25} - c_6 \cdot \tau_{26} + c_7 \cdot \tau_{29}$ $f_{18} = c_0 \cdot \tau_0 - c_1 \cdot \tau_{48} + c_2 \cdot \tau_{24} + c_3 \cdot \tau_{16} - c_4 \cdot \tau_{40} + c_5 \cdot \tau_8 - c_6 \cdot \tau_{56} + c_7 \cdot \tau_{32}$ $f_{19} = c_0 \cdot \tau_6 - c_1 \cdot \tau_{19} + c_2 \cdot \tau_{22} + c_3 \cdot \tau_{23} - c_4 \cdot \tau_{20} + c_5 \cdot \tau_{17} - c_6 \cdot \tau_{18} + c_7 \cdot \tau_{21}$ $f_{20} = c_0 \cdot \tau_4 - c_1 \cdot \tau_{43} + c_2 \cdot \tau_{46} + c_3 \cdot \tau_{47} - c_4 \cdot \tau_{44} + c_5 \cdot \tau_{41} - c_6 \cdot \tau_{42} + c_7 \cdot \tau_{45}$ $f_{21} = c_0 \cdot \tau_2 - c_1 \cdot \tau_{59} + c_2 \cdot \tau_{61} + c_3 \cdot \tau_{63} - c_4 \cdot \tau_{60} + c_5 \cdot \tau_{57} - c_6 \cdot \tau_{58} + c_7 \cdot \tau_{62}$ $f_{22} = c_0 \cdot \tau_5 - c_1 \cdot \tau_{35} + c_2 \cdot \tau_{38} + c_3 \cdot \tau_{39} - c_4 \cdot \tau_{36} + c_5 \cdot \tau_{33} - c_6 \cdot \tau_{34} + c_7 \cdot \tau_{37}$ $f_{23} = c_0 \cdot \tau_1 - c_1 \cdot \tau_{11} + c_2 \cdot \tau_{14} + c_3 \cdot \tau_{15} - c_4 \cdot \tau_{12} + c_5 \cdot \tau_9 - c-$ $6 \cdot \tau_{10} + c_7 \cdot \tau_{13}$ $f_{24} = c_0 \cdot \tau_5 - c_1 \cdot \tau_{39} - c_2 \cdot \tau_{34} + c_3 \cdot \tau_{37} + c_4 \cdot \tau_{36} - c_5 \cdot \tau_{35} - c_6 \cdot \tau_{38} + c_7 \cdot \tau_{33}$ $f_{25} = c_0 \cdot \tau_6 - c_1 \cdot \tau_{23} - c_2 \cdot \tau_{18} + c_3 \cdot \tau_{21} + c_4 \cdot \tau_{20} - c_5 \cdot \tau_{19} - c_6 \cdot \tau_{54} + c_7 \cdot \tau_{17}$ $f_{26} = c_0 \cdot \tau_3 - c_1 \cdot \tau_{55} - c_2 \cdot \tau_{50} + c_3 \cdot \tau_{53} + c_4 \cdot \tau_{52} - c_5 \cdot \tau_{51} - c_6 \cdot \tau_{54} + c_7 \cdot \tau_{49}$ $f_{27} = c_0 \cdot \tau_0 - c_1 \cdot \tau_{16} - c_2 \cdot \tau_{56} + c_3 \cdot \tau_{32} + c_4 \cdot \tau_{40} - c_5 \cdot \tau_{48} - c_6 \cdot \tau_{24} + c_7 \cdot \tau_8$ $f_{28} = c_0 \cdot \tau_2 - c_1 \cdot \tau_{63} - c_2 \cdot \tau_{58} + c_3 \cdot \tau_{62} + c_4 \cdot \tau_{60} - c_5 \cdot \tau_{59} - c_6 \cdot \tau_{61} + c_7 + \tau_{57}$ $f_{29} = c_0 \cdot \tau_1 - c_1 \cdot \tau_{15} - c_2 \cdot \tau_{10} + c_3 \cdot \tau_{13} + c_4 \cdot \tau_{12} - c_5 \cdot \tau_{11} - c_6 \cdot \tau_{14} + c_7 \cdot \tau_9$ $f_{30} = c_0 \cdot \tau_4 - c_1 \cdot \tau_{47} - c_2 \cdot \tau_{42} + c_3 \cdot \tau_{45} + c_4 \cdot \tau_{44} - c_5 \cdot \tau_{43} - c_6 \cdot \tau_{46} + c_7 \cdot \tau_{41}$ $f_{31} = c_0 \cdot \tau_7 - c_1 \cdot \tau_{31} - c_2 \cdot \tau_{26} + c_3 \cdot \tau_{29} + c_4 \cdot \tau_{28} - c_5 \cdot \tau_{27} - c_6 \cdot \tau_{30} + c_7 \cdot \tau_{25}$ $f_{32} = c_0 \cdot \tau_7 + c_1 \cdot \tau_{31} - c_2 \cdot \tau_{26} + c_3 \cdot \tau_{29} + c_4 \cdot \tau_{28} - c_5 \cdot \tau_{27} - c_6 \cdot \tau_{30} - c_7 \cdot \tau_{25}$ $f_{33} = c_0 \cdot \tau_4 + c_1 \cdot \tau_{47} - c_2 \cdot \tau_{42} + c_3 \cdot \tau_{45} + c_4 \cdot \tau_{44} + c_5 \cdot \tau_{43} - c_6 \cdot \tau_{46} - c_7 \cdot \tau_{41}$ $f_{34} = c_0 \cdot \tau_1 + c_1 \cdot \tau_{15} - c_2 \cdot \tau_{10} + c_3 \cdot \tau_{13} + c_4 \cdot \tau_{12} + c_5 \cdot \tau_{11} - c_6 \cdot \tau_{14} - c_7 \cdot \tau_9$ $f_{35} = c_0 \cdot \tau_2 + c_1 \cdot \tau_{63} - c_2 \cdot \tau_{58} + c_3 \cdot \tau_{62} + c_4 \cdot \tau_{60} - c_5 \cdot \tau_{59} - c_6 \cdot \tau_{61} - c_7 \cdot \tau_{57}$ $f_{36} = c_0 \cdot \tau_0 + c_1 \cdot \tau_{16} - c_2 \cdot \tau_{56} + c_3 \cdot \tau_{32} + c_4 \cdot \tau_{40} - c_5 \cdot \tau_{48} - c_6 \cdot \tau_{24} - c_7 \cdot \tau_8$ $f_{37} = c_0 \cdot \tau_3 + c_1 \cdot \tau_{55} - c_2 \cdot \tau_{50} + c_3 \cdot \tau_{53} + c_4 \cdot \tau_{52} - c_5 \cdot \tau_{51} - c_6 \cdot \tau_{54} - c_7 \cdot \tau_{49}$ $f_{38} = c_0 \cdot \tau_6 + c_1 \cdot \tau_{23} - c_2 \cdot \tau_{18} + c_3 \cdot \tau_{21} + c_4 \cdot \tau_{20} - c_5 \cdot \tau_{19} - c_6 \cdot \tau_{22} - c_7 \cdot \tau_{17}$ $f_{39} = c_0 \cdot \tau_5 + c_1 \cdot \tau_{39} - c_2 \cdot \tau_{34} + c_3 \cdot \tau_{37} + c_4 \cdot \tau_{36} - c_5 \cdot \tau_{35} - c_6 \cdot \tau_{38} - c_7 \cdot \tau_{33}$ $f_{40} = c_0 \cdot \tau_1 + c_1 \cdot \tau_{11} + c_2 \cdot \tau_{14} + c_3 \cdot \tau_{15} - c_4 \cdot \tau_{12} + c_5 \cdot \tau_9 - c_6 \cdot \tau_{10} - c_7 \cdot \tau_{13}$ $f_{41} = c_0 \cdot \tau_5 + c_1 \cdot \tau_{35} + c_2 \cdot \tau_{38} + c_3 \cdot \tau_{39} - c_4 \cdot \tau_{36} - c_5 \cdot \tau_{33} - c_6 \cdot \tau_{34} - c_7 \cdot \tau_{37}$ $f_{42} = c_0 \cdot \tau_2 + c_1 \cdot \tau_{59} + c_2 \cdot \tau_{61} + c_3 \cdot \tau_{63} - c_4 \cdot \tau_{60} - c_5 \cdot \tau_{57} - c_6 \cdot \tau_{58} - c_7 \cdot \tau_{62}$ $f_{43} = c_0 \cdot \tau_4 + c_1 \cdot \tau_{43} + c_2 \cdot \tau_{46} + c_3 \cdot \tau_{47} - c_4 \cdot \tau_{44} - c_5 \cdot \tau_{41} - c_6 \cdot \tau_{42} - c_7 \cdot \tau_{45}$ $f_{44} = c_0 \cdot \tau_6 + c_1 \cdot \tau_{19} + c_2 \cdot \tau_{22} + c_3 \cdot \tau_{23} - c_4 \cdot \tau_{20} - c_5 \cdot \tau_{17} - c_6 \cdot \tau_{18} + c_7 \cdot \tau_{21}$ $f_{45} = c_0 \cdot \tau_0 + c_1 \cdot \tau_{48} + c_2 \cdot \tau_{24} + c_3 \cdot \tau_{16} - c_4 \cdot \tau_{40} - c_5 \cdot \tau_8 - c_6 \cdot \tau_{56} - c_7 \cdot \tau_{32}$ $f_{46} = c_0 \cdot \tau_7 + c_1 \cdot \tau_{27} + c_2 \cdot \tau_{30} + c_3 \cdot \tau_{31} - c_4 \cdot \tau_{28} - c_5 \cdot \tau_{25} - c_6 \cdot \tau_{26} - c_7 \cdot \tau_{29}$ $f_{47} = c_0 \cdot \tau_3 + c_1 \cdot \tau_{51} + c_2 \cdot \tau_{54} + c_3 \cdot \tau_{55} - c_4 \cdot \tau_{52} - c_5 \cdot \tau_{49} - c_6 \cdot \tau_{50} - c_7 \cdot \tau_{53}$ $f_{48} = c_0 \cdot \tau_6 - c_1 \cdot \tau_{21} - c_2 \cdot \tau_{22} + c_3 \cdot \tau_{17} - c_4 \cdot \tau_{20} + c_5 \cdot \tau_{23} + c_6 \cdot \tau_{18} + c_7 \cdot \tau_{19}$ $f_{49} = c_0 \cdot \tau_2 + c_1 \cdot \tau_{62} - c_2 \cdot \tau_{61} + c_3 \cdot \tau_{57} - c_4 \cdot \tau_{60} + c_5 \cdot \tau_{63} + c_6 \cdot \tau_{58} + c_7 \cdot \tau_{59}$ $f_{50} = c_0 \cdot \tau_7 + c_1 \cdot \tau_{29} - c_2 \cdot \tau_{30} + c_3 \cdot \tau_{25} - c_4 \cdot \tau_{28} - c_5 \cdot \tau_{31} + c_6 \cdot \tau_{30} + c_7 \cdot \tau_{27}$ $f_{51} = c_0 \cdot \tau_1 + c_1 \cdot \tau_{13} - c_2 \cdot \tau_{14} + c_3 \cdot \tau_9 - c_4 \cdot \tau_{12} + c_5 \cdot \tau_{15} + c_6 \cdot \tau_{10} + c_7 \cdot \tau_{11}$ $f_{52} = c_0 \cdot \tau_3 + c_1 \cdot \tau_{53} - c_2 \cdot \tau_{54} + c_3 \cdot \tau_{49} - c_4 \cdot \tau_{52} + c_5 \cdot \tau_{55} + c_6 \cdot \tau_{50} + c_7 \cdot \tau_{51}$ $f_{53} = c_0 \cdot \tau_5 + c_1 \cdot \tau_{37} - c_2 \cdot \tau_{38} + c_3 \cdot \tau_{33} - c_4 \cdot \tau_{36} + c_5 \cdot \tau_{39} + c_6 \cdot \tau_{34} + c_7 \cdot \tau_{35}$ $f_{54} = c_0 \cdot \tau_0 + c_1 \cdot \tau_{32} - c_2 \cdot \tau_{24} + c_3 \cdot \tau_8 - c_4 \cdot \tau_{40} + c_5 \cdot \tau_{16} + c_6 \cdot \tau_{56} + c_7 \cdot \tau_{48}$ $f_{55} = c_0 \cdot \tau_4 + c_1 \cdot \tau_{45} - c_2 \cdot \tau_{46} + c_3 \cdot \tau_{41} - c_4 \cdot \tau_{44} + c_5 \cdot \tau_{47} + c_6 \cdot \tau_{42} + c_7 \cdot \tau_{43}$ $f_{56} = c_0 \cdot \tau_2 - c_1 \cdot \tau_{57} + c_2 \cdot \tau_{58} + c_3 \cdot \tau_{59} + c_4 \cdot \tau_{60} - c_5 \cdot \tau_{62} + c_6 \cdot \tau_{61} - c_7 \cdot \tau_{63}$ $f_{57} = c_0 \cdot \tau_3 - c_1 \cdot \tau_{49} + c_2 \cdot \tau_{50} + c_3 \cdot \tau_{51} + c_4 \cdot \tau_{52} - c_5 \cdot \tau_{53} + c_6 \cdot \tau_{54} - c_7 \cdot \tau_{55}$ $f_{58} = c_0 \cdot \tau_4 - c_1 \cdot \tau_{41} + c_2 \cdot \tau_{42} + c_3 \cdot \tau_{43} + c_4 \cdot \tau_{44} - c_5 \cdot \tau_{45} + c_6 \cdot \tau_{46} - c_7 \cdot \tau_{47}$ $f_{59} = c_0 \cdot \tau_5 - c_1 \cdot \tau_{33} + c_2 \cdot \tau_{34} + c_3 \cdot \tau_{35} + c_4 \cdot \tau_{36} - c_5 \cdot \tau_{37} + c_6 \cdot \tau_{38} - c_7 \cdot \tau_{39}$ $f_{60} = c_0 \cdot \tau_7 - c_1 \cdot \tau_{25} + c_2 \cdot \tau_{26} + c_3 \cdot \tau_{27} + c_4 \cdot \tau_{28} - c_5 \cdot \tau_{29} + c_6 \cdot \tau_{30} - c_7 \cdot \tau_{31}$ $f_{61} = c_0 \cdot \tau_6 - c_1 \cdot \tau_{17} + c_2 \cdot \tau_{18} + c_3 \cdot \tau_{19} + c_4 \cdot \tau_{20} - c_5 \cdot \tau_{21} + c_6 \cdot \tau_{22} - c_7 \cdot \tau_{23}$ $f_{62} = c_0 \cdot \tau_1 - c_1 \cdot \tau_9 + c_2 \cdot \tau_{10} + c_3 \cdot \tau_{11} + c_4 \cdot \tau_{12} - c_5 \cdot \tau_{13} + c_6 \cdot \tau_{14} - c_7 \cdot \tau_{15}$ $f_{63} = c_0 \cdot \tau_0 - c_1 \cdot \tau_8 + c_2 \cdot \tau_{56} + c_3 \cdot \tau_{48} + c_4 \cdot \tau_{40} - c_5 \cdot \tau_{32} + c_6 \cdot \tau_{24} - c_7 \cdot \tau_{16}$ More specifically, DCT engine 20 uses accumulators 22, multipliers 24 and output accumulators 26 to perform the many calculations of an IDCT in parallel. These calculations are divided into discrete calculations which are performed during different cycles. It takes a total of 86 cycles to completely transform an 8×8 matrix from the time the first location of input data is input until the last location of transformed data is output by DCT engine 20. Individual input accumulators 22 and output accumulators 26 maintain running totals as each new entry is accumulated during a cycle.

IDCT engine includes a constant multiplier at the input bus which multiplies $F_1$, $F_2$, $F_3$, $F_4$, $F_5$, $F_6$, $F_7$, $F_8$, $F_{16}$, $F_{24}$, $F_{32}$, $F_{40}$, $F_{48}$, and $F_{56}$ by $c_4$ and which divides $F_0$ by 2. Additionally, RMULT(0) to RMULT(7) multiply by $c_0$ to $c_7$ rather than by $r_0$ to $r_7$. I.e., RMULT(i) is a duplicate of CMULT(i). In operation, RMULT(0), RMULT(2), RMULT(4) and RMULT(6) are not used during the IDCT. Accordingly, if the DCT engine only performs IDCTs, then Rmult(0), Rmult (2), Rmult (4) and Rmult (6) can be omitted from the engine. The individual cycles of the IDCT will now be discussed in detail.

During cycle in $F_1$ and $F_0$ are provided to the input bus and $F_1$ is multiplied by $c_4$. Additionally, IAdd(0), IAdd (1), IAdd (2), IAdd (3), IAdd (4), IAdd (5), IAdd (6), IAdd(7) all separately add $F_0/2$.

During cycle 2, $F_{16}$ and $F_8$ are provided to the input bus, $F_8$ is multiplied by $c_4$, and $F_{16}$ is multiplied by $c_4$. Additionally, IAdd(8), IAdd(11), IAdd(21), IAdd(31) all separately add $c_4F_1$ and IAdd(39), IAdd(45), IAdd(51), IAdd (57) all separately subtract $c_4F_1$.

During cycle 3, $F_9$ and $F_2$ are provided to the input bus and $F_2$ is multiplied by $c_4$. Additionally, IAdd(8), IAdd (9), IAdd (17), IAdd (25), IAdd (33), IAdd (41), IAdd(49), IAdd(57) all separately add $c_4F_8$, IAdd(0), IAdd(10), IAdd(12), IAdd(20), IAdd(22), IAdd(30), IAdd(56) all separately add $F_9$, IAdd(2), IAdd(38), IAdd(44), IAdd(46), IAdd(50), IAdd(52), IAdd(58) all separately subtract $F_9$ and IAdd(10), IAdd(18), IAdd(26), IAdd(34), IAdd(42), IAdd(50), IAdd(56), IAdd(58) all separately add $c_4F_{16}$.

During cycle 4, $F_3$ and $F_{10}$ are provided to the input bus and $F_3$ is multiplied by $c_4$. Additionally, IAdd (14), IAdd(54), IAdd(56), IAdd(58) all separately add $c_4F_2$, IAdd(22), IAdd(26), IAdd(34), IAdd(46) all separately subtract $c_4F_2$, IAdd(8), IAdd(13), IAdd(15), IAdd(48), IAdd (53), IAdd (55), IAdd (57), IAdd (59) all separately add $F_{10}$, and IAdd(21), IAdd(23), IAdd(25), IAdd(27), IAdd(33), IAdd(35), IAdd(45), IAdd(47) all separately subtract $F_{10}$.

During cycle 5, $F_{17}$ and $F_{24}$ are provided to the input bus and $F_{24}$ is multiplied by $c_4$. Additionally, IAdd(37), IAdd(41), IAdd(48), IAdd(55) all separately add $c_4F_3$, IAdd (15), IAdd (17), IAdd (29), IAdd (59) all separately subtract $c_4F_3$, IAdd (8), IAdd (9), IAdd (13), IAdd (19), IAdd (23), IAdd (29), IAdd (39), IAdd (48) all separately add $F_{17}$, and IAdd (31), IAdd (37), IAdd (43), IAdd (47), IAdd(49), IAdd(53), IAdd(57), IAdd(59) all separately subtract $F_{17}$.

During cycle 6 $F_{32}$ and $F_{25}$ are provided to the input bus and $F_{32}$ is multiplied by $c_4$. Additionally, IAdd(11), IAdd(19), IAdd(27), IAdd(35), IAdd(43), IAdd(48), IAdd(51), IAdd(59) all separately add $c_4F_{24}$, IAdd(1), IAdd (14), IAdd (18), IAdd (28), IAdd (38), IAdd (40), IAdd(56) all separately add $F_{25}$, and IAdd(3), IAdd(30), IAdd(36), IAdd(42), IAdd(54), IAdd(58), IAdd(60) all separately subtract $F_{25}$.

During cycle 7, $F_{18}$ and $F_{11}$ are provided to the input bus. Additionally, IAdd(4), IAdd(36), IAdd(38), IAdd(40), IAdd(42), IAdd(54), IAdd(56) all separately add $F_{11}$, IAdd(6), IAdd(14), IAdd(18), IAdd(28), IAdd(30), IAdd(58), IAdd(60) all separately subtract $F_{11}$, IAdd(0), IAdd(2), IAdd(12), IAdd(40), IAdd(52), IAdd(60) all separately add $F_{18}$, IAdd(5), IAdd(7), IAdd(20), IAdd(28), IAdd(36), IAdd(44) all separately subtract $F_{18}$ and IAdd(12), IAdd(20), IAdd(28), IAdd(36), IAdd(40), IAdd(44), IAdd(52), IAdd(60) all separately add $c_4F_{32}$.

During cycle 8, $F_4$ and $F_5$ are provided to the input bus, and $F_4$ is multiplied by $c_4$, and $F_5$ is multiplied by $c_4$.

During cycle 9, $F_{12}$ and $F_{19}$ are provided to the input bus. Additionally, IAdd(28), IAdd(36), IAdd(40), IAdd(60) all separately add $c_4F_4$, IAdd(44), IAdd(52), IAdd(12), IAdd(20) all separately subtract $c_4F_4$, IAdd(23), IAdd(27), IAdd(32), IAdd(49) all separately add $c_4F_5$, IAdd(9), IAdd(35), IAdd(47), IAdd(62) all separately subtract $c_4F_5$, IAdd(27), IAdd(29), IAdd(32), IAdd(35), IAdd(37), IAdd(48), IAdd(59), IAdd(62) all separately add $F_{12}$, IAdd(11), IAdd(13), IAdd(19), IAdd(21), IAdd(43), IAdd(45), IAdd(51), IAdd(53) all separately subtract $F_{12}$, IAdd(8), IAdd(15), IAdd(32), IAdd(35), IAdd(39), IAdd(41), IAdd(43), IAdd(53) all separately add $F_{19}$, and IAdd(13), IAdd(17), IAdd(19), IAdd(27), IAdd(31), IAdd(55), IAdd(57), IAdd(62) all separately subtract $F_{19}$.

During cycle 10, $F_{33}$ and $F_{26}$ are provided to the input bus. Additionally, IAdd(8), IAdd(11), IAdd(23), IAdd(32), IAdd(47), IAdd(51), IAdd(57), IAdd(62) all separately add $F_{26}$, IAdd(15), IAdd(19), IAdd(25), IAdd(29), IAdd(33), IAdd(37), IAdd(43), IAdd(55) all separately subtract $F_{26}$, IAdd(9), IAdd(15), IAdd(17), IAdd(27), IAdd(32), IAdd(37), IAdd(47), IAdd(48) all separately add $F_{33}$, and IAdd(23), IAdd(29), IAdd(35), IAdd (41), IAdd (49), IAdd (55), IAdd (59), IAdd (62) all separately subtract $F_{33}$.

During cycle 11, $F_{48}$ and $F_{40}$ are provided to the input bus, $F_{40}$ is multiplied by $c_4$, and $F_{48}$ is multiplied by $c_4$.

During cycle 12, $F_{34}$ and $F_{41}$ are provided to the input bus. Additionally, IAdd (10), IAdd (22), IAdd (24), IAdd(46), IAdd(50), IAdd(56), IAdd(58), IAdd(61) all separately add $F_{34}$, IAdd (14), IAdd (18), IAdd (26), IAdd(30), IAdd(34), IAdd(38), IAdd(42), IAdd(54) all separately subtract $F_{34}$, IAdd(13), IAdd(21), IAdd(29), IAdd(32), IAdd(37), IAdd(45), IAdd(53), IAdd(62) all separately add $c_4F_{40}$, IAdd(6), IAdd(10), IAdd(24), IAdd(26), IAdd(36), IAdd(40), IAdd(46) all separately add $F_{41}$, IAdd(4), IAdd(22), IAdd(28), IAdd(34), IAdd(50), IAdd(60), IAdd(61) all separately subtract $F_{41}$, and IAdd(14), IAdd(22), IAdd(24), IAdd(30), IAdd(38), IAdd(46), IAdd(54), IAdd(61) all separately add $c_4F_{48}$.

During cycle 13, $F_{20}$ and $F_{27}$ are provided to the input bus. Additionally, IAdd(24), IAdd(26), IAdd(30), IAdd(34), IAdd(38), IAdd(56), IAdd(58), IAdd(61) all separately add $F_{20}$, IAdd(10), IAdd(14), IAdd(18), IAdd(22), IAdd(42), IAdd(46), IAdd(50), IAdd(54) all separately subtract $F_{20}$, IAdd(0), IAdd(14), IAdd(24), IAdd(34), IAdd(42), IAdd(44), IAdd(52) all separately add $F_{27}$, and IAdd(2), IAdd(12), IAdd(18), IAdd(20), IAdd(26), IAdd(54), IAdd(61) all separately subtract $F_{27}$.

During cycle 14, $F_6$ and $F_{13}$ are provided to the input bus and $F_6$ is multiplied by $c_4$. Additionally, IAdd (3), IAdd (22), IAdd (24), IAdd (26), IAdd (28), IAdd (40), IAdd(50) all separately add $F_{13}$, and IAdd(1), IAdd(10), IAdd(34), IAdd(36), IAdd(46), IAdd(60), IAdd(61) all separately subtract $F_{13}$.

During cycle 15, $F_{14}$ and $F_7$ are provided to the input bus and $F_7$ is multiplied by $c_4$. Additionally, IAdd(18), IAdd(24), IAdd(42), IAdd(61) all separately add $c_4F_6$, IAdd(10), IAdd(30), IAdd(38), IAdd(50) all separately subtract $c_4F_6$, IAdd(16), IAdd(17), IAdd(19), IAdd(32), IAdd(41), IAdd(43), IAdd(62), IAdd(63) all separately add $F_{14}$, and IAdd (9), IAdd (11), IAdd (29), IAdd (31), IAdd(37), IAdd(39), IAdd(49), IAdd(51) all separately subtract $F_{14}$.

During cycle 16, $F_{28}$ and $F_{21}$ are provided to the input bus. Additionally, IAdd(16), IAdd(19), IAdd(33), IAdd(53) all separately add $c_4F_7$, IAdd(13), IAdd(25), IAdd(43), IAdd(63) all separately subtract $c_4F_7$, IAdd (16), IAdd (21), IAdd (25), IAdd (29), IAdd (47), IAdd(48), IAdd(49), IAdd(51) all separately add $F_{21}$, IAdd (9), IAdd (11), IAdd (23), IAdd (33), IAdd (37), IAdd(45), IAdd(59), IAdd(63) all separately subtract $F_{21}$, IAdd (8), IAdd (16), IAdd (25), IAdd (31), IAdd (33), IAdd(39), IAdd(57), IAdd(63) all separately add $F_{28}$, and IAdd (9), IAdd (15), IAdd (17), IAdd (23), IAdd (41), IAdd(47), IAdd(49), IAdd(55) all separately subtract $F_{28}$.

During cycle 17, $F_{42}$ and $F_{35}$ are provided to the input bus. Additionally, IAdd(8), IAdd(13), IAdd(16), IAdd(31), IAdd(33), IAdd(43), IAdd(45), IAdd(51) all separately add $F_{35}$, IAdd(11), IAdd(19), IAdd(21), IAdd(25), IAdd(39), IAdd(53), IAdd(57), IAdd(63) all separately subtract. $F_{35}$, IAdd(9), IAdd(16), IAdd(21), IAdd(45), IAdd(48), IAdd(49), IAdd(59), IAdd(63) all separately add $F_{42}$, and IAdd(13), IAdd(17), IAdd(27), IAdd(31), IAdd(35), IAdd(39), IAdd(41), IAdd(53) all separately subtract $F_{42}$.

During cycle 18, $F_{56}$ and $F_{49}$ are provided to the input bus and $F_{56}$ is multiplied by $c_4$. Additionally, IAdd (11), IAdd (16), IAdd (17), IAdd (25), IAdd (32), IAdd(35), IAdd(45), IAdd(55) all separately add $F_{49}$, and IAdd (15), IAdd (21), IAdd (27), IAdd (33), IAdd (41), IAdd(51), IAdd(62), IAdd(63) all separately subtract $F_{49}$.

During cycle 19, $F_{50}$ and $F_{57}$ are provided to the input bus. Additionally, IAdd (1), IAdd (3), IAdd (20), IAdd(40), IAdd(44), IAdd(60) all separately add $F_{50}$, IAdd(4), IAdd(6), IAdd(12), IAdd(28), IAdd(36), IAdd(52) all separately subtract $F_{50}$, IAdd(15), IAdd(16), IAdd (23), IAdd (31), IAdd (39), IAdd (47), IAdd (55), IAdd(63) all separately add $c_4F_{56}$, IAdd(7), IAdd(12), IAdd(18), IAdd(24), IAdd(34), IAdd(44), IAdd(54) all separately add $F_{57}$, and IAdd (5), IAdd (14), IAdd (20), IAdd(26), IAdd(42), IAdd(52), IAdd(61) all separately subtract $F_{57}$.

During cycle 20, $F_{36}$ and $F_{43}$ are provided to the input bus. Additionally, IAdd(0), IAdd(2), IAdd(5), IAdd(7) all separately add $F_{36}$, IAdd(1), IAdd(3), IAdd(4), IAdd(6) all separately subtract $F_{36}$, IAdd(5), IAdd(12), IAdd(30), IAdd(44), IAdd(46), IAdd(50), IAdd(56) all separately add $F_{43}$, and IAdd(7), IAdd(10), IAdd(20), IAdd(22), IAdd(38), IAdd(52), IAdd(58) all separately subtract $F_{43}$.

During cycle 21, $F_{29}$ and $F_{22}$ are provided to the input bus. Additionally, IAdd(4), IAdd(6), IAdd(20), IAdd (40), IAdd (44), IAdd (60) all separately add $F_{22}$, IAdd(1), IAdd(3), IAdd(12), IAdd(28), IAdd(36), IAdd(52) all separately subtract $F_{22}$, IAdd(7), IAdd(20), IAdd(30), IAdd(46), IAdd(50), IAdd(52), IAdd(56) all separately add $F_{29}$, IAdd(5), IAdd(10), IAdd(12), IAdd(22), IAdd(38), IAdd(44), IAdd(58) all separately subtract $F_{29}$.

During cycle 22, $F_{15}$ and $F_{23}$ are provided to the input bus. Additionally, IAdd(5), IAdd(18), IAdd(20), IAdd (24), IAdd (34), IAdd (52), IAdd (54) all separately add $F_{15}$ and IAdd (7), IAdd (12), IAdd (14), IAdd (26), IAdd(42), IAdd(44), IAdd(61) all separately subtract $F_{15}$.

During cycle 23, $F_{30}$ and $F_{37}$ are provided to the input bus. Additionally, IAdd(17), IAdd(21), IAdd(32), IAdd(33), IAdd(35), IAdd(51), IAdd(55), IAdd(63) all separately add $F_{23}$, IAdd(11), IAdd(15), IAdd(16), IAdd(25), IAdd(27), IAdd(41), IAdd(45), IAdd(62) all separately subtract $F_{23}$, IAdd(17), IAdd(21), IAdd(31), IAdd(39), IAdd(41), IAdd(45), IAdd(48), IAdd(59) all separately add $F_{30}$, IAdd(9), IAdd(13), IAdd(16), IAdd(27), IAdd(35), IAdd(49), IAdd(53), IAdd(63) all separately subtract $F_{30}$, IAdd(8), IAdd(19), IAdd(25), IAdd(31), IAdd(45), IAdd(51), IAdd(53), IAdd(63) all separately add $F_{37}$, and IAdd(11), IAdd(13), IAdd(16), IAdd(21), IAdd(33), IAdd(39), IAdd(43), IAdd(57) all separately subtract $F_{37}$.

During cycle 24, $F_{44}$ and $F_{51}$ are provided to the input bus. Additionally, IAdd(8), IAdd(15), IAdd(23), IAdd(25), IAdd(33), IAdd(47), IAdd(55), IAdd(57) all separately add $F_{44}$, IAdd(9), IAdd(16), IAdd(17), IAdd(31), IAdd(39), IAdd(41), IAdd(49), IAdd(63) all separately subtract $F_{44}$, IAdd(11), IAdd(29), IAdd(33), IAdd(45), IAdd(47), IAdd(48), IAdd(49), IAdd(63) all separately add $F_{51}$, IAdd(9), IAdd(16), IAdd(21), IAdd(23), IAdd(25), IAdd(37), IAdd(51), IAdd(59) all separately subtract $F_{51}$.

During cycle 25 $F_{58}$ and $F_{59}$ are provided to the input bus. Additionally, IAdd (9), IAdd (19), IAdd (31), IAdd(32), IAdd(39), IAdd(43), IAdd(49), IAdd(62) all separately add $F_{58}$, IAdd(11), IAdd(16), IAdd(17), IAdd(29), IAdd(37), IAdd(41), IAdd(51), IAdd(63) all separately subtract $F_{58}$, IAdd(3), IAdd(10), IAdd(28), IAdd(34), IAdd(40), IAdd(46), IAdd(61) all separately add $F_{59}$, and IAdd (1), IAdd (22), IAdd (24), IAdd (26), IAdd(36), IAdd(50), IAdd(60) all separately subtract $F_{59}$.

During cycle 26, $F_{52}$ and $F_{45}$ are provided to the input bus. Additionally, IAdd(0), IAdd(18), IAdd(26), IAdd(44), IAdd(52), IAdd(54), IAdd(61) all separately add $F_{45}$, IAdd (2), IAdd (12), IAdd (14), IAdd (20), IAdd (24), IAdd(34), IAdd(42) all separately subtract $F_{45}$, IAdd(14), IAdd(22), IAdd(26), IAdd(34), IAdd(46), IAdd(54), IAdd(56), IAdd(58) all separately add $F_{52}$, IAdd(10), IAdd (18), IAdd (24), IAdd (30), IAdd (38), IAdd (42), IAdd(50), IAdd(61) all separately subtract $F_{52}$. Additionally, IAdd(16) provides $\tau_{16}$ to Sbus(5) and IAdd(63) provides $\tau_{63}$ to Sbus(4).

During cycle 27, $F_{38}$ and $F_{31}$ are provided to the input bus. Additionally, IAdd(6), IAdd(22), IAdd(34), IAdd(36), IAdd(40), IAdd(50), IAdd(61) all separately add $F_{31}$, IAdd (4), IAdd (10), IAdd (24), IAdd (26), IAdd (28), IAdd(46), IAdd(60) all separately subtract $F_{31}$, IAdd(18), IAdd (22), IAdd (30), IAdd (38), IAdd (42), IAdd (46), IAdd(56), IAdd(58) all separately add $F_{38}$, and IAdd(10), IAdd(14), IAdd(24), IAdd(26), IAdd(34), IAdd(50), IAdd (54), IAdd (61) all separately subtract $F_{38}$. Additionally, Cmult(1) provides $c_1 \cdot \tau_{63}$ to Pbus(6), Rmult(1) provides $c_1 \cdot \tau_{16}$ to Pbus(5), Cmult(3) provides $c_3 \cdot \tau_{63}$ to Pbus(4), Cmult(5) provides $c_5 \cdot \tau_{16}$ to Pbus(3), Rmult(5) provides $c_5 \cdot \tau_{63}$ to Pbus(2), Cmult(7) provides $c_7 \cdot \tau_{63}$ to Pbus(1), and Rmult(7) provides $c_7 \cdot \tau_{16}$ to Pbus(0).

During cycle 28, $F_{39}$ and $F_{46}$ are provided to the input bus. Additionally, IAdd(15), IAdd(17), IAdd(23), IAdd(35), IAdd(37), IAdd(48), IAdd(49), IAdd(62) all separately add $F_{39}$, IAdd(9), IAdd(27), IAdd(29), IAdd(32), IAdd(41), IAdd(47), IAdd(55), IAdd(59) all separately subtract $F_{39}$, IAdd (8), IAdd (19), IAdd (23), IAdd(29), IAdd(37), IAdd(43), IAdd(47), IAdd(57) all separately add $F_{46}$, and IAdd(11), IAdd(15), IAdd(25), IAdd(32), IAdd(33), IAdd(51), IAdd(55), IAdd(62) all separately subtract $F_{46}$. Also, IAdd(24) provides $\tau_{24}$ to Sbus(5), IAdd(26) provides $\tau_{26}$ to Sbus(4), IAdd(34) provides $\tau_{34}$ to Sbus(3), and IAdd(61) provides $\tau_{61}$ to Sbus (2). Also, Cmult (3) provides $c_3 \cdot \tau_{16}$ to Pbus (6).

During cycle 29, $F_{53}$ and $F_{60}$ are provided to the input bus. Additionally, IAdd(8), IAdd(17), IAdd(27), IAdd(39), IAdd(43), IAdd(53), IAdd(55), IAdd(62) all separately add $F_{53}$, IAdd(13), IAdd(15), IAdd(19), IAdd(31), IAdd(32), IAdd(35), IAdd(41), IAdd(57) all separately subtract $F_{53}$, IAdd(13), IAdd(21), IAdd(27), IAdd(35), IAdd(45), IAdd(48), IAdd(53), IAdd(59) all separately add $F_{60}$, and IAdd(11), IAdd(19), IAdd(29), IAdd(32), IAdd(37), IAdd(43), IAdd(51), IAdd(62) all separately subtract $F_{60}$. Also, Cmult (2) provides $c_2 \cdot \tau_{34}$ to Pbus(6) and Cmult(6) provides $c_6 \cdot \tau_{24}$ to Pbus(5).

During cycle 30, $F_{61}$ and $F_{54}$ are provided to the input bus. Additionally, IAdd(0), IAdd(2), IAdd(20), IAdd(28), IAdd(36), IAdd(44) all separately add $F_{54}$, IAdd(5), IAdd(7), IAdd(12), IAdd(40), IAdd(52), IAdd(60) all separately subtract $F_{54}$, IAdd(6), IAdd(28), IAdd(38), IAdd(42), IAdd(54), IAdd(56), IAdd(60) all separately add $F_{61}$, and IAdd(4), IAdd(14), IAdd(18), IAdd(30), IAdd(36), IAdd(40), IAdd(58) all separately subtract $F_{61}$. Also, IAdd(11) provides $\tau_{11}$ to Sbus(5), IAdd(17) provides $\tau_{17}$ to Sbus(4), IAdd(32) provides $\tau_{32}$ to Sbus(3), IAdd(41) provides $\tau_{41}$ to Sbus(2), IAdd(51) provides $\tau_{51}$ to Sbus(1), and IAdd(62) provides $\tau_{62}$ to Sbus(0). Also, Cmult(2) provides $c_2 \cdot \tau_{26}$ to Pbus(6) and Cmult(6) provides $c_6 \cdot \tau_{61}$ to Pbus (5).

During cycle 31, $F_{47}$ and $F_{55}$ are provided to the input bus. Additionally, IAdd (3), IAdd (14), IAdd (18), IAdd(36), IAdd(38), IAdd(56), IAdd(60) all separately add $F_{47}$, IAdd(1), IAdd(28), IAdd(30), IAdd(40), IAdd(42), IAdd(54), IAdd(58) all separately subtract $F_{47}$, IAdd(8), IAdd(13), IAdd(19), IAdd(37), IAdd(39), IAdd(47), IAdd(49), IAdd(59) all separately add $F_{55}$, and IAdd(9), IAdd(23), IAdd(29), IAdd(31), IAdd(43), IAdd(48), IAdd (53), IAdd (57) all separately subtract $F_{55}$. Also, IAdd(4) provides $\tau_4$ to Sbus(5), IAdd(5) provides $\tau_5$ to Sbus(4), IAdd(6) provides $\tau_6$ to Sbus(3), and IAdd(7) provides $\tau_7$ to Sbus(2). Also, Cmult(1) provides $c_1 \cdot \tau_{51}$ to Pbus (6), Rmult (1) provides $c_1 \cdot \tau_{32}$ to Pbus (5), Cmult (2) provides $c_2 \cdot \tau_{61}$ to Pbus (4), Cmult (3) provides $c_3 \cdot \tau_{51}$ to Pbus(3), Cmult(5) provides $c_5 \cdot \tau_{51}$ to Pbus(2), Cmult(7) provides $c_7 \cdot \tau_{51}$ to Pbus(1) and Rmult(7) provides $c_7 \cdot \tau_{41}$ to Pbus (0).

During cycle 32, $F_{62}$ and $F_{63}$ are provided to the input bus. Additionally, IAdd(8), IAdd(15), IAdd(21), IAdd(27), IAdd(35), IAdd(45), IAdd(55), IAdd(57) all separately add $F_{62}$, IAdd (13), IAdd (23), IAdd (25), IAdd(33), IAdd(47), IAdd(48), IAdd(53), IAdd(59) all separately subtract $F_{62}$, IAdd(0), IAdd(12), IAdd(20), IAdd(38), IAdd(46), IAdd(50), IAdd(58) all separately add $F_{63}$, and IAdd (2), IAdd (10), IAdd (22), IAdd (30), IAdd(44), IAdd(52), IAdd(56) all separately subtract $F_{63}$. Also, IAdd(37) provides $\tau_{37}$ to Sbus(5) and IAdd(54) provides $\tau_{54}$ to Sbus(4). Also, Cmult(0) provides $c_0 \cdot \tau_5$ on Pbus(6), Cmult(1) provides $c_1 \cdot \tau_{17}$ on Pbus(5), Rmult(1) provides $c_1 \cdot \tau_{62}$ on Pbus(4), Cmult(2) provides $c_2 \cdot \tau_{24}$ to Pbus (3), Cmult (3) provides $c_3 \cdot \tau_{41}$ to Pbus (2), Cmult (5) provides $c_5 \cdot \tau_{41}$ to Pbus (1), and Cmult (7) provides $c_7 \cdot \tau_{32}$ to Pbus (0)

During cycle 33, IAdd(10) provides $\tau_{10}$ to Sbus(5), IAdd(14) provides $\tau_{14}$ to Sbus(4), IAdd(22) provides $\tau_{22}$ to Sbus(3), IAdd(40) provides $\tau_{40}$ to Sbus(2), IAdd(50) provides $\tau_{50}$ to Sbus(1), and IAdd(52) provides $\tau_{52}$ to Sbus (0). Also, Cmult (0) provides $c_0 \cdot \tau_7$ to Pbus (6), Cmult (2) provides $c_2 \cdot \tau_{54}$ to Pbus (5), Cmult (3) provides $c_3 \cdot \tau_{11}$ to Pbus(4), Rmult(3) provides $c_3 \cdot \tau_{32}$ to Pbus(3), Cmult(5) provides $c_5 \cdot \tau_{11}$ to Pbus(2), Cmult(6) provides $c_6 \cdot \tau_{54}$ to Pbus(1), and Cmult(7) provides $c_7 \cdot \tau_{17}$ to Pbus(0).

During cycle 34, IAdd (9) provides $\tau_9$ to Sbus (5), IAdd (20) provides $\tau_{20}$ to Sbus (4), IAdd (23) provides $\tau_{23}$ to Sbus(3), IAdd(47) provides $\tau_{47}$ to Sbus(2), and IAdd(49) provides $\tau_{49}$ to Sbus(1). Also, Cmult(1) provides $c_1 \cdot \tau_{37}$ to Pbus(6), Rmult(1) provides $c_1 \cdot \tau_{41}$ to Pbus(5), Cmult(2) provides $c_2 \cdot \tau_{22}$ to Pbus (4), Cmult (4) provides $c_4 \cdot \tau_{40}$ to Pbus(3), Cmult(5) provides $c_5 \cdot \tau_{37}$ to Pbus(2), Cmult(6) provides $c_6 \cdot \tau_{26}$ to Pbus (1), and Cmult (7) provides $c_7 \cdot \tau_{11}$ to Pbus (0).

During cycle 35, IAdd(19) provides $\tau_{19}$ to Sbus(5), IAdd (27) provides $\tau_{27}$ to Sbus (4), IAdd (36) provides $\tau_{36}$ to Sbus(3), IAdd(43) provides $\tau_{43}$ to Sbus(2), IAdd(55) provides $\tau_{55}$ to Sbus(1) and IAdd(60) provides $\tau_{60}$ to Sbus(0). Additionally, Cmult(1) provides $c_1 \cdot \tau_9$ to Pbus(6), Cmult(2) provides $c_2 \cdot \tau_{10}$ to Pbus(5), Cmult(3) provides $c_3 \cdot \tau_{23}$ to Pbus (4), Rmult (3) provides $c_3 \cdot \tau_{62}$ to Pbus(3), Cmult(5) provides $c_5 \cdot \tau_{17}$ to Pbus(2), Cmult(6) provides $c_6 \cdot \tau_{10}$ to Pbus(1), and Cmult(7) provides $c_7 \cdot \tau_{23}$ to Pbus (0)

During cycle 36, IAdd(15) provides $\tau_{15}$ to Sbus(5), IAdd(21) provides $\tau_{21}$ to Sbus(4), IAdd(28) provides $\tau_{28}$ to Sbus(3), IAdd(30) provides $\tau_{30}$ to Sbus(2), IAdd(45) provides $\tau_{45}$ to Sbus(1) and IAdd(59) provides $\tau_{59}$ to Sbus(0). Additionally, Cmult(1) provides $c_1 \cdot \tau_{47}$ to Pbus(6), Cmult(3) provides $c_3 \cdot \tau_{27}$ to Pbus(5), Cmult(4) provides $c_4 \cdot \tau_{52}$ to Pbus(4), Cmult(5) provides $c_5 \cdot \tau_{47}$ to Pbus(3), Rmult(5) provides $c_5 \cdot \tau_{19}$ to Pbus(2), Cmult(7) provides $c_7 \cdot \tau_{37}$ to Pbus(1), and Rmult(7) provides $c_7 \cdot \tau_{27}$ to Pbus(0), During cycle 37, IAdd(3) provides $\tau_3$ to Sbus(5), IAdd(13) provides $\tau_{13}$ to Sbus(4), IAdd(25) provides $\tau_{25}$ to Sbus(3), IAdd(48) provides $\tau_{48}$ to Sbus(2), IAdd(57) provides $\tau_{57}$ to Sbus(1) and IAdd(53) provides $\tau_{53}$ to Sbus(0). Additionally, Cmult(1) provides $c_1 \cdot \tau_{45}$ to Pbus(6), Rmult(1) provides $c_1 \cdot \tau_{43}$ to Pbus(5), Cmult(3) provides $c_3 \cdot \tau_{49}$ to Pbus (4), Cmult (5) provides $c_5 \cdot \tau_{49}$ to Pbus(3), Rmult(5) provides $c_5 \cdot \tau_{15}$ to Pbus(2), Cmult(6) provides $c_6 \cdot \tau_{30}$ to Pbus (1), and Cmult (7) provides $c_7 \cdot \tau_9$ to Pbus (0).

During cycle 38, IAdd(12) provides $\tau_{12}$ to Sbus(5), IAdd(44) provides $\tau_{44}$ to Sbus(4), IAdd(56) provides $\tau_{56}$ to Sbus(3) and IAdd(58) provides $\tau_{58}$ to Sbus(2). Additionally, Cmult(1) provides $c_1 \cdot \tau_{49}$ to Pbus(6), Cmult(3) provides $c_3 \cdot \tau_{55}$ to Pbus(5), Rmult(3) provides $c_3 \cdot \tau_{45}$ to Pbus (4), Cmult (4) provides $c_4 \cdot \tau_{36}$ to Pbus (3), Cmult (5) provides $c_5 \cdot \tau_{48}$ to Pbus (2), Rmult (5) provides $c_5 \cdot \tau_{13}$ to Pbus(1), and Cmult(7) provides $c_7 \cdot \tau_{15}$ to Pbus(0).

During cycle 39, IAdd(0) provides $\tau_0$ to Sbus(5), IAdd (1) provides $\tau_1$ to Sbus (4), IAdd (2) provides $\tau_2$ to Sbus(3), IAdd(29) provides $\tau_{29}$ to Sbus(2), and IAdd(35) provides $\tau_{35}$ to Sbus(1). Additionally, Cmult(3) provides $c_3 \cdot \tau_{19}$ to Pbus (6), Rmult (3) provides $c_3 \cdot \tau_9$ to Pbus (5), Cmult (4) provides $c_4 \cdot \tau_{60}$ to Pbus (4), Cmult (5) provides $c_5 \cdot \tau_{43}$ to Pbus(3), Rmult(5) provides $c_5 \cdot \tau_{27}$ to Pbus(2), Cmult(6) provides $c_6 \cdot \tau_{34}$ to Pbus(1), and Cmult(7) provides $c_7 \cdot \tau_{55}$ to Pbus(0).

During cycle 40, IAdd(8) provide $\tau_8$ to Sbus(5), IAdd(18) provide $\tau_{18}$ to Sbus(4), IAdd(33) provide $\tau_{33}$ to Sbus(3), and IAdd(46) provide $\tau_{46}$ to Sbus(2). Additionally, Cmult(2) provides $c_2 \cdot \tau_{56}$ to Pbus(6), Cmult (3) provides $c_3 \cdot \tau_{21}$ to Pbus (5), Rmult (3) provides $c_3 \cdot \tau_{35}$ to Pbus (4), Cmult (4) provides $c_4 \cdot \tau_{44}$ to Pbus (3), Cmult (5) provides $c_5 \cdot \tau_{25}$ to Pbus (2), Cmult (7) provides $c_7 \cdot \tau_{59}$ to Pbus(1) and Rmult(7) provides $c_7 \cdot \tau_{47}$ to Pbus(0).

During cycle 41, IAdd (31) provides $\tau_{31}$ to Sbus (5), IAdd(38) provides $\tau_{38}$ to Sbus(4), IAdd(39) provides $\tau_{39}$ to Sbus (3), and IAdd (42) provides $\tau_{42}$ to Sbus (2). Additionally, Cmult(0) provides $c_0 \cdot \tau_6$ to Pbus(6), Cmult (1) provides $c_1 \cdot \tau_{23}$ to Pbus (5), Cmult (3) provides $c_3 \cdot \tau_{59}$ to Pbus (4), Cmult (5) provides $c_5 \cdot \tau_{21}$ to Pbus (3), Rmult (5) provides $c_5 \cdot \tau_{55}$ to Pbus (2), Cmult (6) provides $c_6 \cdot \tau_{56}$ to Pbus(1), and Cmult(7) provides $c_7 \cdot \tau_{29}$ to Pbus(0).

During cycle 42, Cmult(1) provides $c_1 \cdot \tau_{15}$ to Pbus(6), Rmult(1) provides $c_1 \cdot \tau_{53}$ to Pbus(5), Cmult(4) provides $c_4 \cdot \tau_{28}$ to Pbus (4), Cmult (2) provides $c_2 \cdot \tau_{38}$ to Pbus (3), Cmult(5) provides $c_5 \cdot \tau_{62}$ to Pbus(2), Cmult(7) provides $c_7 \cdot \tau_{21}$ to Pbus(1), and Rmult(7) provides $c_7 \cdot \tau_8$ to Pbus(0).

During cycle 43, Cmult (0) provides $c_0 \cdot \tau_0$ to Pbus (6), Cmult(1) provides $c_1 \cdot \tau_{33}$ to Pbus(5), Rmult(1) provides $c_1 \cdot \tau_{35}$ to Pbus (4), Cmult (3) provides $c_3 \cdot \tau_{25}$ to Pbus (3), Cmult (5) provides $c_5 \cdot \tau_{59}$ to Pbus (2), Cmult (6) provides $c_6 \cdot \tau_{42}$ to Pbus (1), and Cmult (7) provides $c_7 \cdot \tau_{48}$ to Pbus (0).

During cycle 44, Cmult(0) provides $c_0 \cdot \tau_4$ to Pbus(6), Cmult(1) provides $c_1 \cdot \tau_{25}$ to Pbus(5), Cmult(2) provides $c_2 \cdot \tau_{46}$ to Pbus (4), Cmult (3) provides $c_3 \cdot \tau_{53}$ to Pbus(3), Rmult(3) provides $c_3 \cdot \tau_{13}$ to Pbus(2), Cmult(5) provides $c_5 \cdot \tau_8$ to Pbus (1), and Cmult (6) provides $c_6 \cdot \tau_{38}$ to Pbus (0).

During cycle 45, Cmult(1) provides $c_1 \cdot \tau_{39}$ to Pbus(6), Rmult (1) provides $c_1 \cdot \tau_{31}$ to Pbus (5), Cmult (2) provides $c_2 \cdot \tau_{58}$ to Pbus(4), Cmult(3) provides $c_3 \cdot \tau_{39}$ to Pbus(3), Rmult(4) provides $c_4 \cdot \tau_{12}$ to Pbus(2), Cmult(7) provides $c_7 \cdot \tau_{45}$ to Pbus(1), and Rmult(7) provides $c_7 \cdot \tau_{25}$ to Pbus(0).

During cycle 46, Cmult(1) provides $c_1 \cdot \tau_{29}$ to Pbus(6), Cmult (3) provides $c_3 \cdot \tau_{29}$ to Pbus (5), Rmult (3) provides $c_3 \cdot \tau_{15}$ to Pbus(4), Cmult(5) provides $c_5 \cdot \tau_{45}$ to Pbus(3), Rmult (5) provides $c_5 \cdot \tau_9$ to Pbus (2), Cmult (7) provides $c_7 \cdot \tau_{31}$ to Pbus(1), and Rmult(7) provides $c_7 \cdot \tau_{43}$ to Pbus(0).

During cycle 47, Cmult(1) provides $c_1 \cdot \tau_{57}$ to Pbus(6), Rmult(1) provides $c_1 \cdot \tau_{13}$ to Pbus(5), Cmult(2) provides $c_2 \cdot \tau_{42}$ to Pbus (4), Cmult (3) provides $c_3 \cdot \tau_8$ to Pbus (3), Rmult(3) provides $c_3 \cdot \tau_{43}$ to Pbus(2), Cmult(4) provides $c_4 \cdot \tau_{20}$ to Pbus(1), and Cmult(7) provides $c_7 \cdot \tau_{57}$ to Pbus(0).

During cycle 48, Cmult(1) provides $c_1 \cdot \tau_{11}$ to Pbus(6), Cmult(2) provides $c_2 \cdot \tau_{50}$ to Pbus(5), Cmult(3) provides $c_3 \cdot \tau_{31}$ to Pbus (4), Rmult (3) provides $c_3 \cdot \tau_{17}$ to Pbus (3), Cmult(5) provides $c_5 \cdot \tau_{39}$ to Pbus(2), Cmult(7) provides $c_7 \cdot \tau_{62}$ to Pbus(1), and Rmult(7) provides $c_7 \cdot \tau_{49}$ to Pbus(0).

During cycle 49, Cmult(0) provides $c_0 \cdot \tau_2$ to Pbus(6), Cmult(1) provides $c_1 \cdot \tau_{55}$ to Pbus(5), Cmult(2) provides $c_2 \cdot \tau_{18}$ to Pbus(4), Cmult(5) provides $c_5 \cdot \tau_{23}$ to Pbus(3), Rmult(5) provides $c_5 \cdot \tau_{57}$ to Pbus(2), Cmult(6) provides $c_6 \cdot \tau_{58}$ to Pbus (1), and Cmult (7) provides $c_7 \cdot \tau_{53}$ to Pbus (0).

During cycle 50, Cmult(0) provides $c_0 \cdot \tau_1$ to Pbus(6), Rmult(1) provides $c_1 \cdot \tau_{48}$ to Pbus(5), Cmult(1) provides $c_1 \cdot \tau_{59}$ to Pbus(4), Cmult(2) provides $c_2 \cdot \tau_{14}$ to Pbus(3), Cmult(3) provides $c_3 \cdot \tau_{57}$ to Pbus(2), Rmult(3) provides $c_3 \cdot \tau_{47}$ to Pbus (1), and Cmult (6) provides $c_6 \cdot \tau_{22}$ to Pbus (0).

During cycle 51, Cmult(0) provides $c_0 \cdot \tau_3$ to Pbus(6), Cmult(1) provides $c_1 \cdot \tau_{21}$ to Pbus(5), Cmult(3) provides $c_3 \cdot \tau_{37}$ to Pbus(4), Cmult(5) provides $c_5 \cdot \tau_{35}$ to Pbus(3), Rmult(5) provides $c_5 \cdot \tau_{31}$ to Pbus(2), Cmult(6) provides $c_6 \cdot \tau_{18}$ to Pbus(1), and Cmult(7) provides $c_7 \cdot \tau_{19}$ to Pbus(0).

During cycle 52, Cmult(2) provides $c_2 \cdot \tau_{30}$ to Pbus(6), Cmult (3) provides $c_3 \cdot \tau_{48}$ to Pbus (5), Cmult (5) provides $c_5 \cdot \tau_{33}$ to Pbus(4), Rmult(5) provides $c_5 \cdot \tau_{32}$ to Pbus(3), Cmult(6) provides $c_6 \cdot \tau_{50}$ to Pbus(2), Cmult(7) provides $c_7 \cdot \tau_{39}$ to Pbus(1), and Rmult(7) provides $c_7 \cdot \tau_{33}$ to Pbus(0).

During cycle 53, Cmult(1) provides $c_1 \cdot \tau_{19}$ to Pbus(6), Rmult(1) provides $c_1 \cdot \tau_{27}$ to Pbus(5), Cmult(5) provides $c_5 \cdot \tau_{29}$ to Pbus(4), Rmult(5) provides $c_5 \cdot \tau_{53}$ to Pbus(3), Cmult(6) provides $c_6 \cdot \tau_{14}$ to Pbus(2), Cmult(7) provides $c_7 \cdot \tau_{13}$ to Pbus(1), and Rmult(7) provides $c_7 \cdot \tau_{35}$ to Pbus(0).

During cycle 54, Cmult (1) provides $c_1 \cdot \tau_8$ to Pbus (2), Cmult (3) provides $c_3 \cdot \tau_{33}$ to Pbus (1), and Cmult (6) provides $c_6 \cdot \tau_{46}$ to Pbus(0).

During cycle 55, OAdd (0) and OAdd (1) provide $f_0$ and $f_1$ to the output bus. During cycle 56, provide OAdd(2) and OAdd(3) place $f_2$ and $f_3$ to the output bus. During cycle 57, OAdd(4) and 0Add(5) provide $f_4$ and $f_5$ to the output bus.

During cycle 58, OAdd (6) and OAdd (7) provide $f_6$ and $f_7$ to the output bus. During cycle 59, OAdd(8) and OAdd(9) provide $f_8$ and $f_9$ to the output bus. During cycle 60, OAdd(10) and OAdd(11) provide $f_{10}$ and $f_{11}$ to the output bus. During cycle 61, OAdd (12) and OAdd (13) provide $f_{12}$ and $f_{13}$ to the output bus. During cycle 62, OAdd (14) and OAdd (15) provide $f_{14}$ and $f_{15}$ to the output bus. During cycle 63, OAdd(16) and OAdd(17) provide and $f_{17}$ to the output bus. During cycle 64, OAdd(18) and OAdd(19) provide $f_{18}$ and $f_{19}$ to the output bus. During cycle 65, OAdd(20) and OAdd(21) provide $f_{20}$ and $f_{21}$ to the output bus. During cycle 66, OAdd(22) and OAdd(23) provide $f_{22}$ and $f_{23}$ to the output bus. During cycle 67, OAdd (24) and OAdd (25) provide $f_{24}$ and $f_{25}$ to the output bus. During cycle 68, OAdd(26) and OAdd(27) provide $f_{26}$ and $f_{27}$ to the output bus. During cycle 69, OAdd(28) and OAdd(29) provide $f_{28}$ and $f_{29}$ to the output bus. During cycle 70, OAdd (30) and OAdd (31) provide $f_{30}$ and $f_{31}$ to the output bus. During cycle 71, OAdd(32) and OAdd(33) provide $f_{32}$ and $f_{33}$ to the output bus. During cycle 72, OAdd (34) and OAdd (35) provide $f_{34}$ and $f_{35}$ to the output bus. During cycle 73, OAdd(36) and OAdd(37) provide $f_{36}$ and $f_{37}$ to the output bus. During cycle 74, OAdd(38) and OAdd(39) provide $f_{38}$ and $f_{39}$ to the output bus. During cycle 75, OAdd (40) and OAdd (41) provide $f_{40}$ and $f_{41}$ to the output bus. During cycle 76, OAdd(42) and OAdd(43) provide $f_{42}$ and $f_{43}$ to the output bus. During cycle 77, OAdd(44) and OAdd(45) provide $f_{44}$ and $f_{45}$ to the output bus. During cycle 78, OAdd(46) and OAdd(47) provide $f_{46}$ and $f_{47}$ to the output bus. During cycle 79, OAdd(48) and OAdd(49) provide $f_{48}$ and $f_{49}$ to the output bus. During cycle 80, OAdd(50) and OAdd(51) provide $f_{50}$ and $f_{51}$ to the output bus. During cycle 81, OAdd(52) and OAdd(53) provide $f_{52}$ and $f_{53}$ to the output bus. During cycle 82, OAdd (54) and OAdd (55) provide $f_{54}$ and $f_{55}$ to the output bus. During cycle 83, OAdd(56) and OAdd(57) provide $f_{56}$ and $f_{57}$ to the output bus. During cycle 84, OAdd(58) and OAdd(59) provide $f_{58}$ and $f_{59}$ to the output bus. During cycle 85, OAdd(60) and OAdd(61) provide $f_{60}$ and $f_{61}$ to the output bus. During cycle 86, OAdd(62) and OAdd(63) provide $f_{62}$ and $f_{63}$ to the output bus.

As with the forward transform, pipelining is used when performing the IDCT to allow more than one transform to be performed every 88 cycles. More specifically, after cycle 32, the input accumulators have finished with a first matrix, so that a second matrix can be provided to the input bus starting at cycle 33. Likewise at cycle 65, multiplication circuits have finished with the first matrix and so the second matrix may be provided to the multiplication circuits. Additionally, because the input accumulators are finished with the second matrix, a third matrix may be provided to the input bus.

Figure 3:
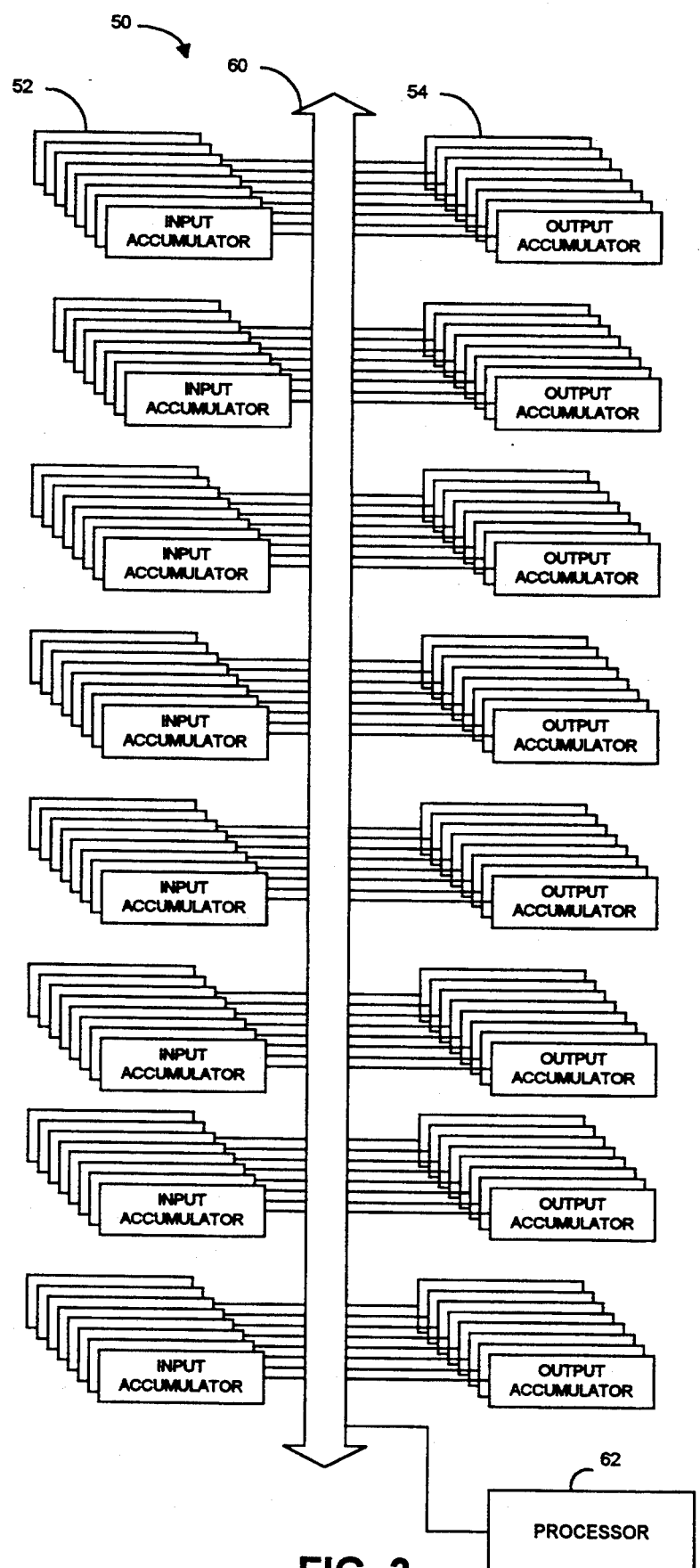
FIG. 3 shows a block diagram of a second DCT engine in accordance with the present invention.

Referring to FIG. 3, an alternate DCT engine, which functions as a peripheral device for a computer, is shown. DCT engine 50 includes a plurality of input accumulator circuits 52 and a plurality of output accumulator circuits 54. Input accumulator circuits 52 and output accumulator circuits 54 receive input data from and provide sum data to Input/Output (I/O) bus 60. I/O bus 60 is also coupled with a standard processor 62 of a computer system.

Input accumulator circuits 52 are arranged in an 8×8 matrix. For notation purposes, these accumulator circuits are referred to as IAdd(L), where L indicates the location of the adder circuit in the matrix which is indexed to correspond to a singly indexed vector.

Output accumulator circuits 54 are arranged as an 8×8 matrix. For notation purposes, these accumulator circuits are referred to as OAdd(L), where L indicates the location of the accumulator circuit in the matrix which is indexed to correspond to a singly indexed vector.

When performing a FDCT and a IDCT, the accumulation times account for a substantial percentage of the time required in performing the DCTs. Accordingly, by providing the matrices of input and output accumulator circuits, DCT engine 50 significantly increases the speed with which a DCT is performed when compared to performing the DCT solely using software with a computer system's processor.

Figure 4:
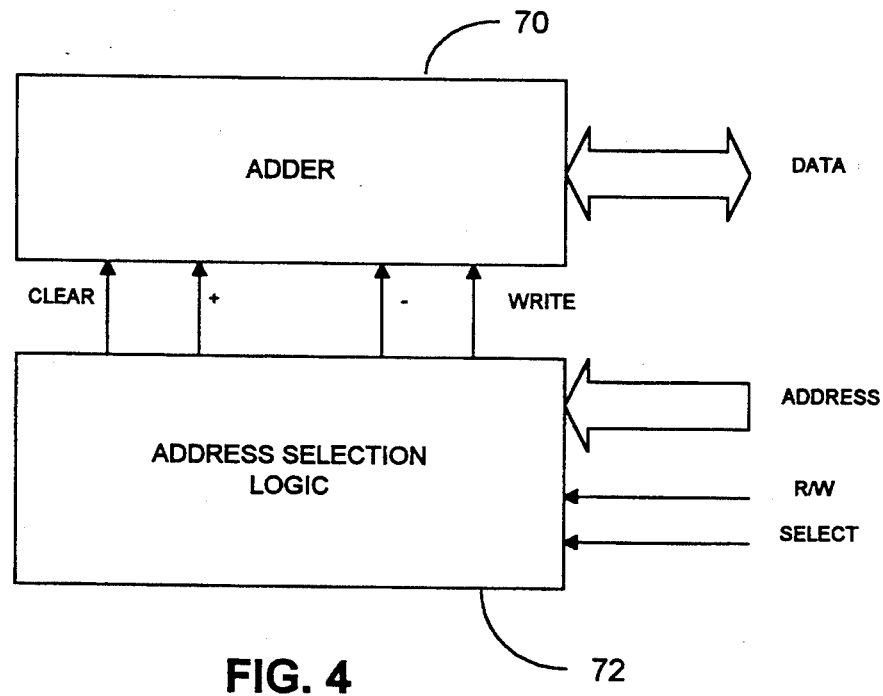
FIG. 4 shows an accumulator circuit of the FIG. 3 DCT engine.

Referring to FIG. 4, every input accumulator circuit 50 and every output accumulator circuit 52 includes arithmetic unit 70 and address selection unit 72. Arithmetic unit 70 is coupled with the data bus portion of I/O bus 60. Arithmetic unit 70 also receives a plurality of control signals from address selection unit 72; these control signals include an add signal (+), a subtract signal (−), a clear signal and a write signal. In addition to providing the control signals to arithmetic unit 70, address selection unit 72 is coupled to the address bus portion of I/O bus 60 and receives a plurality of control signals from the I/O bus; these control signals include a read/write (R/W) signal and a select signal.

Referring to FIGS. 3 and 4, input accumulator circuits 52 and output accumulator circuits 54 are memory mapped to occupy 704 locations in an address space. More specifically, input accumulator circuits 52 are accessed using 64 input accumulator write addresses ($II_0$ to $II_{63}$), input accumulator circuits 52 are accessed using input accumulator read addresses ($IC_0$ to $IC_{63}$), output accumulator circuits 54 are written using 512 (8 *64) output accumulator write addresses ($OI_0^0$ to $OI_{63}^7$) and output accumulator circuits 54 are accessed using output accumulator write addresses ($OC_0$ to $OC_{63}$). Two additional addresses, an input clear address (ICA) and an output clear address (OCA) are used to generate clear signals to the input accumulator circuits and the output accumulator circuits, respectively.

The operation of DCT engine 50 is similar to that of DCT engine 20. I.e., a plurality of transform coefficients are generated, a plurality of transform products are generated by multiplying the transform coefficients by transform constants and the plurality of transform products are accumulated to produce the transformed matrix. DCT engine 50 differs from DCT engine 20 in the way that the accumulators are accessed and in that DCT engine 50 does not include multiplication circuits. As the theory of the transform and the operation of the accumulators is similar to that of DCT engine 20, a description of the transform of location 0 of the matrix is sufficient to describe the operation of DCT engine 50.

When initiating a DCT, the processor clears all input accumulator circuits by writing to the ICA address and clears all output accumulator circuits by writing to the OCA address. Next, the processor writes the pixel matrix to the appropriate addresses $II_0$ to $II_{63}$. While this is occurring, IAdd(0)–IAdd(63) form the transform coefficients $\sigma_0$–$\sigma_{63}$. The processor then reads the transform coefficient $\sigma_0$ from IAdd(0) via the address $IC_0$. Using this transform coefficient in combination with the other transform coefficients as well as the transform constants, the processor which is coupled to I/O bus 60 generates the transform product values. These product values are written to the appropriate addresses to be read by the appropriate output accumulator circuits. For example, $c_7 \cdot \sigma_{63}$ is written to address $OI_{63}^7$. Accordingly, address selection unit 72 for the output accumulation circuits which require this transform product value access this address to add or subtract this value. The transformed output for location 0, which is produced by OAdd(0) is then accessed by the computer processor via address $OC_0$.

OTHER EMBODIMENTS

Other embodiments are within the following claims.

For example, a DCT engine may be arranged as a peripheral device which only includes the input accumulators as this is where the majority of the time for the transform is required. In this embodiment, the multiplication and the output accumulations are performed by a processor which is coupled to the DCT engine. Although this embodiment does not compute the transforms as quickly as the embodiment which includes both input and output accumulators, this embodiment requires only half the hardware of the embodiment which includes both input and output accumulators.

What is claimed is:

1. An apparatus for performing a discrete cosine transform on an input matrix of data elements to provide a transformed matrix of data elements, the input matrix and the output matrix each having a plurality of row locations and a plurality of column locations, the apparatus comprising
   a plurality of input accumulators, the plurality of input accumulators accumulating data elements from the input matrix of data elements in parallel to provide a plurality of transform coefficient outputs, the plurality of input accumulators corresponding to respective row and column locations of the input matrix, each input accumulator providing an individual transform coefficient;
   a plurality of multiplication circuits coupled with the plurality of input accumulators, the plurality of multiplication circuits receiving the plurality of transform coefficient outputs and multiplying the transform coefficient outputs by transform constants to provide a plurality of transform products; and
   a plurality of output accumulators coupled with the plurality of multiplication circuits, each output accumulator receiving the transform products and accumulating the products to provide the transformed matrix of data elements.

2. The apparatus of claim 1 wherein
   the input accumulators and the plurality of multiplication circuits are coupled via a transform coefficient bus.

3. The apparatus of claim 2 wherein
   the transform coefficient bus includes a plurality of buses, the plurality of buses being cross coupled so that transform coefficients from any accumulator circuit may be received by any multiplication circuit.

4. The apparatus of claim 1 wherein
   the multiplication circuits and the output accumulators are coupled via a product bus.

5. The apparatus of claim 4 wherein
   the product bus includes a plurality of product buses, the plurality of product buses being cross coupled so that transform products from any multiplication circuit may be received by any output accumulator circuit.

6. The apparatus of claim 1 wherein
   the plurality of output accumulators correspond to the row and column locations of the transformed matrix, and
   each output accumulator provides output data for an individual location of the transformed matrix of data elements.

7. The apparatus of claim 1 wherein
   the discrete cosine transform uses a discrete plurality of constants, the plurality of multiplication circuits correspond to the discrete plurality of constants, and each multiplication circuit multiplies the plurality of transform coefficients by one of the discrete plurality of constants.

8. An apparatus for performing a discrete cosine transform on a matrix of data elements to provide a transformed matrix of data elements, each matrix having a plurality of row locations and a plurality of column locations, the apparatus comprising a plurality of input accumulators, the plurality of input accumulators accumulating the input matrix of data elements in parallel to provide a plurality of transform coefficient outputs, the plurality of input accumulators corresponding to respective row and column locations of the input matrix, each input accumulator providing an individual transform coefficient;

means for multiplying, the means for multiplying receiving the plurality of transform coefficient outputs and multiplying the coefficient outputs by constants to provide a plurality of transform products; and means for output accumulation, the means for output accumulation receiving the transform products and adding the transform products to provide the transformed matrix of data elements.

9. The apparatus of claim 8 wherein
the input accumulators are coupled via an input/output bus.

10. The apparatus of claim 9 wherein
the discrete cosine transform uses a discrete plurality of constants,
the means for multiplying includes a computer processor coupled to the input output bus, the computer processor multiplying the plurality of transform coefficients by the discrete plurality of constants to provide the plurality of transform products.

11. The apparatus of claim 10 wherein
the means for output accumulation includes the computer processor, the computer processor accumulating the plurality of transform products to provide the transformed matrix of data elements.

12. The apparatus of claim 9 wherein
the means for output accumulation includes a plurality of output accumulators corresponding to the row and column locations of the transformed matrix, and each output accumulator provides output data element for an individual location of the transformed matrix of data elements.

13. The apparatus of claim 9 wherein
the discrete cosine transform uses a discrete plurality of constants,
the means for multiplying includes a plurality of multiplication circuits corresponding to the discrete plurality of constants, and each multiplication circuit multiplies the plurality of transform coefficients by one of the discrete plurality of constants.

14. A peripheral apparatus for accelerating arithmetic operations of a processor on a first matrix of first data elements to provide a second matrix of second data elements, the first and second matrices each having a plurality of row locations and a plurality of column locations, each data element of the first matrix of data elements having a first address corresponding thereto and each data element of the second matrix of data elements having a second address corresponding thereto, the apparatus comprising a bus having a data portion for transmitting the data elements and an address portion for transmitting addresses from the processor; and a plurality of accumulators coupled to the bus and arranged in a matrix corresponding to the first and second matrices of data elements, each of the plurality of accumulators including an arithmetic unit for performing arithmetic operations on the first data elements to provide second data elements, the arithmetic unit being coupled to the data portion of the bus; and an address selection unit for monitoring the bus for particular first addresses, causing the arithmetic unit to perform arithmetic operations on the first data elements corresponding to the particular first addresses in accordance with programmed rules that are determined by the particular first addresses and causing the arithmetic unit to provide the second data elements corresponding to particular second addresses to the data portion of the bus, the address selection unit being coupled to the address portion of the bus and to the arithmetic unit.

15. The apparatus of claim 14 wherein
the arithmetic unit performs additions and subtractions in accordance with the programmed rules.

16. The apparatus of claim 14 wherein
the arithmetic operations are performed to provide a discrete cosine transform.

17. The apparatus of claim 16 wherein
the second matrix of data elements correspond to transform coefficients for use in performing a discrete cosine transform.

18. A method for performing a discrete cosine transform on a matrix of data to provide a transformed matrix of data, the matrix of data having a plurality of row locations and a plurality of column locations, the method comprising providing a plurality of input accumulators, the plurality of input accumulators corresponding to respective row and column locations of the input matrix;

accumulating the input matrix of data in parallel using the plurality of input accumulators to provide a plurality of transform coefficient outputs;

multiplying the transform coefficient outputs by constants to provide a plurality of transform products; and accumulating the transform products to provide the transformed matrix of data.

* * * * *

UNITED STATES PATENT AND TRADEMARK OFFICE
CERTIFICATE OF CORRECTION

PATENT NO.    :    5,434,808
ISSUE DATE    :    July 18, 1995
INVENTOR(S)   :    Cohen, Paul E.

It is certified that error appears in the above-identified patent and that said Letters Patent is hereby corrected as shown below:

Col. 46, line 16; In Claim 1 please delete "output" and insert --transformed--

Signed and Sealed this

Tenth Day of August, 1999

Attest:

Q. TODD DICKINSON

*Attesting Officer*    Acting Commissioner of Patents and Trademarks